(12) United States Patent
Tabata et al.

(10) Patent No.: US 7,967,722 B2
(45) Date of Patent: *Jun. 28, 2011

(54) CONTROLLER OF DRIVING DEVICE FOR VEHICLE

(75) Inventors: Atsushi Tabata, Okazaki (JP); Yuji Inoue, Nisshin (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 715 days.

This patent is subject to a terminal disclaimer.

(21) Appl. No.: 11/915,749

(22) PCT Filed: May 30, 2006

(86) PCT No.: PCT/JP2006/311170
§ 371 (c)(1),
(2), (4) Date: Nov. 28, 2007

(87) PCT Pub. No.: WO2006/129836
PCT Pub. Date: Dec. 7, 2006

(65) Prior Publication Data
US 2009/0029819 A1    Jan. 29, 2009

(30) Foreign Application Priority Data

May 30, 2005 (JP) .................. 2005-158080
Jun. 23, 2005 (JP) .................. 2005-184000

(51) Int. Cl.
*B60W 10/02* (2006.01)
*B60W 10/00* (2006.01)
*B60W 10/04* (2006.01)
*H02P 15/00* (2006.01)
*H02P 17/00* (2006.01)

(52) U.S. Cl. ............ 477/15; 477/6; 477/8; 477/39; 903/918

(58) Field of Classification Search ........ 477/15, 477/5, 6, 8, 39; 903/918
See application file for complete search history.

(56) References Cited

U.S. PATENT DOCUMENTS

| 7,549,944 B2 * | 6/2009 | Tabata et al. ............ 477/5 |
| 7,803,086 B2 * | 9/2010 | Tabata et al. ............ 477/3 |
| 2009/0118955 A1 * | 5/2009 | Tabata et al. ............ 701/66 |

FOREIGN PATENT DOCUMENTS

| JP | 60 241570 | 11/1985 |
| JP | 7 285360 | 10/1995 |

(Continued)

*Primary Examiner* — Tisha D Lewis
(74) *Attorney, Agent, or Firm* — Oblon, Spivak, McClelland, Maier & Neustadt, L.L.P.

(57) ABSTRACT

A transmission mechanism including a switching clutch or brake that is switchable between a continuously-variable shifting state and a step-variable shifting state, and has both an advantage of improved fuel economy provided by a transmission, the speed ratio of which is electrically variable, and an advantage of high power transmitting efficiency provided by a gear type power transmitting device constructed for mechanical transmission of power. While a clutch-to-clutch shifting action of an automatic transmission portion is in a tie-up state, a differential portion is placed in a continuously-variable shifting state by switching control, and engine speed is changed under the control of hybrid control, so as to prevent a drop of the engine speed for thereby reducing a shock of the shifting action, unlike in a non-continuously-variable shifting state of the differential portion in which the engine speed is directly influenced by the tie-up state.

16 Claims, 20 Drawing Sheets

FOREIGN PATENT DOCUMENTS

| | | |
|---|---|---|
| JP | 9 72409 | 3/1997 |
| JP | 10 234106 | 9/1998 |
| JP | 11 217025 | 8/1999 |
| JP | 2000 2327 | 1/2000 |
| JP | 2000 6676 | 1/2000 |
| JP | 2000 346187 | 12/2000 |
| JP | 2003 301731 | 10/2003 |

* cited by examiner

|  | C0 | C1 | C2 | B0 | B1 | B2 | B3 | SPEED RATIO | STEPPING RATIO |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | SPREAD 4.76 |
| R |  |  | ○ |  |  |  | ○ | 3.209 |  |
| N |  |  |  |  |  |  |  |  |  |

○ ENGAGED
◎ ENGAGED FOR STEP-VARIABLE SHIFTING, AND RELEASED FOR CONTINUOUSLY-VARIABLE SHIFTING

|  | C0 | C1 | C2 | B0 | B1 | B2 | SPEED RATIO | STEPPING RATIO |
|---|---|---|---|---|---|---|---|---|
| 1st | ◎ | ○ |  |  |  | ○ | 2.804 | 1.54 |
| 2nd | ◎ | ○ |  |  | ○ |  | 1.531 | 1.53 |
| 3rd | ◎ | ○ | ○ |  |  |  | 1.000 | 1.42 |
| 4th |  | ○ | ○ | ◎ |  |  | 0.705 | SPREAD 3.977 |
| R |  |  | ○ |  |  | ○ | 2.393 |  |
| N |  |  |  |  |  |  |  |  |

○ ENGAGED
◎ ENGAGED FOR STEP-VARIABLE SHIFTING, AND RELEASED FOR CONTINUOUSLY-VARIABLE SHIFTING

CONTROLLER OF DRIVING DEVICE FOR VEHICLE

TECHNICAL FIELD

The present invention relates to a vehicular drive system including a differential mechanism operable to perform a differential function, and electric motors, and more particularly to techniques for reducing the sizes of the electric motors.

BACKGROUND ART

There is known a drive system for a vehicle, which includes a differential mechanism operable to distribute an output of an engine to a first electric motor and its output shaft, and a second electric motor disposed between the output shaft of the differential mechanism and drive wheels of the vehicle. Patent Document 1 discloses an example of such a vehicular drive system, which is a hybrid vehicle drive system. In this hybrid vehicle drive system, the differential mechanism is constituted by a planetary gear set, for example, and a major portion of a drive force of the engine is mechanically transmitted to the drive wheels through the differential function of the differential mechanism, while the rest of the drive force is electrically transmitted from the first electric motor to the second electric motor, through an electric path therebetween, so that the vehicular drive system functions as a transmission the speed ratio of which is continuously variable, for example, as an electrically controlled continuously variable transmission, thereby making it possible to drive the vehicle under the control of a control apparatus, with the engine kept in an optimum operating state with an improved fuel economy.

Patent Document 1: JP-2003-301731 A
Patent Document 2: JP-7-285360 A
Patent Document 3: JP-60-241570

Generally, a continuously variable transmission is known as a transmission which permits an improved fuel economy of the vehicle, while on the other hand a gear type transmission such as a step-variable automatic transmission is known as a transmission having a high power transmitting efficiency. However, there is not available any power transmitting mechanism having the advantages of those two types of transmission. For example, the hybrid vehicle drive system disclosed in the above-identified Patent Document 1 includes the electric path for transmitting an electric energy from the first electric motor to the second electric motor, namely, a power transmitting path for transmitting a portion of the vehicle drive force as an electric energy, so that the first electric motor is required to be large-sized to meet a need for an increased output of the engine, and the second electric motor driven by the electric energy generated by the first electric motor is also required to be accordingly large-sized, whereby the overall size of the hybrid vehicle drive system tends to be large-sized. It is also noted that a portion of the output of the engine is once converted into an electric energy which is subsequently converted into a mechanical energy to be transmitted to the drive wheels, whereby the fuel economy of the vehicle may possibly be deteriorated under some running condition of the vehicle, for instance, during a high-speed running of the vehicle. Where the above-described differential mechanism is a transmission the speed ratio of which is electrically variable, for example, a continuously variable transmission so-called an "electric CVT", the vehicular drive system suffers from a similar problem.

The present invention was made in view of the background art described above. It is therefore an object of this invention to provide a control apparatus for a vehicular drive system including a differential mechanism operable to perform a differential function for distributing an output of an engine to a first electric motor and its output shaft, and a second electric motor disposed in a power transmitting path between the differential mechanism and a drive wheel of a vehicle, the control apparatus permitting reduction of the required size or an improvement of the fuel economy of the vehicular drive system.

DISCLOSURE OF THE INVENTION

According the present invention of claim 1, there is provided a control apparatus for (a) a vehicular drive system including a continuously-variable transmission portion operable as an electrically controlled continuously variable transmission, and a step-variable transmission portion, the continuously variable transmission portion having a differential mechanism operable to distribute an output of an engine to a first electric motor and a power transmitting member, and a second electric motor disposed in a power transmitting path between the power transmitting member and a drive wheel of a vehicle, the step-variable transmission portion constituting a part of the power transmitting path and functioning as a step-variable transmission operable to perform a clutch-to-clutch shifting action by a releasing action of a released-side coupling device and an engaging action of an engaged-side coupling device, the control apparatus being characterized by comprising (b) a differential limiting device provided in the differential mechanism, and operable to limit a differential function of the differential mechanism, for limiting an operation of the continuously-variable transmission portion as the electrically controlled continuously variable transmission, and (c) differential-state switching means for releasing the limitation of the operation of the continuously-variable transmission portion as the electrically controlled continuously variable transmission, while the clutch-to-clutch shifting action of the step-variable transmission portion is in a tie-up state.

In the vehicular drive system constructed as described above, the continuously-variable transmission portion of the vehicular drive system is switchable by the differential limiting device, between a differential state in which the differential mechanism is operable to perform the differential function without a limitation, that is, a continuously-variable shifting state in which the continuously-variable transmission portion is operable as the electrically controlled continuously variable transmission, and a non-differential state such as a locked state in which the differential mechanism is not operable to perform the differential function, that is, a non-continuously-variable shifting state in which the continuously-variable transmission portion is not operable as the electrically controlled continuously variable transmission. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the continuously-variable transmission portion is placed in the continuously-variable shifting state in a normal output state of the engine during a low-speed or medium-speed running or a low-output or medium-output running of the vehicle, for example, the fuel economy of the vehicle is improved. When the continuously-variable transmission portion is placed in the non-continuously-variable shifting state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the continuously-variable transmission portion is operated as a transmission the speed ratio of which is electrically variable. Where the continuously-variable transmission portion is placed in the non-continuously-variable shifting state during a high-output running state of the vehicle, the continuously-variable transmission portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

In the vehicular drive system including the continuously-variable transmission portion the operation of which as the electrically controlled continuously variable transmission can be limited, and the step-variable transmission portion which constitutes a part of the power transmitting path between the continuously-variable transmission portion and the vehicle drive wheel, the limitation of the operation of the continuously-variable transmission portion as the electrically controlled continuously variable transmission by the differential limiting device is released by the differential-state switching means while the clutch-to-clutch shifting action of the step-variable transmission portion is in the tie-up state. Accordingly, the differential function of the differential mechanism, that is, the operation of the continuously-variable transmission portion as the electrically controlled continuously variable transmission is not limited in the tie-up state of the clutch-to-clutch shifting action, so that the engine speed can be controlled as needed, irrespective of a change of the rotating speed of the rotary element of the step-variable transmission portion, for instance, irrespective of an input speed or output speed of the step-variable transmission portion, in the tie-up state of the clutch-to-clutch shifting action, whereby a drop of the engine speed due to the tie-up phenomenon in the step-variable transmission portion can be prevented, to reduce the shock of the clutch-to-clutch shifting action in the tie-up state. While the operation of the continuously-variable transmission portion as the electrically controlled continuously variable transmission is limited, on the other hand, the engine speed may be directly influenced by the tie-up phenomenon in the step-variable transmission portion under the clutch-to-clutch shifting action in the tie-up state, for example, by a temporary drop of the input or output speed of the step-variable transmission portion in the tie-up state, since the engine and the drive wheel are mechanically connected to each other.

According to the invention of claim 2, the differential-state switching means is operable to switch the continuously-variable transmission portion from a step-variable shifting state in which the continuously-variable transmission portion is not operable as the electrically controlled continuously variable transmission, to a continuously-variable shifting state in which the continuously-variable transmission portion is operable as the electrically controlled continuously variable transmission. In this case, the shock of the clutch-to-clutch shifting action can be reduced, without cutting off a power transmitting path between the engine and the drive wheel.

According to the invention of claim 3, the control apparatus further comprises electric-motor control means for placing the first electric motor in a non-load state for placing the continuously-variable transmission portion in a neutral state in which power cannot be transmitted through the continuously-variable transmission portion, when the clutch-to-clutch shifting action is in a heavy tie-up state in which a degree of the tie-up state is higher than a predetermined value. In this case, the power transmitting path between the engine and the step-variable transmission portion is cut off, so that the engine speed is not influenced by the tie-up phenomenon in the step-variable transmission portion under the clutch-to-clutch shifting action, making it possible to reduce the shock of the clutch-to-clutch shifting action in the heavy tie-up state, which may not be sufficiently reduced by merely releasing the limitation of the operation of the continuously-variable transmission portion as the electrically controlled continuously variable transmission under the control of the differential-state switching means.

According to the invention of claim 4, the vehicular drive system further includes an input clutch which permits and inhibits power input from the power transmitting member to the step-variable transmission portion, the control apparatus further including input-clutch control means for releasing or partially engaging the input clutch, when the limitation of the operation of the continuously-variable transmission portion as the electrically controlled continuously variable transmission cannot be released by the differential-state switching means while the clutch-to-clutch shifting action of the step-variable transmission portion is in the tie-up state. In this case, the power input from the continuously-variable transmission portion to the step-variable transmission portion is inhibited, when the limitation of the operation of the continuously-variable transmission portion as the electrically controlled continuously variable transmission cannot be released due to a failure or functional deterioration of the differential limiting device or the control apparatus. Accordingly, the engine speed can be controlled as needed, irrespective of a change of the rotating speed of the rotary element of the step-variable transmission portion According the present invention of claim 5, there is provided a control apparatus for (a) a vehicular drive system including a continuously-variable transmission portion operable as an electrically controlled continuously variable transmission, and a step-variable transmission portion, the continuously variable transmission portion having a differential mechanism operable to distribute an output of an engine to a first electric motor and a power transmitting member, and a second electric motor disposed in a power transmitting path between the power transmitting member and a drive wheel of a vehicle, the step-variable transmission portion constituting a part of the power transmitting path and functioning as a step-variable transmission operable to perform a clutch-to-clutch shifting action by a releasing action of a released-side coupling device and an engaging action of an engaged-side coupling device, the control apparatus being characterized by comprising (b) a differential limiting device provided in the differential mechanism, and operable to limit a differential function of the differential mechanism, for limiting an operation of the continuously-variable transmission portion as the electrically controlled continuously variable transmission, (c) an input clutch which permits and inhibits power input from the power transmitting member to the step-variable transmission portion, and (d) input-clutch control means for releasing or partially engaging the input clutch, when the clutch-to-clutch shifting action of the step-variable transmission portion is in a tie-up state while the operation of the continuously-variable transmission portion as the electrically controlled continuously variable transmission is limited.

In the vehicular drive system constructed as described above, the continuously-variable transmission portion of the vehicular drive system is switchable by the differential limiting device, between a differential state in which the differential mechanism is operable to perform the differential function without a limitation, that is, a continuously-variable shifting state in which the continuously-variable transmission portion is operable as the electrically controlled continuously variable transmission, and a non-differential state such as a locked state in which the differential mechanism is not operable to perform the differential function, that is, a non-continuously-variable shifting state in which the continuously-variable transmission portion is not operable as the electrically controlled continuously variable transmission. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the continuously-variable transmission portion is placed in the continuously-variable shifting state in a normal output state of the engine during a low-speed or medium-speed running or a low-output or medium-output running of the vehicle, for example, the fuel economy of the vehicle is improved. When the continuously-variable transmission portion is placed in the non-continuously-variable shifting state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the continuously-variable transmission portion is operated as a transmission the speed ratio of which is electrically variable. Where the continuously-variable transmission portion is placed in the non-continuously-variable shifting state during a high-output running state of the vehicle, the continuously-variable transmission portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

In the vehicular drive system including the continuously-variable transmission portion the operation of which as the electrically controlled continuously variable transmission can be limited, and the step-variable transmission portion which constitutes a part of the power transmitting path between the power transmitting member and the drive wheel, the input clutch which permits or inhibits the power input from the power transmitting member to the step-variable transmission portion is released or partially engaged under the control of the input-clutch control means when the clutch-to-clutch shifting action of the step-variable transmission portion is in the tie-up state while the operation of the continuously-variable transmission portion as the electrically controlled continuously variable transmission is limited. Accordingly, the power input from the continuously-variable transmission portion to the step-variable transmission portion is inhibited, so that the engine speed can be controlled as needed, irrespective of a change of the rotating speed of the step-variable transmission portion, that is, irrespective of a change of the input speed of the step-variable transmission, whereby a drop of the engine speed due to the tie-up phenomenon in the step-variable transmission portion can be prevented, to reduce the shock of the clutch-to-clutch shifting action in the tie-up state. While the input clutch is placed in the fully engaged state, the engine speed may be directly influenced by the tie-up phenomenon in the step-variable transmission portion under the clutch-to-clutch shifting action in the tie-up state, for example, by a temporary drop of the input speed or output speed of the step-variable transmission portion in the tie-up state, since the engine and the drive wheels are mechanically connected to each other.

According to the invention of claim 6, the control apparatus further comprises differential-state switching means for releasing the limitation of the operation of the continuously-variable transmission portion as the electrically controlled continuously variable transmission while the clutch-to-clutch shifting action of the step-variable transmission portion is in a tie-up state, and the input-clutch control means releases or partially engages the input clutch when the limitation of the operation of the continuously-variable transmission portion as the electrically controlled continuously variable transmission cannot be released by the differential-state switching means. In this case, the power input from the continuously-variable transmission portion to the step-variable transmission portion is inhibited, so that the engine speed can be controlled as needed, irrespective of a change of the rotating speed of the step-variable transmission portion, even where it is not possible to change the engine speed as needed owing to the differential function, namely, by releasing the limitation of the operation of the continuously-variable transmission portion as the electrically controlled continuously variable transmission portion, as in the event of a failure or functional deterioration of the differential limiting device or control apparatus.

According to the invention of claim 7, the input-clutch control means partially engages the input clutch. In this case, the shock of the clutch-to-clutch shifting action can be reduced, without completely cutting off the power transmitting path between the engine and the drive wheel.

According to the invention of claim 8, the input-clutch control means releases the input clutch when the clutch-to-clutch shifting action is in a heavy tie-up state in which a degree of the tie-up state is higher than a predetermined value. In this case, the power transmitting path between the engine and the step-variable transmission portion is completely cut off, so that the engine speed is not influenced by the tie-up phenomenon of the step-variable transmission portion under the clutch-to-clutch shifting action. Thus, it is possible to reduce the shock of the clutch-to-clutch shifting action in the heavy tie-up state, which shock cannot be sufficiently reduced by partially engaging the input clutch.

According to the invention of claim 9, there is provided a control apparatus for (a) a vehicular drive system including a differential portion and a step-variable transmission portion, the differential portion having a differential mechanism operable to distribute an output of an engine to a first electric motor and a power transmitting member, and a second electric motor disposed in a power transmitting path between the power transmitting member and a drive wheel of a vehicle, the step-variable transmission portion constituting a part of the power transmitting path and functioning as a step-variable transmission operable to perform a clutch-to-clutch shifting action by a releasing action of a released-side coupling device and an engaging action of an engaged-side coupling device, the control apparatus being characterized by comprising (b) a differential limiting device provided in the differential mechanism, and operable to limit a differential function of the differential mechanism, for limiting a differential function of the differential portion, and (c) differential-state switching means for releasing the limitation of the differential function of the differential portion, while the clutch-to-clutch shifting action of the step-variable transmission portion is in a tie-up state.

In the vehicular drive system constructed as described above, the differential portion of the vehicular drive system is switchable by the differential limiting device, between a differential state in which the differential mechanism is operable to perform the differential function without a limitation, that is, a differential state in which the differential portion is operable to perform the differential function, and a non-differential state such as a locked state in which the differential mechanism is not operable to perform the differential function, that is, a non-differential state in which the differential portion is not operable to perform the differential function. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the differential portion is placed in the differential state in a normal output state of the engine during a low-speed or medium-speed running or a low-output or medium-output running of the vehicle, for example, the fuel economy of the vehicle is improved. When the differential portion is placed in the non-differential state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the differential portion is operated as a transmission the speed ratio of which is electrically variable. Where the differential portion is placed in the non-differential state during a high-output running state of the vehicle, the differential portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

In the vehicular drive system including the differential portion the differential function of which can be limited, and the step-variable transmission portion which constitutes a part of the power transmitting path between the differential portion and the vehicle drive wheel, the limitation of the differential function of the differential portion by the differential limiting device is released by the differential-state switching means while the clutch-to-clutch shifting action of the step-variable transmission portion is in the tie-up state. Accordingly, the differential function of the differential mechanism, that is, the differential function of differential portion is not limited in the tie-up state of the clutch-to-clutch shifting action, so that the engine speed can be controlled as needed, irrespective of a change of the rotating speed of the rotary element of the step-variable transmission portion, for instance, irrespective of an input speed or output speed of the step-variable transmission portion, in the tie-up state of the clutch-to-clutch shifting action, whereby a drop of the engine speed due to the tie-up phenomenon in the step-variable transmission portion can be prevented, to reduce the shock of the clutch-to-clutch shifting action in the tie-up state. While the differential function of the differential portion is limited, on the other hand, the engine speed may be directly influenced by the tie-up phenomenon in the step-variable transmission portion under the clutch-to-clutch shifting action in the tie-up state, for example, by a temporary drop of the input or output speed of the step-variable transmission portion in the tie-up state, since the engine and the drive wheel are mechanically connected to each other.

According to the invention of claim 10, the differential-state switching means is operable to switch the differential portion from a non-differential state in which the differential portion is not operable to perform the differential function, to a differential state in which the differential portion is operable to perform the differential function. In this case, the shock of the clutch-to-clutch shifting action can be reduced, without cutting off a power transmitting path between the engine and the drive wheel.

According to the invention of claim 11, the control apparatus further comprises electric-motor control means for placing the first electric motor in a non-load state for placing the differential portion in a neutral state in which power cannot be transmitted through the differential portion, when the clutch-to-clutch shifting action is in a heavy tie-up state in which a degree of the tie-up state is higher than a predetermined value. In this case, the power transmitting path between the engine and the step-variable transmission portion is cut off, so that the engine speed is not influenced by the tie-up phenomenon in the step-variable transmission portion under the clutch-to-clutch shifting action, making it possible to reduce the shock of the clutch-to-clutch shifting action in the heavy tie-up state, which may not be sufficiently reduced by merely releasing the limitation of the differential function of the differential portion under the control of the differential-state switching means.

According to the invention of claim 12, the vehicular drive system further includes an input clutch which permits and inhibits power input from the power transmitting member to the step-variable transmission portion, the control apparatus further including input-clutch control means for releasing or partially engaging the input clutch, when the limitation of the differential function of the differential portion cannot be released by the differential-state switching means while the clutch-to-clutch shifting action of the step-variable transmission portion is in the tie-up state. In this case, the power input from the differential portion to the step-variable transmission portion is inhibited, when the limitation of the differential function of the differential portion cannot be released due to a failure or functional deterioration of the differential limiting device or the control apparatus. Accordingly, the engine speed can be controlled as needed, irrespective of a change of the rotating speed of the rotary element of the step-variable transmission portion According to the invention of claim 13, there is provided a control apparatus for (a) a vehicular drive system including a differential portion and a step-variable transmission portion, the differential portion having a differential mechanism operable to distribute an output of an engine to a first electric motor and a power transmitting member, and a second electric motor disposed in a power transmitting path between the power transmitting member and a drive wheel of a vehicle, the step-variable transmission portion constituting a part of the power transmitting path and functioning as a step-variable transmission operable to perform a clutch-to-clutch shifting action by a releasing action of a released-side coupling device and an engaging action of an engaged-side coupling device, the control apparatus being characterized by comprising (b) a differential limiting device provided in the differential mechanism, and operable to limit a differential function of the differential mechanism, for limiting a differential function of the differential portion, (c) an input clutch which permits and inhibits power input from the power transmitting member to the step-variable transmission portion, and (d) input-clutch control means for releasing or partially engaging the input clutch, when the clutch-to-clutch shifting action of the step-variable transmission portion is in a tie-up state while the differential function of the differential portion is limited.

In the vehicular drive system constructed as described above, the differential portion of the vehicular drive system is switchable by the differential limiting device, between a differential state in which the differential mechanism is operable to perform the differential function without a limitation, that is, a differential state in which the differential portion is operable to perform the differential function, and a non-differential state such as a locked state in which the differential mechanism is not operable to perform the differential function, that is, a non-differential state in which the differential portion is not operable to perform the differential function. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the differential portion is placed in the differential state in a normal output state of the engine during a low-speed or medium-speed running or a low-output or medium-output running of the vehicle, for example, the fuel economy of the vehicle is improved. When the differential portion is placed in the non-differential state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the differential portion is operated as a transmission the speed ratio of which is electrically variable. Where the differential portion is placed in the non-differential state during a high-output running state of the vehicle, the differential portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

In the vehicular drive system including the differential portion the differential function of which can be limited, and the step-variable transmission portion which constitutes a part of the power transmitting path between the power transmitting member and the drive wheel, the input clutch which permits or inhibits the power input from the power transmitting member to the step-variable transmission portion is released or partially engaged under the control of the input-clutch control means when the clutch-to-clutch shifting action of the step-variable transmission portion is in the tie-up state while the differential function of the differential portion is limited. Accordingly, the power input from the differential portion to the step-variable transmission portion is inhibited, so that the engine speed can be controlled as needed, irrespective of a change of the rotating speed of the step-variable transmission portion, that is, irrespective of a change of the input speed of the step-variable transmission, whereby a drop of the engine speed due to the tie-up phenomenon in the step-variable transmission portion can be prevented, to reduce the shock of the clutch-to-clutch shifting action in the tie-up state. While the input clutch is placed in the fully engaged state, the engine speed may be directly influenced by the tie-up phenomenon in the step-variable transmission portion under the clutch-to-clutch shifting action in the tie-up state, for example, by a temporary drop of the input speed or output speed of the step-variable transmission portion in the tie-up state, since the engine and the drive wheels are mechanically connected to each other.

According to the invention of claim 14, the control apparatus further comprises differential-state switching means for releasing the limitation of the differential function of the differential portion while the clutch-to-clutch shifting action of the step-variable transmission portion is in a tie-up state, and the input-clutch control means releases or partially engages the input clutch when the limitation of the differential function of the differential portion cannot be released by the differential-state switching means. In this case, the power input from the differential portion to the step-variable transmission portion is inhibited, so that the engine speed can be controlled as needed, irrespective of a change of the rotating speed of the step-variable transmission portion, even where it is not possible to change the engine speed as needed owing to the differential function, namely, by releasing the limitation of the differential function of the differential portion, as in the event of a failure or functional deterioration of the differential limiting device or control apparatus.

According to the invention of claim 15, the input-clutch control means partially engages the input clutch. In this case, the shock of the clutch-to-clutch shifting action can be reduced, without completely cutting off the power transmitting path between the engine and the drive wheel.

According to the invention of claim 16, the input-clutch control means releases the input clutch when the clutch-to-clutch shifting action is in a heavy tie-up state in which a degree of the tie-up state is higher than a predetermined value. In this case, the power transmitting path between the engine and the step-variable transmission portion is completely cut off, so that the engine speed is not influenced by the tie-up phenomenon of the step-variable transmission portion under the clutch-to-clutch shifting action. Thus, it is possible to reduce the shock of the clutch-to-clutch shifting action in the heavy tie-up state, which shock cannot be sufficiently reduced by partially engaging the input clutch.

According to the invention of claim 17, there is provided a control apparatus for (a) a vehicular drive system including a continuously-variable transmission portion operable as an electrically controlled continuously variable transmission, and a transmission portion, the continuously variable transmission portion having a differential mechanism operable to distribute an output of an engine to a first electric motor and a power transmitting member, and a second electric motor disposed in a power transmitting path between the power transmitting member and a drive wheel of a vehicle, the transmission portion constituting a part of the power transmitting path, the control apparatus being characterized by comprising (b) a differential limiting device provided in the differential mechanism, and operable to limit a differential function of the differential mechanism, for limiting an operation of the continuously-variable transmission portion as the electrically controlled continuously variable transmission, and (c) differential-state switching means for releasing the limitation of the operation of the continuously-variable transmission portion as the electrically controlled continuously variable transmission, while the transmission portion is under a shifting action.

In the vehicular drive system constructed as described above, the continuously-variable transmission portion of the vehicular drive system is switchable by the differential limiting device, between a differential state in which the differential mechanism is operable to perform the differential function without a limitation, that is, a continuously-variable shifting state in which the continuously-variable transmission portion is operable as the electrically controlled continuously variable transmission, and a non-differential state such as a locked state in which the differential mechanism is not operable to perform the differential function, that is, a non-continuously-variable shifting state in which the continuously-variable transmission portion is not operable as the electrically controlled continuously variable transmission. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the continuously-variable transmission portion is placed in the continuously-variable shifting state in a normal output state of the engine during a low-speed or medium-speed running or a low-output or medium-output running of the vehicle, for example, the fuel economy of the vehicle is improved. When the continuously-variable transmission portion is placed in the non-continuously-variable shifting state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the continuously-variable transmission portion is operated as a transmission the speed ratio of which is electrically variable. Where the continuously-variable transmission portion is placed in the non-continuously-variable shifting state during a high-output running state of the vehicle, the continuously-variable transmission portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

In the vehicular drive system including the continuously-variable transmission portion the operation of which as the electrically controlled continuously variable transmission can be limited, and the transmission portion which constitutes a part of the power transmitting path between the continuously-variable transmission portion and the vehicle drive wheel, the limitation of the operation of the continuously-variable transmission portion as the electrically controlled continuously variable transmission by the differential limiting device is released by the differential-state switching means while the transmission portion is under the shifting action. Accordingly, the differential function of the differential mechanism, that is, the operation of the continuously-variable transmission portion as the electrically controlled continuously variable transmission is not limited during the shifting action of the transmission portion, so that the engine speed can be controlled as needed, irrespective of the shifting action of the transmission portion, for example, irrespective of a change of the rotating speed of the power transmitting member due to the shifting action. In the continuously-variable shifting state of the continuously-variable transmission portion, the shifting shock of the transmission portion can be made smaller than in the state in which the operation of the continuously-variable transmission portion as the electrically controlled continuously variable transmission is limited and in which the engine and the drive wheel are mechanically connected to each other, and the engine speed may be directly influenced by the shifting action of the transmission portion.

According to the invention of claim 18, the control apparatus further comprises: an input clutch which permits and inhibits power input from the power transmitting member to the transmission portion; and input-clutch control means for releasing or partially engaging the input clutch, when the transmission portion is under the shifting action while the limitation of the operation of the continuously-variable transmission portion as electrically controlled continuously variable transmission cannot be released by said differential-state switching means. In this case, the engine speed can be controlled as needed irrespective of the shifting action of the transmission portion, to reduce the shifting shock of the transmission portion, by cutting off the power transmitting path from the continuously-variable transmission portion to the transmission portion, even when the limitation of the operation of the continuously-variable transmission portion as the electrically controlled continuously variable transmission cannot be released due to a failure or functional deterioration of the differential limiting device or control apparatus.

According to the invention of claim 19. the differential limiting device includes a coupling device operable to selectively switch the differential mechanism between a differential state in which the differential mechanism is operable to perform the differential function, and a non-differential state in which the differential mechanism is not operable to perform the differential function, and the differential-state switching means limits the limitation of the operation of the continuously-variable transmission portion as the electrically controlled continuously variable transmission, by releasing or partially engaging the coupling device. In this case, the continuously-variable transmission portion is easily made operable by the coupling device as the electrically controlled continuously variable transmission, or its operation as the electrically controlled continuously variable transmission can be easily limited by the coupling device, so that the vehicular drive system has both an advantage of improved fuel economy provided by a transmission the speed ratio of which is electrically variable, and an advantage of high power transmitting efficiency provided by a gear type power transmitting device constructed for mechanical transmission of power. During the shifting action of the transmission portion, the operation of the continuously-variable transmission portion as the electrically controlled continuously variable transmission can be easily limited by releasing or partially engaging the coupling device, so that the engine speed can be controlled as needed irrespective of the shifting action of the transmission portion, whereby the shifting shock of the transmission portion can be reduced.

According to the invention of claim 20, there is provided a control apparatus for (a) a vehicular drive system including a differential portion and a transmission portion, the differential portion having a differential mechanism operable to distribute an output of an engine to a first electric motor and a power transmitting member, and a second electric motor disposed in a power transmitting path between the power transmitting member and a drive wheel of a vehicle, the transmission portion constituting a part of the power transmitting path, the control apparatus being characterized by comprising (b) a differential limiting device provided in the differential mechanism, and operable to limit a differential function of the differential mechanism, for limiting a differential function of the differential portion, and (c) differential-state switching means for releasing the limitation of the differential function of the differential portion, while the transmission portion is under a shifting action.

In the vehicular drive system constructed as described above, the differential portion of the vehicular drive system is switchable by the differential limiting device, between a differential state in which the differential mechanism is operable to perform the differential function without a limitation, that is, a continuously-variable shifting state in which the differential portion is operable to perform the differential function, and a non-differential state such as a locked state in which the differential mechanism is not operable to perform the differential function, that is, a non-continuously-variable shifting state in which the differential portion is not operable to perform the differential function. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the differential portion is placed in the differential state in a normal output state of the engine during a low-speed or medium-speed running or a low-output or medium-output running of the vehicle, for example, the fuel economy of the vehicle is improved. When the differential portion is placed in the non-differential state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the differential portion is operated as a transmission the speed ratio of which is electrically variable. Where the differential portion is placed in the non-differential state during a high-output running state of the vehicle, the differential portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

In the vehicular drive system including the differential portion the differential function of which can be limited, and the transmission portion which constitutes a part of the power transmitting path between the differential portion and the vehicle drive wheel, the limitation of the differential function of the differential portion by the differential limiting device is released by the differential-state switching means while the transmission portion is under the shifting action. Accordingly, the differential function of the differential mechanism, that is, the differential function of the differential portion is not limited during the shifting action of the transmission portion, so that the engine speed can be controlled as needed, irrespective of the shifting action of the transmission portion, for example, irrespective of a change of the rotating speed of the power transmitting member due to the shifting action. In the differential state of the differential portion, the shifting shock of the transmission portion can be made smaller than in the state in which the differential function of the differential portion is limited and in which the engine and the drive wheel are mechanically connected to each other, and the engine speed may be directly influenced by the shifting action of the transmission portion.

According to the invention of claim 21, the control apparatus further comprises: an input clutch which permits and inhibits power input from the power transmitting member to the transmission portion; and input-clutch control means for releasing or partially engaging the input clutch, when the transmission portion is under the shifting action while the limitation of the differential function of the differential portion cannot be released by said differential-state switching means. In this case, the engine speed can be controlled as needed irrespective of the shifting action of the transmission portion, to reduce the shifting shock of the transmission portion, by cutting off the power transmitting path from the differential portion to the transmission portion, even when the limitation of the differential function of the differential portion cannot be released due to a failure or functional deterioration of the differential limiting device or control apparatus.

According to the invention of claim 22. the differential limiting device includes a coupling device operable to selectively switch the differential mechanism between a differential state in which the differential mechanism is operable to perform the differential function, and a non-differential state in which the differential mechanism is not operable to perform the differential function, and the differential-state switching means limits the limitation of the differential function of the differential portion, by releasing or partially engaging the coupling device. In this case, the differential portion is easily made operable by the coupling device to perform the differential function, or its differential function can be easily limited by the coupling device, so that the vehicular drive system has both an advantage of improved fuel economy provided by a transmission the speed ratio of which is electrically variable, and an advantage of high power transmitting efficiency provided by a gear type power transmitting device constructed for mechanical transmission of power. During the shifting action of the transmission portion, the differential function of the differential portion can be easily limited by releasing or partially engaging the coupling device, so that the engine speed can be controlled as needed irrespective of the shifting action of the transmission portion, whereby the shifting shock of the transmission portion can be reduced.

Preferably, the differential limiting device is configured to place the differential mechanism in a differential state in which the differential mechanism performs the differential function, for thereby placing the continuously-variable transmission portion in a continuously-variable shifting state in which the continuously-variable transmission portion is operable as the electrically controlled continuously variable transmission, and to place the differential mechanism in a non-differential state (for example, a locked state) in which the differential mechanism does not perform the differential function, for thereby placing the continuously-variable transmission portion in a non-continuously-variable shifting state (for example, a step-variable shifting state) in which the continuously-variable transmission portion is not operable as the electrically controlled continuously variable transmission. In this case, the continuously-variable transmission portion is switchable between the continuously-variable shifting state and the non-continuously-variable shifting state.

Preferably, the differential-state switching device is configured to place the differential mechanism in a differential state in which the differential mechanism performs the differential function, for thereby placing the differential portion in a differential state in which the differential portion performs the differential function, and to place the differential mechanism in a non-differential state (for example, a locked state) in which the differential mechanism does not perform the differential function, for thereby placing the differential portion in a non-differential state (for example, a locked state) in which the differential portion does not perform the differential function. In this case, the differential portion is switchable between the differential state and the non-differential state.

Preferably, the differential mechanism has a first element connected to the engine, a second element connected to the first electric motor and a third element connected to the power transmitting member, and the differential limiting device is operable to place the differential mechanism in a differential state in which the first, second and third elements of the differential mechanism are rotatable relative to each other, and to place the differential mechanism in a non-differential state (for example, locked state) in which at least the second and third elements are not rotatable at respective different speeds. For example, the second and third elements are rotatable at respective different speeds in the differential state of the differential mechanism, and the first, second and third elements are rotated as a unit or the second element is held stationary in the non-differential or locked state of the differential mechanism. Thus, the differential mechanism is switchable between the differential and non-differential states.

Preferably, the differential limiting device includes a clutch operable to connect any two of the first, second and third elements of the differential mechanism to each other for rotating the first, second and third elements as a unit, and/or a brake operable to fix the second element to a stationary member for holding the second element stationary. This arrangement permits the differential mechanism to be easily switched between the differential and non-differential states.

Preferably, the clutch and brake are released to place the differential mechanism in the differential state in which at least the second and third elements are rotatable at respective different speeds, and in which the differential mechanism is operable as an electrically controlled differential device. In this case, the clutch is engaged to permit the differential mechanism to be operable as a transmission having a speed ratio of 1, or the brake is engaged to permit the differential mechanism to be operable as a speed-increasing transmission having a speed ratio lower than 1. In this arrangement, the differential mechanism is switchable between the differential state and the non-differential state, and is operable as a transmission having a single gear position with a single fixed speed ratio or a plurality of gear positions having respective fixed speed ratios.

Preferably, the differential mechanism is a planetary gear set, and the first element is a carrier of the planetary gear set, and the second element is a sun gear of the planetary gear set, while the third element is a ring gear of the planetary gear set. In this arrangement, the axial dimension of the differential mechanism can be reduced, and is simply constituted by one planetary gear device.

Preferably, the planetary gear set is of a single-pinion type. In this case, the axial dimension of the differential mechanism can be reduced, and the differential mechanism is simply constituted by one planetary gear set.

Preferably, an overall speed ratio of the vehicular drive system is defined by a speed ratio of the continuously-variable transmission portion and a speed ratio of the step-variable transmission portion. In this case, the vehicle drive force can be obtained over a relatively wide range of the overall speed ratio, by utilizing the speed ratio of the step-variable transmission portion, so that the efficiency of the continuously-variable shifting control of the continuously-variable transmission portion is further improved. Where the step-variable transmission portion is a speed-reducing transmis- sion having a speed ratio higher than 1, the output torque of the second electric motor may be smaller than the torque of the output shaft of the step-variable transmission portion, so that the required size of the second electric motor can be reduced. The continuously-variable transmission portion placed in its continuously-variable shifting state and the step-variable transmission portion cooperate to constitute a continuously-variable transmission, while the continuously-variable transmission portion placed in the non-continuously-variable shifting state and the step-variable transmission portion cooperate to constitute a step-variable transmission.

Preferably, an overall speed ratio of the vehicular drive system is defined by a speed ratio of the differential portion and a speed ratio of the step-variable transmission portion. In this case, the vehicle drive force can be obtained over a relatively wide range of the overall speed ratio, by utilizing the speed ratio of the step-variable transmission portion. Where the step-variable transmission portion is a speed-reducing transmission having a speed ratio higher than 1, the output torque of the second electric motor may be smaller than the torque of the output shaft of the step-variable transmission portion, so that the required size of the second electric motor can be reduced. The differential portion placed in its differential state and the step-variable transmission portion cooperate to constitute a continuously-variable transmission, while the differential portion placed in its non-differential state and the step-variable transmission portion cooperate to constitute a step-variable transmission.

Preferably, the step-variable transmission portion is a step-variable automatic transmission. In this case, the overall speed ratio of the vehicular drive system is changed in steps when the step-variable transmission portion is shifted. The change of the overall speed ratio in steps is more rapid than when the overall speed ratio is continuously changed. Accordingly, the drive system functions as a continuously variable transmission capable of smoothly changing the vehicle drive torque, and also capable of changing the speed ratio in steps for rapidly obtaining the vehicle drive torque.

EXPLANATION OF REFERENCE SIGNS

8: Engine
10, 70: Transmission mechanism (Drive system)
11: Differential portion (Continuously-variable transmission portion)
16: Power distributing mechanism (Differential mechanism)
18: Power transmitting member
20, 72: Automatic transmission portion (Step-variable transmission portion)
38: Drive wheels
40: Electronic control device (Control device)
52: Hybrid control means (Electric-motor control means)
54: Step-variable shifting control means
M1: First electric motor
M2: Second electric motor
C0: Switching clutch (Differential limiting device)
B0: Switching brake (Differential limiting device)

BEST MODE FOR CARRYING OUT THE INVENTION

The embodiments of this invention will be described in detail by reference to the drawings.

Embodiment 1

Figures 1, 2:
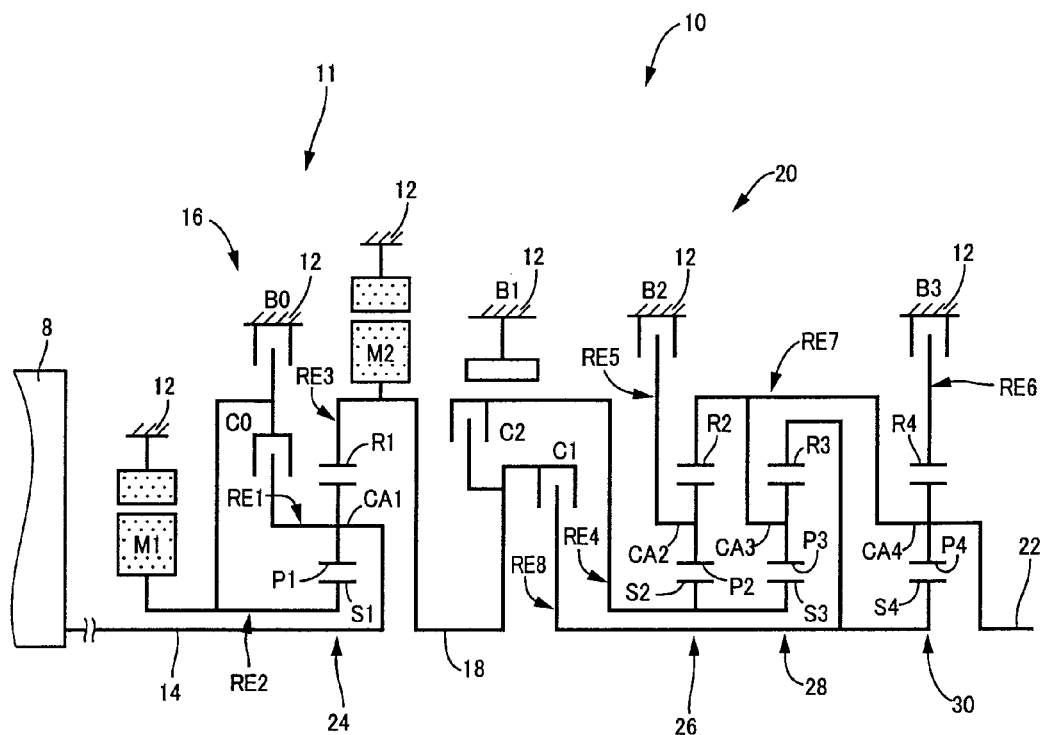
FIG. 1 is a schematic view for explaining an arrangement of a drive system of a hybrid vehicle according to one embodiment of the present invention.
FIG. 2 is a table indicating shifting actions of the hybrid vehicle drive system of FIG. 1, which is operable in a selected one of a continuously-variable shifting state and a step-variable shifting state, in relation to different combinations of operating states of hydraulically operated frictional coupling devices to effect the respective shifting actions.
Figure 5:
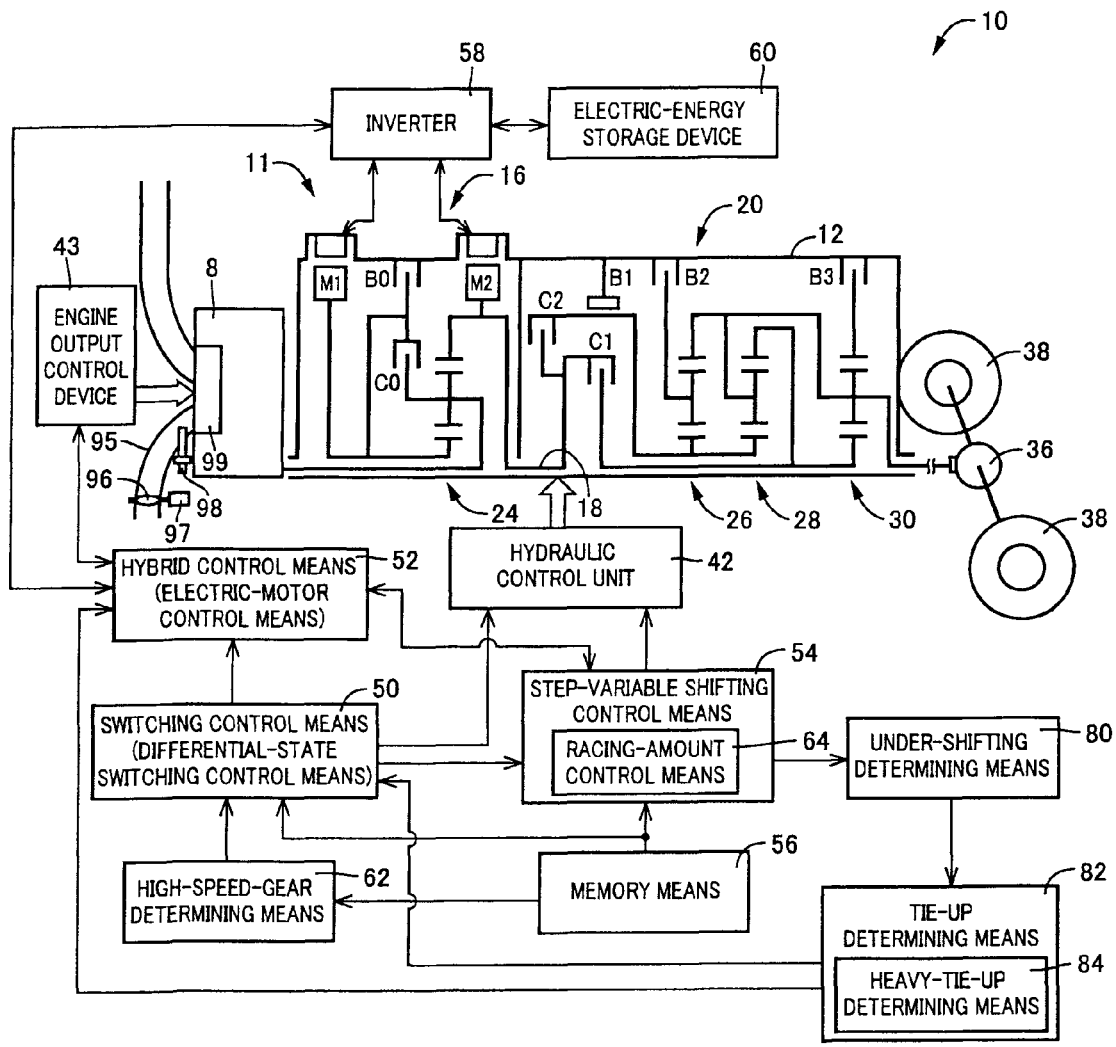
FIG. 5 is a functional block diagram illustrating major control functions of the electronic control device of FIG. 4.

FIG. 1 is s schematic view for explaining an a transmission mechanism 10 constituting a part of a drive system for a hybrid vehicle, which drive system is controlled by a control apparatus according to one embodiment of this invention. As shown in FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a step-variable transmission portion in the form of an automatic transmission portion 20, which functions as a multiple-step transmission disposed between the differential portion 11 and drive wheels 38 of the vehicle, and which is connected in series via a power transmitting member 18 (power transmitting shaft) to the transmission portion 11 and the drive wheels 38; and an output rotary member in the form of an output shaft 22 connected to the automatic transmission portion 20. The input shaft 12, differential portion 11, automatic transmission portion 20 and output shaft 22 are coaxially disposed on a common axis in a transmission casing 12 (hereinafter referred to as casing 12) functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. The engine 8 may be a gasoline engine or diesel engine and functions as a vehicle drive power source directly connected to the input shaft 14 or indirectly via the pulsation absorbing damper.

In the present transmission mechanism 10 described above, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in the schematic view of FIG. 1. This is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is rotated with the output shaft 22. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio $\rho 1$ of about 0.418, for example, a switching clutch C0 and a switching brake B1. The first planetary gear set 24 has rotary elements consisting of a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho 1$ is represented by ZS1/ZR1.

In this power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are both released, the power distributing mechanism 16 is placed in a differential state in which three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the differential portion 11 (power distributing mechanism 16) functions as an electrically controlled differential device, so that the differential portion 11 is placed in the continuously-variable shifting state (electrically established CVT state), in which the rotating speed of the power transmitting member 18 is continuously variable, irrespective of the rotating speed of the engine 8, namely, placed in the differential state in which a speed ratio $\gamma 0$ (rotating speed of the input shaft 14/rotating speed of the power transmitting member 18) of the power distributing mechanism 16 is continuously changed from a minimum value $\gamma 0$ min to a maximum value $\gamma 0$ max, that is, in the continuously-variable shifting state in which the power distributing mechanism 16 functions as an electrically controlled continuously variable transmission the speed ratio $\gamma 0$ of which is continuously variable from the minimum value $\gamma 0$ min to the maximum value $\gamma 0$ max.

When the switching clutch C0 or brake B0 is engaged while the power distributing mechanism 16 is placed in the continuously-variable shifting state, the power distributing mechanism 16 is brought into a locked state or non-differential state in which the differential function is not available. Described in detail, when the switching clutch C0 is engaged, the first sun gear S1 and the first carrier CA1 are connected together, so that the power distributing mechanism 16 is placed in the connected or locked state in which the three rotary elements of the first planetary gear set 24 consisting of the first sun gear S1, first carrier CA1 and first ring gear R1 are rotatable as a unit, namely, placed in a non-differential state in which the differential function is not available, so that the differential portion 11 is also placed in a non-differential state. In this non-differential state, the rotating speed of the engine 8 and the rotating speed of the power transmitting member 18 are made equal to each other, so that the differential portion 11 (power distributing mechanism 16) is placed in a non-continuously-variable shifting state, for example, in a fixed-speed-ratio shifting state or step-variable shifting state in which the mechanism 16 functions as a transmission having a fixed speed ratio $\gamma 0$ equal to 1.

When the switching brake B0 is engaged in place of the switching clutch C0, the first sun gear S1 is fixed to the casing 12, so that the power distributing mechanism 16 is placed in the connected or locked state in which the first sun gear S1 is not rotatable, namely, placed in a non-differential state in which the differential function is not available, so that the differential portion 11 is also placed in the non-differential state. Since the rotating speed of the first ring gear R1 is made higher than that of the first carrier CA1, the differential portion 11 is placed in the non-continuously-variable shifting state, for example, in the fixed-speed-ratio shifting state or step-variable shifting state in which differential portion 11 (the power distributing mechanism 16) functions as a speed-increasing transmission having a fixed speed ratio $\gamma 0$ smaller than 1, for example, about 0.7.

Thus, the frictional coupling devices in the form of the switching clutch C0 and brake B0 function as a differential-state switching device operable to selectively switch the differential portion 11 (power distributing mechanism 16)

between the differential state, namely, non-locked state (non-connected state) and the non-differential state, namely, locked state (connected state), that is, between the continuously-variable shifting state in which the differential portion 11 (the power distributing mechanism 16) is operable as an electrically controlled continuously variable transmission the speed ratio of which is continuously variable, and the locked state in which the differential portion 11 is not operable as the electrically controlled continuously variable transmission capable of performing a continuously-variable shifting operation, and in which the speed ratio of the transmission portion 11 is held fixed, namely, the fixed-speed-ratio shifting state (non-differential state) in which the transmission portion 11 is operable as a transmission having a single gear position with one speed ratio or a plurality of gear positions with respective speed ratios, namely, the fixed-speed-ratio shifting state in which the transmission portion 11 is operated as a transmission having a single gear position with one speed ratio or a plurality of gear positions with respective speed ratios.

Considered from another point of view, the switching clutch C0 and switching brake B0 function as a differential limiting device operable to limit the differential function of the power distributing mechanism 16 for limiting the electric differential function of the differential portion 11, namely, the function of the differential portion 11 as the electrically controlled continuously variable transmission, by placing the power distributing mechanism 16 in its non-differential state to place the differential portion 11 in its step-variable shifting state. The switching clutch C0 and switching brake B0 are also operable to place the power distributing mechanism 16 in its differential state, for placing the differential portion 11 in its continuously-variable shifting state, in which the differential function of the power distributing mechanism 16 and the electric differential function of the differential portion 11 are not limited, namely, the function of the differential portion as the electrically controlled continuously variable transmission is not limited.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio $\rho 2$ of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio $\rho 3$ of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio $\rho 4$ of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios $\rho 2$, $\rho 3$ and $\rho 4$ are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

Thus, the automatic transmission portion 20 and the differential portion 11 (power transmitting member 18) are selectively connected to each other through the first clutch C1 or the second clutch C2, which is provided to shift the automatic transmission portion 20. In other words, the first clutch C1 and the second clutch C2 function as input clutches operable to selectively permit or inhibit a power input from the differential portion 11 (power transmitting member 18) to the automatic transmission portion 20, that is, as input clutches operable to place a power transmitting path between the differential portion 11 and the automatic transmission portion 20, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cut-off state when the first clutch C1 and the second clutch C2 are placed in the released state. The automatic transmission portion 20 is a step-variable transmission which is operable to perform so-called "clutch-to-clutch shifting actions" each of which is effected by concurrent engaging and releasing actions of the appropriate two frictional coupling devices.

The above-described switching clutch C0, first clutch C1, second clutch C2, switching brake B0, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, the power distributing mechanism 16 is provided with the switching clutch C0 and the switching brake B0 one of which is engaged to place the differential portion 11 in the continuously-variable shifting state in which the differential portion 11 is operable as a continuously variable transmission, or in the non-continuously-variable shifting state (fixed-speed-ratio shifting state) in which the differential portion 11 is operable as a step-variable transmission having a fixed speed ratio or ratios. In the present transmission mechanism 10, therefore, the differential portion 11 placed in the fixed-speed-ratio shifting state by the engaging action of one of the switching clutch C0 and switching brake B0 cooperates with the automatic transmission portion 20 to constitute a step-variable transmission device, while the differential portion 11 placed in the continuously-variable shifting state with the switching clutch C0 and switching brake B0 being both held in the released state cooperates with the automatic transmission portion 20 to constitute an electrically controlled continuously variable transmission device. In other words, the transmission mechanism 10 is placed in its step-variable shifting state by engaging one of the switching clutch C0 and switching brake B9, and in its continuously-variable shifting state by releasing both of the switching clutch C0 and switching brake B0. The differential portion 11 can also be said to be a transmission which is selectively placed in one of its step-variable and continuously-variable shifting states.

Described in detail, when the transmission mechanism 10 is placed in its step-variable shifting state with the differential portion 11 placed in its step-variable shifting state with one of the switching clutch C0 and switching brake B0 held in the engaged state, one of a first gear position (first speed position) through a fifth gear position (fifth speed position), a reverse gear position (rear drive position) and a neutral position is selectively established by engaging actions of a corresponding combination of the two frictional coupling devices selected from the above-described first clutch C1, second clutch C2, first brake B1, second brake B2 and third brake B3, as indicated in the table of FIG. 2. The two frictional coupling devices may consist of a frictional coupling device to be released (hereinafter referred to as "released-side coupling device"), and a frictional coupling device to be engaged (hereinafter referred to as "engaged-side coupling device"). The above-indicated positions have respective speed ratios $\gamma T$ (input shaft speed $N_{IN}$/output shaft speed $N_{OUT}$) which change as geometric series. The speed ratios $\gamma T$ are overall speed ratios of the transmission mechanism 10 determined by a speed ratio $\gamma 0$ of the differential portion 11 and a speed ratio $\gamma$ of the automatic transmission portion 20.

Where the transmission mechanism 10 functions as the step-variable transmission, for example, the first gear position having the highest speed ratio $\gamma 1$ of about 3.357, for example, is established by engaging actions of the switching clutch C0, first clutch C1 and third brake B3, and the second gear position having the speed ratio $\gamma 2$ of about 2.180, for example, which is lower than the speed ratio $\gamma 1$, is established by engaging actions of the switching clutch C0, first clutch C1 and second brake B2, as indicated in FIG. 2. Further, the third gear position having the speed ratio $\gamma 3$ of about 1.424, for example, which is lower than the speed ratio $\gamma 2$, is established by engaging actions of the switching clutch C0, first clutch C1 and first brake B1, and the fourth gear position having the speed ratio $\gamma 4$ of about 1.000, for example, which is lower than the speed ratio $\gamma 3$, is established by engaging actions of the switching clutch C0, first clutch C1 and second clutch C2. The fifth gear position having the speed ratio $\gamma 5$ of about 0.705, for example, which is smaller than the speed ratio $\gamma 4$, is established by engaging actions of the first clutch C1, second clutch C2 and switching brake B0. Further, the reverse gear position having the speed ratio $\gamma R$ of about 3.209, for example, which is intermediate between the speed ratios $\gamma 1$ and $\gamma 2$, is established by engaging actions of the second clutch C2 and the third brake B3. The neutral position N is established by releasing all of the clutches C and brakes B.

Where the transmission mechanism 10 functions as the continuously-variable transmission with the differential portion 11 placed in its continuously-variable shifting state, on the other hand, the switching clutch C0 and the switching brake B0 indicated in FIG. 2 are both released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in a selected gear position M (hereinafter referred to as an input speed $N_{IN}$ of the automatic transmission portion 20), namely, the rotating speed of the power transmitting member 18 is continuously changed, so that the speed ratio of the drive system when the automatic transmission portion 20 is placed in the selected gear position M is continuously variable over a predetermined range. Accordingly, the overall speed ratio $\gamma T$ of the transmission mechanism 10 determined by the speed ratio $\gamma 0$ of the differential portion 11 and the speed ratio $\gamma$ of the automatic transmission portion 20 is continuously variable.

For example, the input speed $N_{IN}$ of the automatic transmission portion 20 placed in one of the first through fourth gear positions (or the fifth gear position established by the engaging actions of the same frictional coupling devices C1, C2 as used to establish the fourth gear position) is continuously variable in the released state of both of the switching clutch C0 and switching brake B0, as indicated in the table of FIG. 2, while the transmission mechanism 10 functions as the continuously variable transmission, so that the overall speed ratio $\gamma T$ of the transmission mechanism 10 is continuously variable across the adjacent gear positions.

Figure 3:
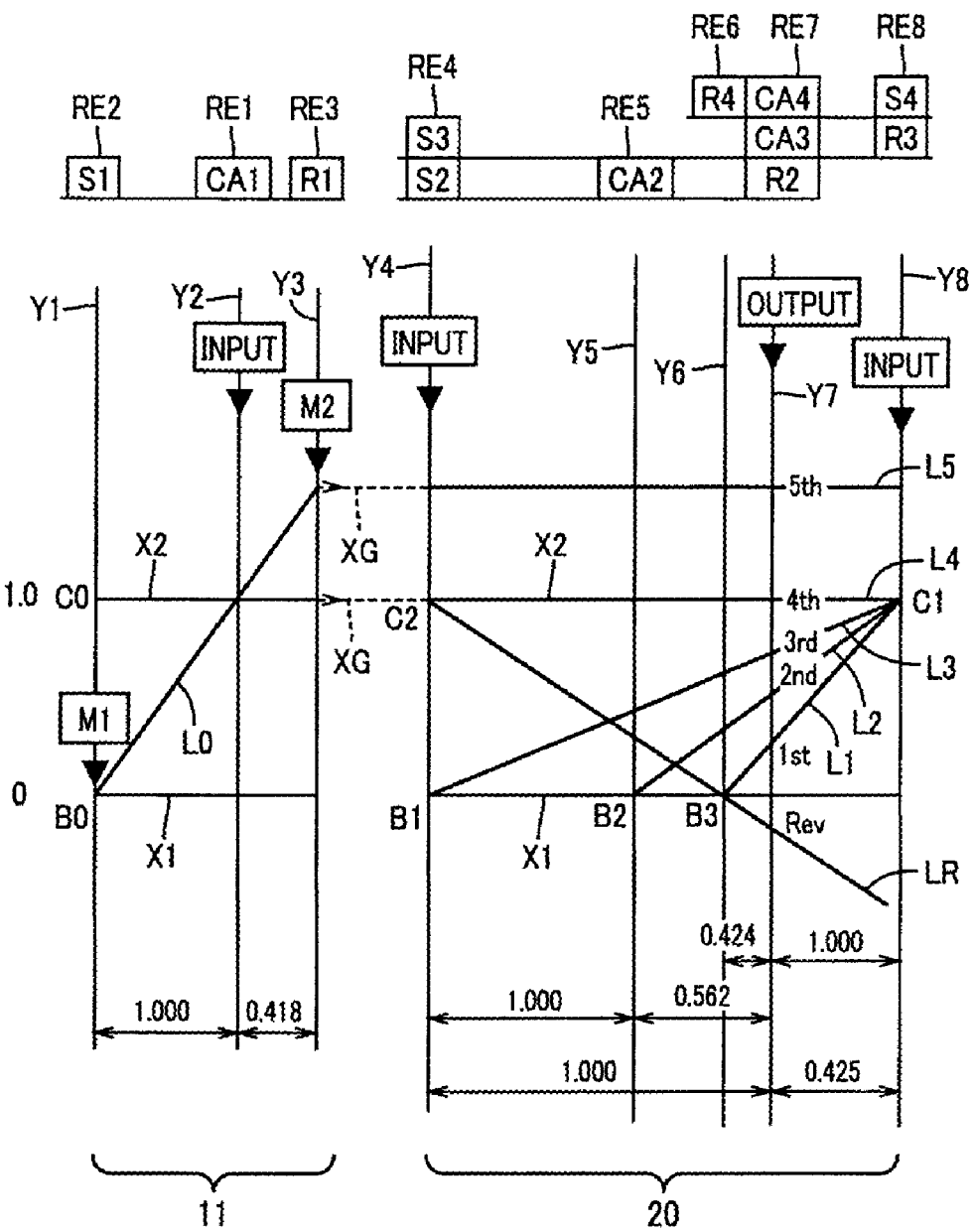
FIG. 3 is a collinear chart indicating relative rotating speeds of the hybrid vehicle drive system of FIG. 1 operated in the step-variable shifting state, in different gear positions of the drive system.

FIG. 3 is a collinear chart which indicates, by straight lines, a relationship among the rotating speeds of the rotary elements in each of the gear positions of the transmission mechanism 10, which is constituted by the differential portion 11 functioning as the continuously-variable transmission portion or first shifting portion, and the automatic transmission portion 20 functioning as the step-variable transmission portion or second shifting portion. The collinear chart of FIG. 3 is a rectangular two-dimensional coordinate system in which the gear ratios $\rho$ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio $\rho 1$ of the first planetary gear set 24. That is, the distance between the vertical lines Y1 and Y2 corresponds to "1", while the distance between the vertical lines Y2 and Y3 corresponds to the gear ratio $\rho 1$. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Described by reference to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state (differential state) by releasing actions of the switching clutch C0 and brake B0, for instance, the first through third rotary elements RE1-RE3 are rotatable relative to each other, for example, at least the second rotary element RE2 and the third rotary element RE3 are rotatable relative to each other. In this case, the rotating speed of the first sun gear S1 represented by a point of intersection between the straight line L0 and the vertical line Y1 is raised or lowered by controlling the operating speed of the first electric motor M1, so that the rotating speed of the first carrier CA1 represented by the straight line L0 and the vertical line Y2, that is, the engine speed $N_E$ is raised or lowered, if the rotating speed of the first ring gear R1 determined by the vehicle speed V and represented by a point of intersection between the straight line L0 and the vertical line Y3 is substantially held constant.

When the switching clutch C0 is engaged, the first sun gear S1 and the first carrier CA1 are connected to each other, and the power distributing mechanism 16 is placed in the first non-differential state in which the above-indicated three rotary elements RE1, RE2, RE3 are rotated as a unit and the relative rotation of the second and third rotary elements RE2, RE3 is prevented, so that the straight line L0 is aligned with the horizontal line X2, so that the power transmitting member 18 is rotated at a speed equal to the engine speed $N_E$. When the switching brake B0 is engaged, on the other hand, the first sun gear S1 is fixed to the casing 12, and the power distributing mechanism 16 is placed in the second non-differential state in which the second rotary element RE2 is stopped and the relative rotation of the second and third rotary elements RE2, RE3 is prevented, so that the straight line L0 is inclined in the state indicated in FIG. 3, whereby the differential portion 11 functions as a speed increasing mechanism. Accordingly, the rotating speed of the first ring gear R1 represented by a point of intersection between the straight lines L0 and Y3, that is, the rotating speed of the power transmitting member 18 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22 and the second electric motor M2, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching clutch B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
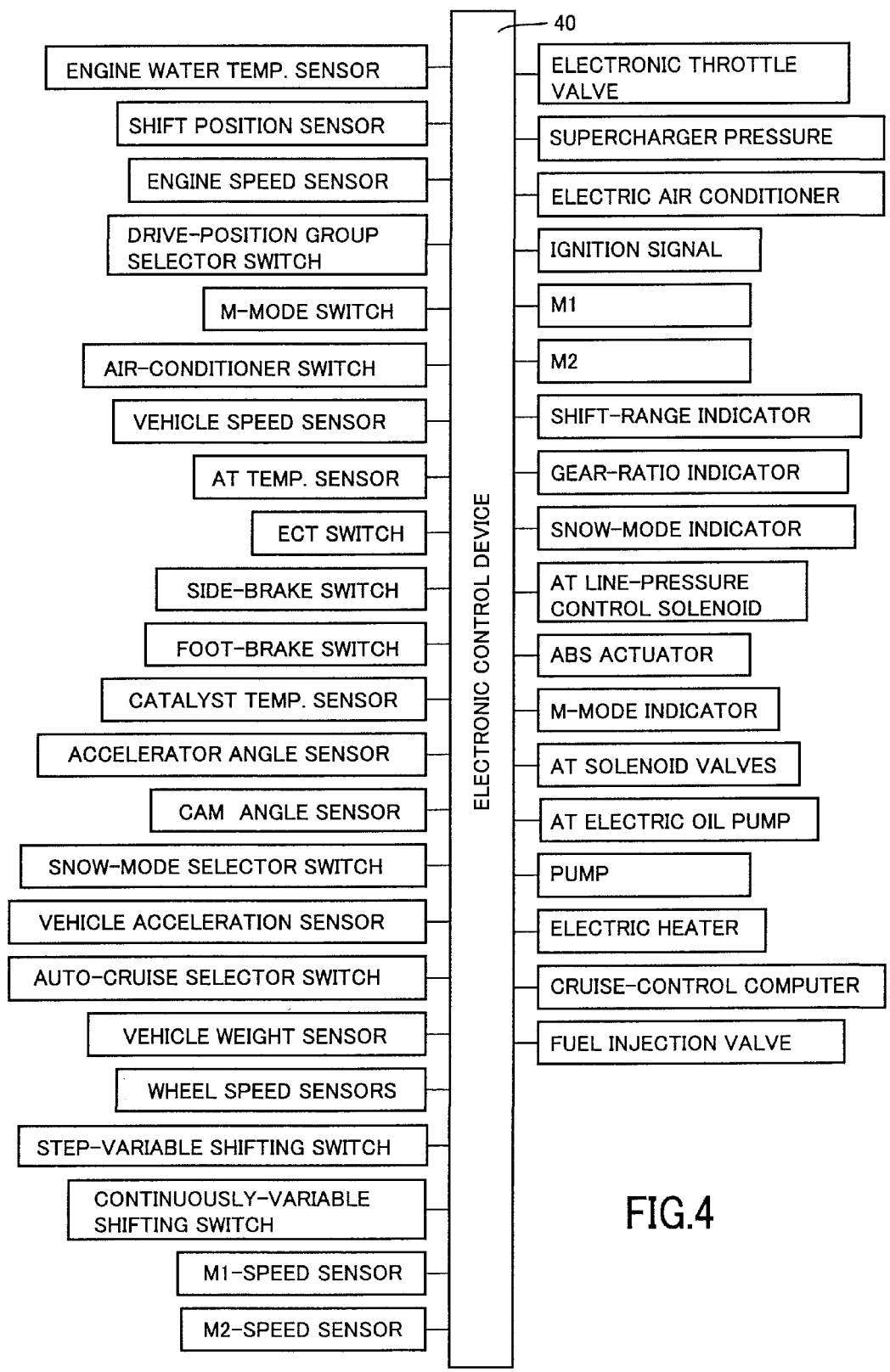
FIG. 4 is a view indicating input and output signals of an electronic control device provided in the drive system of the embodiment of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the transmission portion 20.

The electronic control device 40 is arranged to receive various sensors and switches shown in FIG. 4, various signals such as: a signal indicative of a temperature $TEMP_W$ of cooling water of the engine 8; a signal indicative of a selected operating position $P_{SH}$ of a shift lever; a signal indicative of the operating speed $N_E$ of the engine 8; a signal indicative of a value indicating a selected group of forward-drive positions of the transmission mechanism 10; a signal indicative of an M mode (motor drive mode); a signal indicative of an operated state of an air conditioner; a signal indicative of a vehicle speed V corresponding to the rotating speed $N_{OUT}$ of the output shaft 22; a signal indicative of a temperature $T_{OIL}$ of a working oil of the automatic transmission portion 20; a signal indicative of an operated state of a side brake; a signal indicative of an operated state of a foot brake; a signal indicative of a temperature of a catalyst; a signal indicative of an amount of operation in the form of an angle of operation $A_{CC}$ of an accelerator pedal, which represents a vehicle output required by a vehicle operator; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the differential portion 11 (power distributing mechanism 16) in the step-variable shifting state (locked state) in which the transmission mechanism 10 functions as a step-variable transmission; a signal indicative of a continuously-variable shifting switch provided to place the differential portion 11 in the continuously variable-shifting state (differential state) in which the transmission mechanism 10 functions as the continuously variable transmission; a signal indicative of a rotating speed $N_{M1}$ of the first electric motor M1 (hereinafter referred to as "first electric motor speed $N_{M1}$"); a signal indicative of a rotating speed $N_{M2}$ of the second electric motor M2 (hereinafter referred to as "second electric motor speed $N_{M2}$"); and a signal indicative of an amount of electric energy SOS stored in (a charging state of) an electric-energy storage device 60 (shown in FIG. 5).

The electronic control device 40 is further arranged to generate various signals such as: control signals to be applied to an engine output control device 43 (shown in FIG. 5) to control the output of the engine 8, such as a drive signal to drive a throttle actuator 97 for controlling an angle of opening $\theta_{TH}$ of an electronic throttle valve 96 disposed in a suction pipe 95 of the engine 8, a signal to control an amount of injection of a fuel by a fuel injecting device 98 into the suction pipe 95 or cylinders of the engine 8, a signal to be applied to an ignition device 99 to control the ignition timing of the engine 8, and a signal to adjust a supercharger pressure of the engine 8; a signal to operate the electric air conditioner; signals to operate the electric motors M1 and M2; a signal to operate a shift-range indicator for indicating the selected operating or shift position of the shift lever 48; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 (shown in FIG. 5) provided to control the hydraulic actuators of the hydraulically operated frictional coupling devices of the differential portion 11 and automatic transmission portion 20; a signal to drive an electrically operated oil pump used as a hydraulic pressure source for the hydraulic control unit 42; a signal to drive an electric heater; and a signal to be applied to a cruise-control computer.

FIG. 5 is a functional block diagram, for explaining major control functions of the electronic control device 40. Step-variable shifting control means 54 shown in FIG. 5 is arranged to determine whether a shifting action of the automatic transmission portion 20 should take place, that is, to determine the gear position to which the automatic transmission portion 20 should be shifted. This determination is made on the basis of a condition of the vehicle in the form of the vehicle speed V and an output torque $T_{OUT}$ of the automatic transmission portion 20, and according to a shifting boundary line map (shifting control relation or map) which is stored in memory means 56 and which represents shift-up boundary lines indicated by solid lines in FIG. 5 and shift-down boundary lines indicated by one-dot chain lines in FIG. 5. The step-variable shifting control means 54 generates commands (shifting commands or hydraulic control command) to be applied to the hydraulic control unit 42, to selectively engage and release the respectively two hydraulically operated frictional coupling devices (except the switching clutch C0 and brake B0), for establishing the determined gear position of the automatic transmission portion 20 according to the table of FIG. 2. Described in detail, the step-variable shifting control means 54 commands the hydraulic control unit 42 to release the released-side coupling device and engage the engaged-side coupling device, for effecting the clutch-to-clutch shifting action of the automatic transmission portion 20. According to the generated commands, the hydraulic control unit 42 activates the appropriate solenoid-operated valves incorporated in the hydraulic control units 42, to activate the hydraulic actuators of the released-side and engaged-side coupling devices for effecting the clutch-to-clutch shifting action of the automatic transmission portion 20.

Hybrid control means 52 functions as continuously-variable shifting control means and is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio y0 of the differential portion 11 operating as the electrically controlled continuously variable transmission, while the transmission mechanism 10 is placed in the continuously-variable shifting state, that is, while the differential portion 11 is placed in the differential state. For instance, the hybrid control means 52 calculates a target (required) vehicle output at the present running speed V of the vehicle, on the basis of the angle of operation $A_{CC}$ of the accelerator pedal 46 used as an operator's required vehicle output and the vehicle running speed V, and calculate a target total vehicle output on the basis of the calculated target vehicle output and a required amount of generation of an electric energy by the first electric motor M1. The hybrid control means 52 calculates a target output of the engine 8 to obtain the calculated target total vehicle output, while taking account of a power transmission loss, a load acting on various devices of the vehicle, an assisting torque generated by the second electric motor M2, etc. The hybrid control means 52 controls the speed $N_E$ and torque $T_E$ of the engine 8, so as to obtain the calculated target engine output, and the amount of generation of the electric energy by the first electric motor M1.

Figure 7:
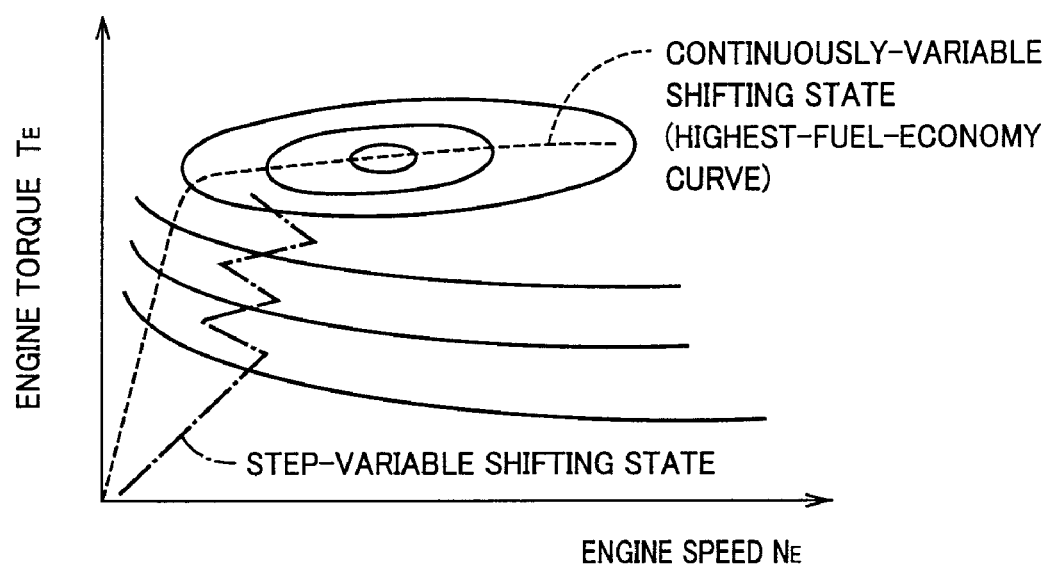
FIG. 7 is a view illustrating an example of a fuel consumption map defining a highest-fuel-economy curve of an engine, and explaining a difference between an operation of the engine in a continuously-variable shifting state (indicated by broken line) of the transmission mechanism and an operation of the engine in a step-variable shifting state (indicated by one-dot chain line) of the transmission mechanism.

The hybrid control means 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine speed $N_E$ for efficient operation of the engine 8, and the rotating speed of the power transmitting member 18 determined by the vehicle speed V and the selected gear position of the transmission portion 20. That is, the hybrid control means 52 determines a target value of the overall speed ratio $\gamma T$ of the transmission mechanism 10, so that the engine 8 is operated according to a stored highest-fuel-economy curve (fuel-economy map or relation) stored in memory means and indicated by broken line in FIG. 7. The target value of the overall speed ratio $\gamma T$ of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the output torque $T_E$ of the engine 8 (engine torque $T_E$). The hybrid control means 52 controls the speed ratio $\gamma 0$ of the differential portion 11, so as to obtain the target value of the overall speed ratio $\gamma T$, so that the overall speed ratio $\gamma T$ can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the drive system is provided with an electric path through which an electric energy generated by conversion of a portion of a drive force of the engine 8 is converted into a mechanical energy.

The hybrid control means 52 is further arranged to hold the engine speed $N_E$ substantially constant or at a desired value, by controlling the first electric motor speed $N_{M1}$ and/or the second electric motor speed $N_{M2}$ owing to the electric CVT function of the differential portion 11, irrespective of whether the vehicle is stationary or running. In other words, the hybrid control means 52 is capable of controlling the first electric motor speed $N_{M1}$ and/or the second electric motor speed $N_{M2}$ as desired while holding the engine speed $N_E$ substantially constant or at a desired value.

To raise the engine speed $N_E$ during running of the vehicle, for example, the hybrid control means 52 raises the first electric motor speed $N_{M1}$ while the second electric motor speed $N_{M2}$ determined by the vehicle speed (speed of the drive wheels 38) is held substantially constant, as is apparent from the collinear chart of FIG. 3. To hold the engine speed $N_E$ substantially constant during a shifting action of the automatic transmission portion 20, the hybrid control means 52 changes the first electric motor speed $N_{M1}$ in a direction opposite to the direction of change of the second electric motor speed $N_{M2}$ caused by the shifting action of the automatic transmission portion 20, while the engine speed $N_E$ is held substantially constant.

The hybrid control means 52 includes engine output control means functioning to control the engine 8, so as to provide a required output, by controlling the throttle actuator 97 to open and close the electronic throttle valve 96, and controlling an amount and time of fuel injection by the fuel injecting device 98 into the engine 8, and/or the timing of ignition of the igniter by the ignition device 99, alone or in combination. For instance, the hybrid control means 52 is basically arranged to control the throttle actuator 97 on the basis of the angle of operation $A_{CC}$ of the accelerator pedal and according to a predetermined stored relationship (not shown) between the angle of operation $A_{CC}$ and the opening angle $\theta_{TH}$ of the electronic throttle valve 96 such that the opening angle $\theta_{TH}$ increases with an increase of the angle of operation amount $A_{CC}$. The engine output control device 43 controls the throttle actuator 97 to open and close the electronic throttle valve 96, controls the fuel injecting device 98 to control the fuel injection, and controls the ignition device 99 to control the ignition timing of the igniter, for thereby controlling the torque of the engine 8, according to the commands received from the hybrid control means 52.

Figure 6:
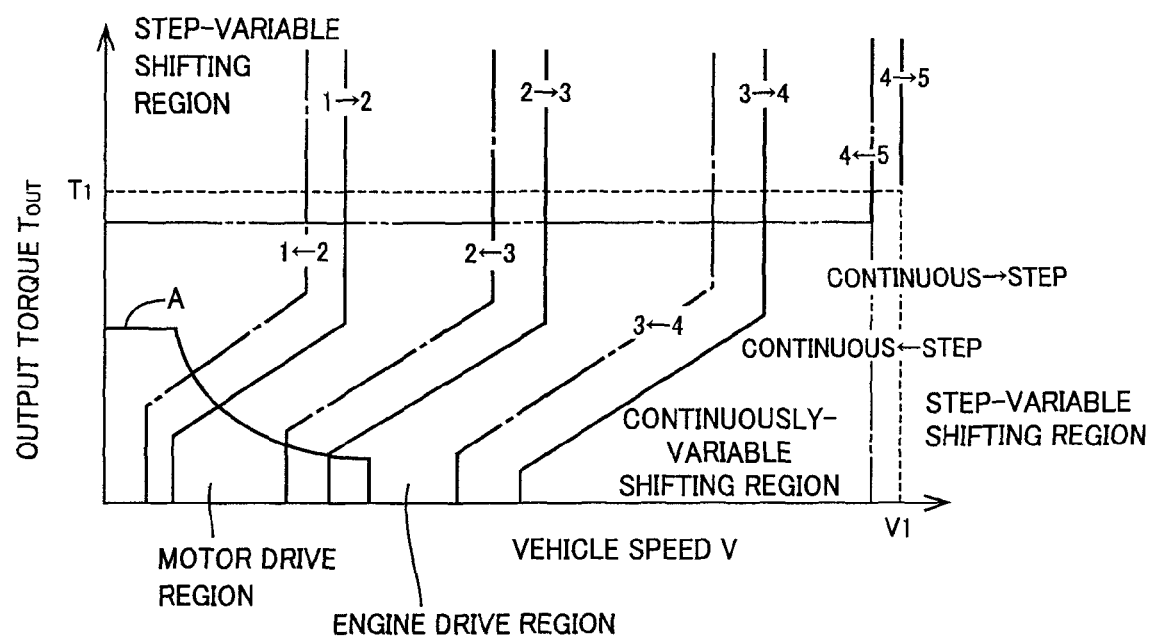
FIG. 6 is a view illustrating an example of a stored shifting boundary line map used for determining a shifting action of an automatic transmission portion, an example of a stored switching boundary line map used for switching the shifting state of a transmission mechanism, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

The hybrid control means 52 is capable of establishing a motor-drive mode to drive the vehicle by the electric motor, by utilizing the electric CVT function (differential function) of the differential portion 11, irrespective of whether the engine 8 is in the non-operated state or in the idling state. Solid line A in FIG. 6 represents an example of a boundary line defining an engine-drive region and a motor-drive region, for switching the vehicle drive power source for starting and driving (hereinafter collectively referred to as "driving") the vehicle, between the engine 8 and the electric motor (e.g., second electric motor M2). In other words, the vehicle drive mode is switchable between a so-called "engine drive mode" corresponding to the engine-drive region in which the vehicle is started and driven with the engine 8 used as the drive power source, and the so-called "motor-drive mode" corresponding to the motor-drive region in which the vehicle is driven with the second electric motor M2 used as the drive power source. A predetermined stored relationship representing the boundary line (solid line A) of FIG. 6 for switching between the engine-drive mode and the motor-drive mode is an example of a drive-power-source switching map (drive-power-source map) in a two-dimensional coordinate system defined by control parameters in the form of the vehicle speed V and a drive-force-related value in the form of the output torque $T_{OUT}$. This drive-power-source switching map is stored in the memory means 56, together with the shifting boundary line map (shifting map) indicated by solid lines and one-dot chain lines in FIG. 6.

The hybrid control means 52 determines whether the vehicle condition is in the motor-drive region or engine-drive region, and establishes the motor-drive mode or engine-drive mode. This determination is made on the basis of the vehicle condition represented by the vehicle speed V and the required output torque $T_{OUT}$, and according to the drive-power-source switching map of FIG. 6. As is understood from FIG. 6, the motor-drive mode is generally established by the hybrid control means 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. Usually, therefore, the vehicle is started in the motor-drive mode, rather than in the engine-drive mode. When the vehicle condition upon starting of the vehicle is outside the motor-drive region defined by the drive-power-source switching map of FIG. 6, as a result of an increase of the required output torque $T_{OUT}$ or engine torque $T_E$ due to an operation of the accelerator pedal 45, the vehicle may be started in the engine-drive mode.

For reducing a dragging of the engine 8 in its non-operated state and improving the fuel economy in the motor-drive mode, the hybrid control means 52 is arranged to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed 1 is controlled so as to be freely rotated to have a negative speed $N_{M1}$.

The hybrid control means 52 is further capable of performing a so-called "drive-force assisting" operation (torque assisting operation) to assist the engine 8, by supplying an electric energy from the first electric motor M1 or the electric-energy storage device 60 to the second electric motor M2, so that the second electric motor M2 is operated to transmit a drive torque to the drive wheels 38. Thus, the second electric motor M2 may be used in addition to the engine 8, in the engine-drive mode.

The hybrid control means 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOS stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control means 52 is further arranged to place the first electric motor M1 in a non-load state by cutting off an electric current applied from the electric energy storage device 60 to the first electric motor M1 through the inverter 58. When the first electric motor M1 is placed in the non-load state, the first electric motor M1 is permitted to be freely rotated, and the differential portion is placed in a state similar to the power cut-off state in which power cannot be transmitted through the power transmitting path within the differential portion 11, and no output can be generated from the differential portion 11. Namely, the hybrid control means 52 functions as electric-motor control means configured to place the first electric motor M1 in the non-load state, for thereby placing the differential portion 11 in a neutral state in which the power transmitting path is electrically cut off.

High-speed-gear determining means 62 is arranged to determine whether the gear position to which the transmission mechanism 10 should be shifted on the basis of the vehicle condition and according to the shifting boundary line map stored in the memory means 56 and indicated in FIG. 6 by way of example is a high-speed-gear position, for example, the fifth gear position. This determination is made by determining whether the gear position selected by the step-variable shifting control means 54 is the fifth gear position or not, for determining which one of the switching clutch C0 and brake B0 should be engaged to place the transmission mechanism 10 in the step-variable shifting state.

Switching control means 50 is arranged to selectively switch the transmission mechanism 10 between the continuously-variable shifting state and the step-variable shifting state, that is, between the differential state and the locked state, by engaging and releasing the coupling devices (switching clutch C0 and brake B0) on the basis of the vehicle condition. For example, the switching control means 50 is arranged to determine whether the shifting state of the transmission mechanism 10 (differential portion 11) should be changed, on the basis of the vehicle condition represented by the vehicle speed V and the required output torque $T_{OUT}$ and according to the switching boundary line map (switching control map or relation) stored in the memory means 56 and indicated by two-dot chain line in FIG. 6 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state. The switching control means 50 places the transmission mechanism 10 in the continuously-variable shifting state or step-variable shifting state, depending upon whether the vehicle condition is in the continuously-variable shifting region or in the step-variable shifting region. Thus, the switching control means 50 limits the electrically controlled differential function of the differential portion 11 by placing the differential portion 11 in the step-variable shifting state by controlling the switching clutch C0 and/or the switching brake B0. That is, the switching control means 50 functions as differential limiting means for limiting the operation of the differential portion 11 as the electrically controlled continuously variable transmission.

Described in detail, when the switching control means 50 determines that the vehicle condition is in the step-variable shifting region, the switching control means 50 disables the hybrid control means 52 to implement a hybrid control or continuously-variable shifting control, and enables the step-variable shifting control means 54 to implement a predetermined step-variable shifting control in which the transmission portion 20 is automatically shifted according to the shifting boundary line map stored in the memory means 56 and indicated in FIG. 6 by way of example. FIG. 2 indicates the combinations of the engaging actions of the hydraulically operated frictional coupling devices C0, C1, C2, B0, B1, B2 and B3, which are stored in the memory means 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2.

When the high-speed-gear determining means 62 has determined that the transmission mechanism 10 should be shifted to the fifth gear position, for example, the switching control means 50 commands the hydraulic control unit 42 to release the switching clutch C0 and engage the switching brake B0, for enabling the differential portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanism 10 should be shifted to the fifth gear position, the switching control means 50 commands the hydraulic control unit 42 to engage the switching clutch C0 and release the switching brake B0, for enabling the differential portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, when the transmission mechanism 10 is switched to the step-variable shifting state by the switching control means 50, the differential portion 11 operable as the auxiliary transmission is placed in a selected one of two gear positions under the control of the switching control means 50 while the automatic transmission portion 20 connected in series to the differential portion 11 functions as a step-variable transmission, so that the transmission mechanism 10 as a whole functions as the so-called step-variable automatic transmission.

When the switching control means 50 has determined that the vehicle condition is in the continuously-variable shifting region for placing the transmission mechanism 10 in the continuously-variable shifting state, on the other hand, the switching control means 50 commands the hydraulic control unit 42 to release both of the switching clutch C0 and brake B0, for placing the differential portion 11 in the continuously-variable shifting state. At the same time, the switching control means 50 enables the hybrid control means 52 to implement the hybrid control, and commands the step-variable shifting control means 54 to select and hold a predetermined one of the gear positions, or to permit the automatic transmission portion 20 to be automatically shifted according to the shifting boundary line map stored in the map memory 56 and indicated in FIG. 6 by way of example. In the latter case, the variable-step shifting control means 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the switching control means 50 functions as the continuously variable transmission while the automatic transmission portion 20 connected in series to the differential portion 11 functions as the step-variable transmission, so that the transmission mechanism 10 provides a sufficient vehicle drive force, such that the input speed $N_{IN}$ of the automatic transmission portion 20 placed in one of the first through fourth gear positions, namely, the rotating speed $N_{18}$ of the power transmitting member 18 is continuously changed, so that the speed ratio of the transmission mechanism 10 when the transmission portion 20 is placed in one of those gear positions is continuously variable over a predetermined range. Accordingly, the speed ratio of the automatic transmission portion 20 is continuously variable across the adjacent gear positions, whereby the total speed ratio γT of the transmission mechanism 10 as a whole placed in the continuously-variable shifting sate is continuously variable.

The maps of FIG. 6 will be described in detail. The shifting boundary line map (shifting control map or relation) shown in FIG. 6 by way of example and stored in the memory means 56 is used for determining whether the automatic transmission portion 20 should be shifted, and is defined in a two-dimensional coordinate system by control parameters consisting of the vehicle speed V and the drive-force-related value in the form of the required output torque $T_{OUT}$. In FIG. 6, the solid lines indicate the shift-up boundary lines, while the one-dot chain lines indicate the shift-down boundary lines.

The broken lines in FIG. 6 represent the upper vehicle-speed limit V1 and the upper output-torque limit T1 which are used for the switching control means 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high-output running state. The output torque $T_{OUT}$ is an example of the drive-force-related value which relates to the drive force of the hybrid vehicle. FIG. 6 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 6 constitute the stored switching boundary line map (switching control map or relation) used by the switching control means 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1. This switching boundary line map may be stored in the memory means 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control means 50 switches the transmission mechanism 10 in the step-variable shifting state by engaging the switching brake B0, when the actual vehicle speed V has exceeded the upper limit V1, or by engaging the switching clutch C0, when the output torque $T_{OUT}$ of the automatic transmission portion 20 has exceeded the upper limit T1.

The switching control means 50 may be arranged to place the transmission mechanism 10 in the step-variable shifting state even when the vehicle condition is in the continuously-variable shifting region, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 50 and electric lines interconnecting those components, which are associated with the electric path through which an electric energy generated by the first electric motor M1 is converted into a mechanical energy. The functional deterioration of the components may be caused by their failure or a drop of their temperatures. For example, the switching control means 50 determines whether there has arisen any functional failure or deterioration of the electric components such as the electric motors operable to operate the differential portion 11 as the electrically controlled continuously variable transmission, and places the transmission mechanism 10 in the step-variable shifting state upon determination that any functional failure or deterioration has arisen.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 38. The parameter may be: an actual value calculated on the basis of the angle of operation $A_{CC}$ of the accelerator pedal 45 or the opening angle of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission portion 20 and required vehicle drive force, which are calculated on the basis of the angle of operation $A_{CC}$ of the accelerator pedal 45 or the opening angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. Namely, the transmission mechanism 10 is effectively operated as the step-variable transmission of planetary gear type not including an electric path, during high-speed running of the vehicle.

On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle. Alternatively, the upper output-torque limit T1 is determined to place the transmission mechanism 10 in the step-variable shifting state in the high-output running state of the vehicle, on an assumption that the vehicle operator likes to feel a change of the engine speed during a shifting action of the transmission mechanism 10 rather than to improve the fuel economy of the vehicle, in the high-output running state of the vehicle. That is, the transmission mechanism 10 is operated as the step-variable transmission the speed ratio of which is changed in steps, rather than the continuously-variable transmission, when the vehicle is running in the high-output state.

Figure 8:
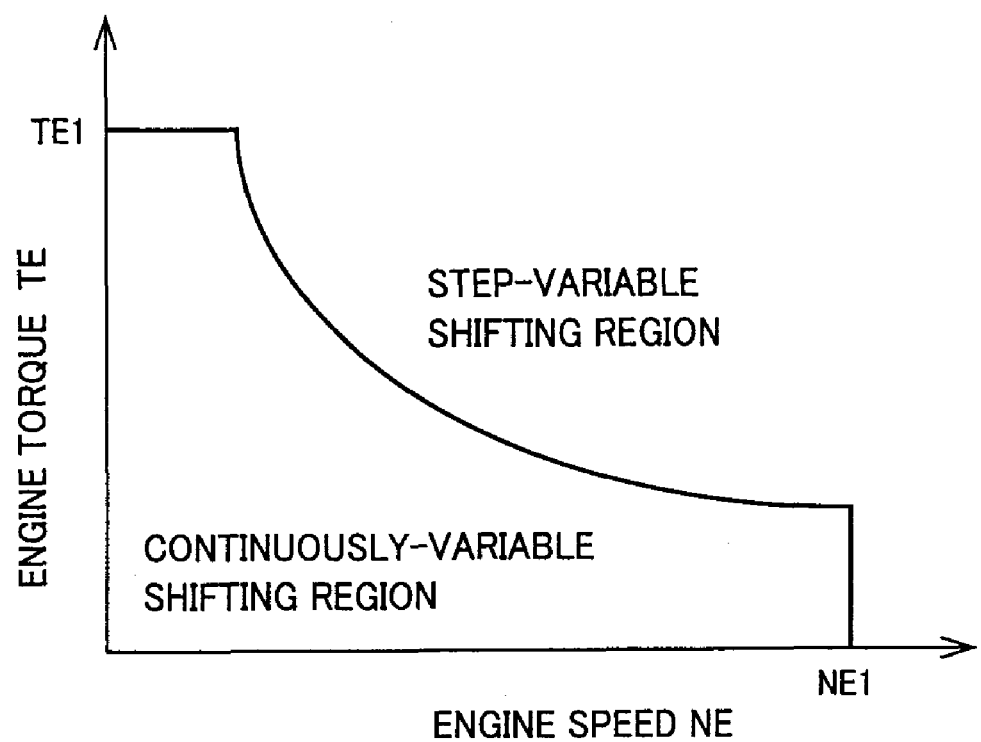
FIG. 8 is a view illustrating a stored relationship defining boundary lines between a continuously-variable shifting region and a step-variable shifting region, which relationship is used to map boundary lines defining the continuously-variable and step-variable shifting regions which are indicated by broken lines in FIG. 6.

Referring to FIG. 8, there is shown a switching boundary line map (switching control map or relation) which is stored in the memory means 56 and which defines engine-output lines serving as boundary lines used by the switching control means 50 to determine whether the vehicle condition is in the step-variable or continuously-variable shifting region. These engine-output lines are defined by control parameters in the form of the engine speed $N_E$ and the engine torque $N_T$. The switching control means 50 may use the switching boundary line map of FIG. 8 in place of the switching boundary line map of FIG. 6, to determine whether the vehicle condition is in the continuously-variable or step-variable shifting region, on the basis of the engine speed $N_E$ and engine torque $T_E$. The switching boundary line map of FIG. 6 may be based on the switching boundary line map of FIG. 8. In other words, the broken lines in FIG. 6 may be determined on the basis of the relation (map) of FIG. 8, in the two-dimensional coordinate system defined by the control parameters in the for of the vehicle speed V and the output torque $T_{OUT}$.

The step-variable shifting region defined by the switching boundary line map of FIG. 6 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 8 is defined as a high-torque drive region in which the engine torque $T_E$ is not lower than the predetermined upper limit TE1, or a high-speed drive region in which the engine speed $N_E$ is not lower than the predetermined upper limit NE1, or alternatively defined as a high-output drive region in which the output of the engine 8 calculated on the basis of the engine torque $N_T$ and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary lines of the switching boundary switching map of FIG. 8 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 functions as the electrically controlled continuously variable transmission.

In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors.

Namely, the upper limit TE1 is determined such that the first electric motor M1 can withstand the reaction torque when the engine output $T_E$ is not higher than the upper limit TE1, and the differential portion 11 is placed in the step-variable shifting state when the vehicle is in the high-output running state in which the engine torque $T_E$ is higher than the upper limit TE1. In the step-variable shifting state of the transmission portion 11, therefore, the first electric motor M1 need not withstand the reaction torque with respect to the engine torque $T_E$ as in the continuously-variable shifting state of the transmission portion 11, making it possible to reduce deterioration of durability of the first electric motor M1 while preventing an increase of its required size. In other words, the required maximum output of the first electric motor M1 in the present embodiment can be made smaller than its reaction torque capacity corresponding to the maximum value of the engine output $T_E$. That is, the required maximum output of the first electric motor M1 can be determined such that its reaction torque capacity is smaller than a value corresponding to the engine torque $T_E$ exceeding the upper limit TE1, so that the first electric motor M1 can be small-sized.

The maximum output of the first electric motor M1 is a nominal rating of this motor which is determined by experimentation in the environment in which the motor is operated. The above-described upper limit of the engine torque $T_E$ is determined by experimentation such that the upper limit is a value which is equal to or lower than the maximum value of the engine torque $T_E$, and below which the first electric motor M1 can withstand the reaction torque, so that the deterioration of durability of the first electric motor M1 can be reduced.

Figure 9:
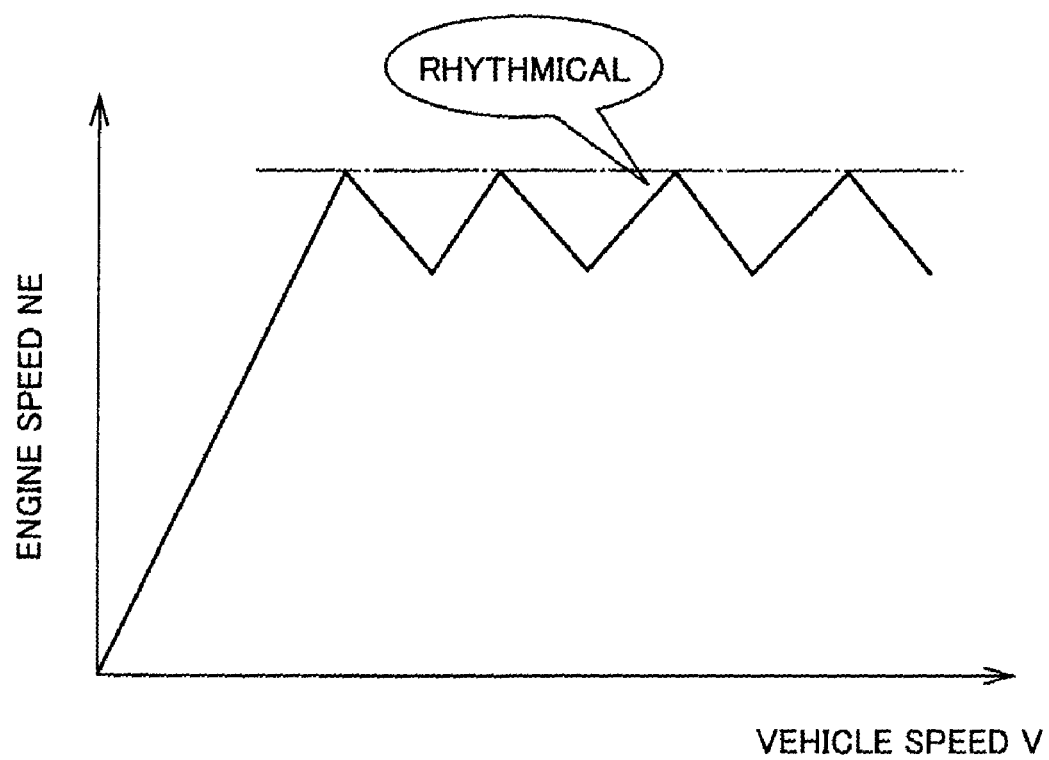
FIG. 9 is a view indicating an example of a change of the engine speed as a result of a shift-up action of the step-variable transmission.

According to the other concept, the transmission mechanism 10 is placed in the step-variable shifting state (fixed-speed-ratio shifting state), rather than in the continuously-variable shifting state, in the high-output running state of the vehicle in which the vehicle operator has a stronger desire for improved drivability of the vehicle rather than improved fuel economy. In this case, the engine speed $N_E$ changes with a shift-up action of the automatic transmission portion 20, assuring a comfortable rhythmic change of the engine speed $N_E$ as the transmission portion 20 is shifted up, as indicated in FIG. 9.

Figure 10:
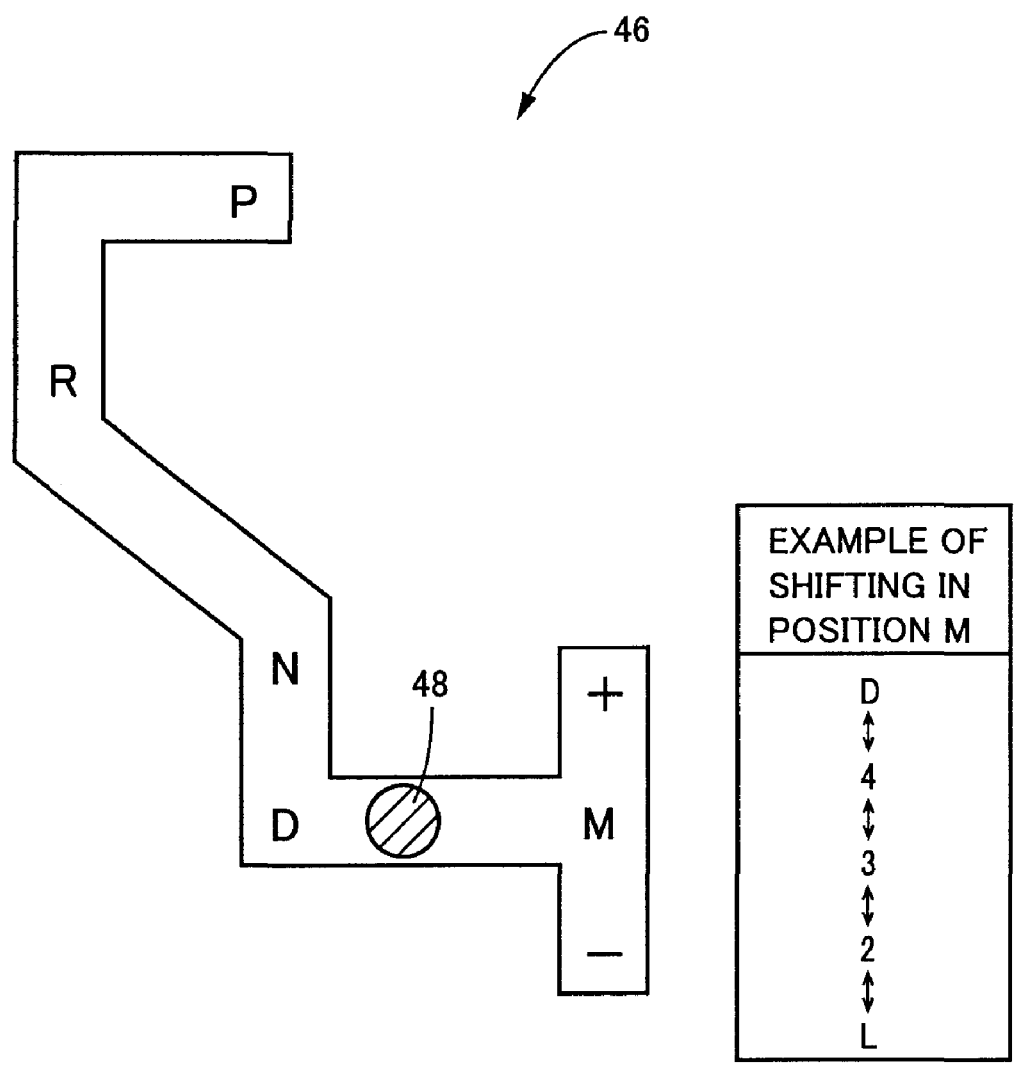
FIG. 10 is a view showing an example of a manually operated shifting device including a shift lever and operable to select one of a plurality of shift positions.

FIG. 10 shows an example of a manually operable shifting device in the form of a shifting device 46. The shifting device 46 includes the above-described shift lever 48, which is disposed laterally adjacent to an operator's seat, for example, and which is manually operated to select one of a plurality of positions consisting of a parking position P for placing the drive system 10 (namely, automatic transmission portion 20) in a neutral state in which a power transmitting path is disconnected with both of the first and second clutches C1, C2 (input clutches) placed in the released state, and at the same time the output shaft 22 of the automatic transmission portion 20 is in the locked state; a reverse-drive position R for driving the vehicle in the rearward direction; a neutral position N for placing the drive system 10 in the neutral state; an automatic forward-drive shifting position D; and a manual forward-drive shifting position M.

When the shift lever 48 is operated to a selected one of the shift positions, a manual valve incorporated in the hydraulic control unit 42 and operatively connected to the shift lever 48 is operated to control the hydraulic control unit 42, for establishing one of the reverse0drive position R, neutral position N, automatic forward-dive shifting position D, etc. indicated in the table of FIG. 2. In the automatic forward-drive position D or the manual forward-drive position M, one of the first through fifth gear positions ($1^{st}$ through $5^{th}$) indicated in the table of FIG. 2 is established by electrically controlling the appropriate solenoid-operated valves incorporated in the hydraulic control unit 42.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the clutches C1 and C2, as shown in the table of FIG. 2. In the drive positions R, D, M, the power transmitting path in the automatic transmission portion 20 is in the power-transmitting state established by engaging the first clutch C1 and/or the second clutch C2, as also shown in the table of FIG. 2.

Described in detail, a manual operation of the shift lever 48 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 48 from the neutral position N to the automatic forward-drive position D causes at least the first clutch C1 to be engaged for switching the power transmitting path in the automatic transmission portion 20 from the power-cut-off state to the power-transmitting state. The automatic forward-drive position D provides a highest-speed position, and positions "4" through "L" selectable in the manual forward-drive position M are engine-braking positions in which an engine brake is applied to the vehicle.

The manual forward-drive position M is located at the same position as the automatic forward-drive position D in the longitudinal direction of the vehicle, and is spaced from or adjacent to the automatic forward-drive position D in the lateral direction of the vehicle. The shift lever 48 is operated to the manual forward-drive position M, for manually selecting one of the above-indicated positions "D" through "L". Described in detail, the shift lever 48 is movable from the manual forward-drive position M to a shift-up position "+" and a shift-down position "−", which are spaced from each other in the longitudinal direction of the vehicle. Each time the shift lever 48 is moved to the shift-up position "+" or the shift-down position "−", the presently selected position is changed by one position. The five positions "D" through "L" have respective different lower limits of a range in which the overall speed ratio γT of the transmission mechanism 10 is automatically variable, that is, respective different lowest values of the overall speed ratio γT which corresponds to the highest output speed of the transmission mechanism 10. Namely, the five positions "D" through "L" select respective different numbers of the speed positions (gear positions) of the automatic transmission portion 20 which are automatically selectable, so that the lowest overall speed ratio γT available is determined by the selected number of the gear positions. The shift lever 48 is biased by biasing means such as a spring so that the shift lever 48 is automatically returned from the shift-up position "+" and shift-down position "−" back to the manual forward-drive position M. The shifting device 46 is provided with a shift-position sensor 49 operable to detect the presently selected position of the shift lever 48, so that signals indicative of the presently selected operating position of the shift lever 48 and the number of shifting operations of the shift lever 48 in the manual forward-shifting position M are applied to the electronic control device 40.

When the shift lever 48 is operated to the automatic forward-drive position D, the switching control means 50 effects an automatic switching control of the transmission mechanism 10 according to the stored switching boundary line map indicated in FIG. 6, and the hybrid control means 52 effects the continuously-variable shifting control of the power distributing mechanism 16, while the step-variable shifting control means 54 effects an automatic shifting control of the automatic transmission 20. When the transmission mechanism 10 is placed in the step-variable shifting state, for example, the shifting action of the transmission mechanism 10 is automatically controlled to select an appropriate one of the first through the fifth gear position indicated in FIG. 2. When the drive system is placed in the continuously-variable shifting state, the speed ratio of the power distributing mechanism 16 is continuously changed, while the shifting action of the automatic transmission 20 is automatically controlled to select an appropriate one of the first through fourth gear positions, so that the overall speed ratio γT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 48 is operated to the manual forward-drive position M, on the other hand, the shifting action of the transmission mechanism 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the shift positions. When the transmission mechanism 10 is placed in the step-variable shifting state, for example, the shifting action of the transmission mechanism 10 is automatically controlled within the above-indicated predetermined range of the overall speed ratio γT. When the transmission mechanism 10 is placed in the step-variable shifting state, the speed ratio of the power distributing mechanism 16 is continuously changed, while the shifting action of the automatic transmission 20 is automatically controlled to select an appropriate one of the gear positions the number of which is determined by the manually selected one of the shift positions, so that the overall speed ratio γT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

As described above, the transmission mechanism 10 in the present embodiment is provided with the automatic transmission portion 20 in addition to the differential portion 11, and the automatic transmission portion 20 performs a clutch-to-clutch shifting action under the control of the step-variable shifting control means 54, on the basis of the running state of the vehicle and according to the shifting boundary line map shown in FIG. 6 by way of example. The clutch-to-clutch shifting action of the automatic transmission portion 20 is performed with a so-called "overlap control" implemented so that the input speed $N_{IN}$ of the automatic transmission portion 20 changes in a predetermined state to reduce the shifting shock of the automatic transmission 20. Namely, the engaging pressures of the released-side coupling device and the engaged-side coupling device that are released and engaged to perform the shifting action of the automatic transmission portion 20 are controlled on the basis of an amount of racing (hereinafter referred to as "racing amount") F of the input speed $N_{IN}$ of the automatic transmission portion 20.

The racing amount F corresponds to an amount of overlap of an engaging torque of the released-side coupling device and an engaging torque of the engaged-side coupling device. The racing amount decreases with an increase of the amount of overlap, and increases with a decrease of the amount of overlap. The above-indicated predetermined state of change of the input speed $N_{IN}$ of the automatic transmission portion 20 is a state of change, for example, a rate of change of the input speed $N_{IN}$, which is obtained by experimentation. For instance, the predetermined rate of change $N_{IN}'=dN_{IN}/dt$ of the input speed $N_{IN}$ during a shifting action of the automatic transmission portion 20 which is determined by the vehicle speed V and the speed ratio γ of the automatic transmission portion 20 is obtained for optimizing the input speed $N_{IN}$, so as to provide a best compromise between a high shifting response with a relatively high value of the change rate $N_{IN}'$, which is felt comfortable by the vehicle operator, and a low shifting response with a relatively low value of the change rate $N_{IN}'$, which tends to reduce the shifting shock of the automatic transmission portion 20, that is, to provide a best compromise between shortening of the required shifting time and reduction of the shifting shock.

Described in detail, the step-variable shifting control means 54 includes racing-amount control means 64 for controlling the racing amount F of the input speed $N_{IN}$ during each clutch-to-clutch shifting action of the automatic transmission portion 20, and is configured to control the clutch-to-clutch shifting action of the automatic transmission portion 20 such that the input speed $N_{IN}$ changes in the predetermined state, so as to reduce the shifting shock.

The racing-amount control means 64 is configured to control the hydraulic commands (shifting commands) to be applied from the step-variable shifting control means 54 to the hydraulic control unit 42, for controlling the pressures and releasing and engaging timings of the released-side coupling device and the engaged-side coupling device, so as to establish the predetermined state of change of the input speed $N_{IN}$ during the clutch-to-clutch shifting action of the automatic transmission portion 20 which is performed by the releasing and engaging actions of those released-side and engaged-side coupling devices under the control of the step-variable shifting control means 54.

For example, the racing-amount control means 64 learns the engaging pressures of the released-side and engaged-side coupling devices, that are to be used for the next occurrence of the same clutch-to-clutch shifting action of the automatic transmission portion 20. This learning is based on the racing amount F of the input speed $N_{IN}$ upon initiation of an inertia phase of the present clutch-to-clutch shifting action of the automatic transmission portion 20 performed under the control of the step-variable shifting control means 54. The racing-amount control means 64 is further configured to prepare maps of the learned values of the pressures of the released-side and engaged-side coupling devices, which correspond to different values of the engine torque $T_E$ and different values of the vehicle speed V at which the clutch-to-clutch shifting action in question is performed. The prepared maps are stored in a memory. The maps for each combination of the values of the engine torque $T_E$ and vehicle speed V are updated by replacing the presently stored values of the pressures of the released-side and engaged-side coupling devices with the last learned values.

That is, the racing-amount control means 64 is arranged to adjust the amount of overlap of the engaging torques of the released-side and engaged-side coupling devices during each clutch-to-clutch shifting action of the automatic transmission portion 20, by controlling or changing the pressures and releasing and engaging timings of these two coupling devices on the basis of the racing amount F of the input speed $N_{IN}$.

Where the racing amount F of the input speed $N_{IN}$ during the clutch-to-clutch shifting action is larger than a predetermined value, for example, that is, where the clutch-to-clutch shifting action is performed with a relatively small value of the amount of overlap, the racing-amount control means 64 increases the engaging pressure of the released-side coupling device and/or the engaging pressure of the engaged-side coupling device, to reduce the racing amount F, which is/are to be used for the next clutch-to-clutch shifting action, so that the amount of overlap during the next clutch-to-clutch shifting action is increased (to increase the degree of the tie-up state) to reduce the racing amount F toward the optimum value.

Where the racing amount F of the input speed $N_{IN}$ during the clutch-to-clutch shifting action is smaller than a predetermined value, on the other hand, that is, where the clutch-to-clutch shifting action is performed with a relatively large value of the amount of overlap, the racing-amount control means 64 reduces the engaging pressure of the released-side coupling device and/or the engaging pressure of the engaged-side coupling device, to reduce the racing amount F, which is/are to be used for the next clutch-to-clutch shifting action, so that the amount of overlap during the next clutch-to-clutch shifting action is reduced (to reduce the degree of the tie-up state) to increase the racing amount F toward the optimum value.

The above-described optimum value of the racing amount is a target value obtained by experimentation for reducing the shifting shock and improving the comfort of the shifting action as felt by the vehicle operator.

The racing-amount control means 64 is configured to obtain a speed difference $\Delta N_{IN}$ ($=N_{INR}-N_{INC}$) between an actual value $N_{IN}$ of the input speed $N_{IN}$ of the automatic transmission portion 20, and a calculated value $N_{INC}$ of the input speed $N_{IN}$. The racing-amount control means 64 calculates the speed difference $\Delta N_{IN}$ from a product of the actual output shaft speed $N_{OUT}$ and the speed ratio $\gamma$ of the automatic transmission portion 20, and determines a maximum value $\Delta N_{INMAX}$ of the speed difference $\Delta N_{IN}$ as the racing amount F of the input speed $N_{IN}$. Where $\Delta N_{IN}(n-1)<\Delta N_{IN}(n)$, and $\Delta N_{IN}(N)>\Delta N_{IN}(n+1)$, the value $N_{IN}(n)$ is determined as the maximum value $\Delta N_{INMAX}$.

Thus, each clutch-to-clutch shifting action of the automatic transmission portion 20 is performed with a relatively small amount of racing of the input speed $N_{IN}$ upon initiation of the inertia phase of the clutch-to-clutch shifting action, so that the racing-amount control means 64 can effect a learning operation to obtain the engaging pressure of the released-side coupling device and/or the engaging pressure of the engaged-side coupling device, which coupling devices are released and engaged to perform the clutch-to-clutch shifting action, so as to reduce the shifting shock and improve the comfort of the shifting action as felt by the vehicle operator. That is, the step-variable shifting control means 54 controls the clutch-to-clutch shifting action of the automatic transmission portion 20 such that the shifting action is performed with a racing of the input speed $N_{IN}$, by the releasing and engaging actions of the released-side and engaged-side coupling devices while at least one of the engaging pressures of these two coupling device is controlled to the learned value obtained by the racing-amount control means 64 so as to optimize the racing amount F of the input speed $N_{IN}$.

However, all clutch-to-clutch shifting actions of the automatic transmission portion 20 are not necessarily performed with a racing of the input speed $N_{IN}$, when the engaging pressure of the released-side coupling device and/or the engaging pressure of the engaged-side coupling device is controlled to the learned value. For example, the clutch-to-clutch shifting action is not performed with a racing of the input speed $N_{IN}$, where the hydraulic actuator for the released-side or engaged-side coupling device, or the solenoid-operated value incorporated in the hydraulic control unit 42 for controlling the hydraulic actuator has a variation in its response speed due to a change of the temperature $T_{OIL}$ of the working oil of the automatic transmission portion 20.

For instance, the clutch-to-clutch shifting action of the automatic transmission portion 20 may be performed in a tie-up state without a racing of the input speed $N_{IN}$, and with a temporary drop of the rotating speeds of the rotary elements of the automatic transmission portion 20. In the tie-up state, there arises a temporary drop of the output torque $T_{OUT}$, giving rise to generation of the shifting shock.

A known power transmitting device wherein a fluid-operated device is disposed in a power transmitting path between a step-variable transmission and an engine is able to deal with a tie-up phenomenon during a shifting action of the step-variable transmission, since the fluid-operated device permits a speed difference between the rotary element on the side of the engine and the rotary element on the side of the step-variable transmission, so that a drop of the engine speed due to the tie-up phenomenon is reduced to reduce the shifting shock.

In the transmission mechanism 10 in the present embodiment, a fluid-operated device is not disposed in a power transmitting path between the engine 8 and the automatic transmission portion 20. However, the engine speed $N_E$ can be controlled as needed, irrespective of a temporary drop of the rotating speed of the rotary element of the automatic transmission portion 20, for example, a temporary drop of the input speed $N_{IN}$, due to the tie-up phenomenon. Accordingly, the drop of the engine speed $N_E$ due to the tie-up phenomenon can be reduced to reduce the shifting shock.

To reduce the shifting shock when the clutch-to-clutch shifting action of the automatic transmission portion 20 is performed in the tie-up state under the control of the step-variable shifting control means 54, the hybrid control means 52 controls the first electric motor M1 to prevent a drop of the engine speed $N_E$ due to the tie-up phenomenon, while utilizing the differential function of the differential portion 11.

It is noted, however, that the transmission mechanism 10 (differential portion 11 or power distributing mechanism 16) in the present embodiment is switchable between the continuously-variable shifting state (differential state) and the step-variable shifting state (locked state), the control of the switching control means 50 which selects one of the continuously-variable and step-variable shifting states on the basis of the vehicle condition.

The engine speed NE can be controlled as needed while the differential portion 11 is placed in the continuously-variable shifting state (differential state). While the differential portion 11 is placed in the non-continuously-variable shifting state, on the other hand, the engine 8 and the automatic transmission portion 20 are mechanically connected to each other, so that the engine speed $N_E$ may be directly influenced by the tie-up phenomenon of the clutch-to-clutch shifting action. Accordingly, the differential portion 11 placed in the non-continuously-variable shifting state may not permit reduction of the shifting shock, unlike the differential portion 11 placed in the continuously-variable shifting state (differential state).

To reduce the shifting shock in the tie-up state of the clutch-to-clutch shifting action of the automatic transmission portion 20, the switching control means 50 holds the differential portion 11 in continuously-variable shifting state, or switches the differential portion 11 from the non-continuously-variable shifting state to the continuously-variable shifting state, so that the engine speed $N_E$ can be controlled as needed owing to the differential function of the differential portion 11 controlled by the hybrid control means 52.

Described in detail, under-shifting determining means 80 is provided to determine whether the automatic transmission portion 20 has been commanded by the step-variable shifting control means 54 to perform a shifting action. This determination by the under-shifting determining means 80 is made by determining whether the step-variable shifting control means 54 has commanded the hydraulic control unit 42 to effect a clutch-to-clutch shifting action of the automatic transmission portion 20 for establishing the gear position selected on the vehicle condition and according to the shifting boundary line map indicated in FIG. 6. The automatic transmission portion 20 is shifted to the selected gear position by the releasing and engaging actions of the appropriate two coupling devices. The under-shifting determining means 80 is further configured to determine whether the shifting action of the automatic transmission portion 20 under the control of the step-variable shifting control means 54 is completed. For example, this determination is made by determining whether a predetermined shifting time of the automatic transmission portion 20 which is obtained by experimentation has elapsed, or whether an actual value of the input speed $N_{IN}$ of the automatic transmission portion 20 has become substantially equal to a value of the input speed $N_{IN}$ after the shifting action (namely, the input speed NIN determined by the vehicle speed and the speed ratio γ of the automatic transmission portion 20 established after the shifting action). When the under-shifting determining means 80 determines that the shifting action of the automatic transmission portion 20 is performed but not completed, the under-shifting determining means 80 determines that the automatic transmission portion 20 is under a clutch-to-clutch shifting action under the control of the step-variable shifting control means 54.

Tie-up determining means 82 is operated, upon determination by the under-shifting determining means 80 that the automatic transmission portion 20 is under a clutch-to-clutch shifting action under the control of the step-variable shifting control means 54, to determine whether the clutch-to-clutch shifting action is in a tie-up state. For example, this determination by the tie-up determining means 82 is made by determining whether a rate of reduction $N_{IN}'$ ($=dN_{IN}/dt$) of the input speed $N_{IN}$ of the automatic transmission portion 20 has reached a predetermined value A. This predetermined value A is a tie-up threshold value of the rate of change $N_{IN}'$ above which the clutch-to-clutch shifting action is considered to be in the tie-up state. This tie-up threshold value is obtained by experimentation and stored in a memory.

The above-described switching control means 50 functions as differential-state switching control means for switching the differential portion 11 to the continuously-variable shifting state (differential state) when the under-shifting determining means 80 has determined that the automatic transmission portion 20 is under the clutch-to-clutch shifting action under the control of the step-variable shifting control means 54 while the differential portion 11 is placed in the non-continuously-variable shifting state (locked state), and when the tie-up determining means 82 has determined that the clutch-to-clutch shifting action is in the tie-up state. The differential-state switching control means commands the hydraulic control unit 42 to release the switching clutch C0 or brake B0 placed in the engaged state, for permitting the differential portion 11 to function as an electrically controlled continuously-variable transmission, so that the engine speed $N_E$ can be changed as needed under the control of the hybrid control means 52.

For instance, the switching control means 50 temporarily holds the differential portion 11 in the continuously-variable shifting state (differential state) for a predetermined length of time, when the under-shifting determining means 80 has determined that the automatic transmission portion 20 is under the clutch-to-clutch shifting action while the differential portion 11 is placed in the non-continuously-variable shifting state (locked state) and when the die-up determining means 82 has determined that the clutch-to-clutch shifting action is in the tie-up state. The predetermined length of time is obtained by experimentation as a time period during which an influence of the tie-up phenomenon can be avoided. The switching control means 50 switches the differential portion 11 back to the non-continuously-variable shifting state after the predetermined length of time has passed.

The switching control means 50 functioning as the differential-state switching control means is further configured to hold the differential portion 11 in the continuously-variable shifting state (differential state), when the under-shifting determining means 80 has determined that the automatic transmission portion 20 is under the clutch-to-clutch shifting action while the differential portion 11 is placed in the continuously-variable shifting state (differential state) and when the tie-up determining means 82 has determined that the clutch-to-clutch shifting action is in the tie-up state. In this case, the switching clutch C0 or brake B0 is kept in the released state, to permit the differential portion 11 to function as the electrically controlled continuously-variable transmission.

The hybrid control means 52 controls the first electric motor M1 to prevent a drop of the engine speed $N_E$, while utilizing the differential function of the differential portion 11, when the under-shifting determining means 80 has determined that the automatic transmission portion 20 is under the clutch-to-clutch shifting action and when the tie-up determining means 82 has determined that the clutch-to-clutch shifting action is in the tie-up state. Namely, the hybrid control means 52 controls the first electric motor M1 to prevent the drop of the engine speed NE due to the tie-up phenomenon, for thereby reducing the shifting shock upon the clutch-to-clutch shifting action while the differential portion 11 is placed in the continuously-variable shifting state by the switching control means 50.

The tie-up state of the clutch-to-clutch shifting action covers different degrees of the tie-up from a light tie-up to a heavy tie-up. The light tie-up involves a small amount of temporary reduction of the output torque $T_{OUT}$ with a small amount of drop of the input speed $N_{IN}$ during the clutch-to-clutch shifting action, while the heavy tie-up involves a large amount of temporary reduction of the output torque $T_{OUT}$ with a large amount of drop of the input speed $N_{IN}$ due to a large amount of the above-described overlap. The tie-up determining means 82 determines whether the clutch-to-clutch shifting action is in any degree of the tie-up state from the light tie-up to the heavy tie-up.

Where the drop of the engine speed $N_E$ is prevented by the hybrid control means 52 by controlling the first electric motor M1 and owing to the differential function of the differential portion 11 placed in the continuously-variable shifting state while the clutch-to-clutch shifting action is in the tie-up state, the power transmitting path from the engine 8 to the drive wheels 38 is not cut off, so that the shifting shock of the clutch-to-clutch shifting can be effectively reduced. Where the clutch-to-clutch shifting action is in the heavy tie-up state, however, there is a risk of failure to avoid the influence of the tie-up phenomenon since the power transmitting path is not cut off.

Where the clutch-to-clutch shifting action is in the heavy tie-up state with a large degree of the tie-up, the power transmitting path between the engine 8 and the automatic transmission portion 20 is cut off to more effectively avoid the influence of the tie-up phenomenon, for thereby effectively preventing an influence of the temporary drop of the rotating speed of the rotary element of the automatic transmission portion 20, for example, the temporary drop of the input speed $N_{IN}$ of the automatic transmission portion 20.

Described in detail, the tie-up determining means 82 includes heavy-tie-up determining means 84 for determining whether the clutch-to-clutch shifting action is in the heavy tie-up state. That is, when the tie-up determining means 82 has determined that the clutch-to-clutch shifting action is in the tie-up state, the heavy-tie-up determining means 84 is operated to determine whether the clutch-to-clutch shifting action is in the heavy tie-up state.

The determination by the heavy-tie-up determining means 84 as to whether the clutch-to-clutch shifting action the tie-up state of which has been determined by the tie-up determining means 80 is in the heavy tie-up state is made by determining whether the rate of reduction $N_{IN}'$ of the actual value of the input speed $N_{IN}$ of the automatic transmission portion 20 is equal to a predetermined value B or higher. This predetermined value B is a heavy-tie-up threshold value of the rate of change $N_{IN}'$ which is higher than the tie-up threshold value A and above which the clutch-to-clutch shifting action is considered to be in the heavy-tie-up state. This heavy-tie-up threshold value is obtained by experimentation and stored in the memory.

When the heavy-tie-up determining means 84 has determined that the clutch-to-clutch shifting action is in the heavy tie-up state, the hybrid control means 52 places the first electric motor M1 in the non-load state by cutting off a supply of the electric current from the electric-energy storage device 60 to the first electric motor M1 through the inverter 58 while the differential portion 11 is placed in the continuously-variable shifting state by the switching control means 50. Thus, the hybrid control means 52 functions as electric-motor control means) for placing the differential portion 11 in the neutral state in which the power transmitting path through the differential portion 11 is electrically cut off. In this manner, the influence of the temporary drop of the rotating speed of the rotary element of the automatic transmission portion 20 due to the tie-up phenomenon on the engine speed $N_E$ can be perfectly avoided to more effectively reduce the shock of the clutch-to-clutch shifting action.

Figure 11:
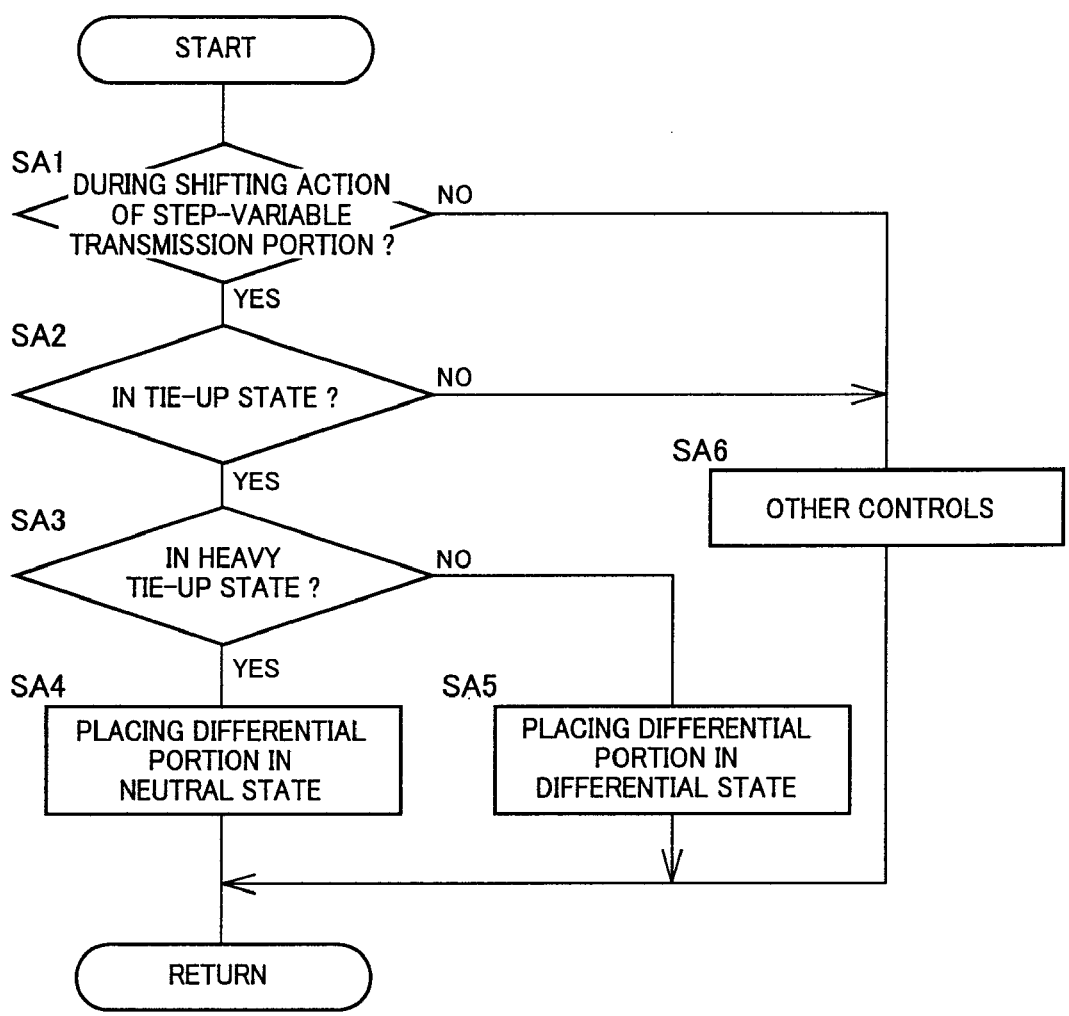
FIG. 11 is a flow chart illustrating a control operation of the electronic control device of FIG. 4, that is, a control routine executed when a clutch-to-clutch shifting action of the automatic transmission portion is performed while the differential portion is placed in a non-continuously-variable shifting state (step-variable shifting state).

FIG. 11 is a flow chart illustrating a major part of a control operation of the electronic control device 40 that is, a control routine executed when a clutch-to-clutch shifting action of the automatic transmission portion 20 is performed while the differential portion 11 is placed in the non-continuously-variable shifting state (step-variable shifting state). This control routine is repeatedly executed with an extremely short cycle time of about several milliseconds to about several tens of milliseconds.

Figure 12:
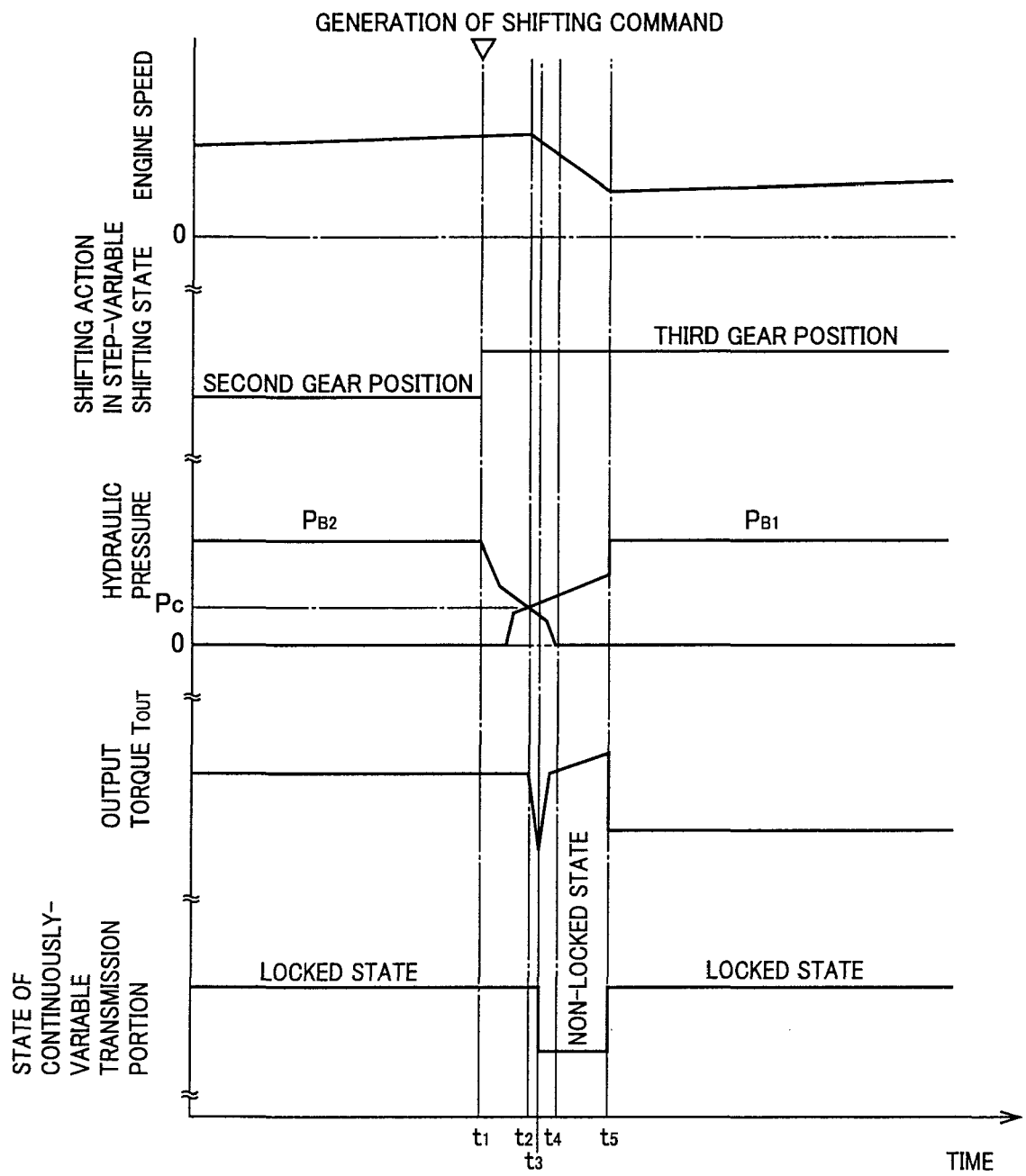
FIG. 12 is a time chart for explaining the control operation illustrated in the flow chart of FIG. 11, when the automatic transmission portion is commanded to effect a shift-up action from a second gear position to a third gear position, in the step-variable shifting state (locked state) of the differential portion.

FIG. 12 is a time chart for explaining the control operation illustrated in the flow chart of FIG. 11, when a shift-up action of the automatic transmission portion 20 from the second gear position to the third gear position is in a light tie-up state, while the differential portion 11 is placed in the step-variable shifting state (locked state).

The control routine is initiated with step SA1 (hereinafter "step" being omitted) corresponding to the under-shifting determining means 80, to determine whether the automatic transmission portion 20 is under a clutch-to-clutch shifting action under the control of the step-variable shifting control means 54.

At a point of time t1 indicated in FIG. 12, the shift-up action of the automatic transmission 20 from the second gear position to the third gear position is determined while the differential portion 11 (continuously-variable transmission portion) is placed in the non-continuously-variable shifting state (locked state), and the automatic transmission portion 20 is commanded to be shifted to the third gear position. At this point of time t1, reduction of the pressure $P_{B2}$ of the second brake B2 which is the released-side coupling device is initiated. During a time period from the point of time t1 to a point of time t5, the pressure $P_{B1}$ of the first brake B1 which is the engaged-side coupling device is raised. At the point of time t5, an engaging action of the first brake B1 is completed, and it is determined that a series of the shifting action of the automatic transmission portion 20 is completed. During this time period from the point of time t1 to the point of time t5, it is determined that the automatic transmission portion 20 is under the clutch-to-clutch shifting action. The rates of change of the transient hydraulic pressures of the released-side coupling device and the engaged-side coupling device during the time period from the point of time t1 to the point of time t5 are determined by experimentation so that the input speed $N_{IN}$ during the shifting action changes so as to provide a best compromise between the shortening of the required shifting time and the reduction of the shifting shock.

If an affirmative determination is obtained in SA1, the control flow goes to SA2 corresponding to the tie-up determining means 82, to determine whether the clutch-to-clutch shifting action is in a tie-up state. For example, this determination is made by determining whether the rate of reduction $N_{IN}'$ of the actual value of the input speed $N_{IN}$ of the automatic transmission portion 20 is equal to or higher than the predetermined value A.

During a time period from a point of time t2 to a point of time t3, the rate of reduction $N_{IN}'$ of the actual value of the input speed $N_{IN}$ of the automatic transmission portion 20 is equal to or higher than the predetermined value A, so that it is determined during this time period that the clutch-to-clutch shifting action is in the tie-up state. During a time period from the point of time t2 to a point of time t4, the output torque $T_{OUT}$ drops under the influence of the tie-up phenomenon.

If an affirmative determination is obtained in SA2, the control flow goes to SA3 corresponding to the heavy-tie-up determining means 84, to determine whether the clutch-to-clutch shifting action the tie-up state of which has been determined in SA2 is in a heavy tie-up state.

If an affirmative determination is obtained in SA3, the control flow goes to SA4 corresponding to the switching control means 50 and the hybrid control means 52, in which the limitation of the operation of the differential portion 11 as the electrically controlled continuously-variable transmission is released by commanding the hydraulic control unit 42 to release the switching clutch C0 or brake B0 which has been placed in the engaged state, so that the differential portion 11 is temporarily placed in the continuously-variable shifting state (differential state). While the differential portion 11 is held in the continuously-variable shifting state, the first electric motor M1 is placed in the non-load state to place the differential portion 11 in its neutral state, for perfectly avoiding the influence of the temporary drop of the rotating speed of the rotary element of the automatic transmission portion 20 due to the tie-up phenomenon, on the engine speed NE, to more effectively reduce the shock of the clutch-to-clutch shifting action.

If a negative determination is obtained in SA3, the control flow goes to SA5 corresponding to the switching control means 50 and the hybrid control means 52, in which the limitation of the operation of the differential portion 11 as the electrically controlled continuously-variable transmission is released by commanding the hydraulic control unit 42 to release the switching clutch C0 or brake B0 which has been placed in the engaged state, so that the differential portion 11 is temporarily placed in the continuously-variable shifting state (differential state). Further, the first electric motor M1 is controlled while utilizing the differential function of the differential portion, to prevent or reduce a drop of the engine speed $N_E$ under the influence of the tie-up phenomenon, for reducing the shock of the clutch-to-clutch shifting action.

During a time period from the point of time t3 to the point of time t5, the differential portion (continuously-variable transmission portion) 11 which has been held in the non-continuously-variable shifting state (locked state) is temporarily placed in the continuously-variable shifting state (non-locked state), as a result of the determination that the clutch-to-clutch shifting action is in the tie-up state. Further, the first electric motor M1 is controlled to avoid or reduce the drop of the engine speed $N_E$ under the influence of the tie-up phenomenon. Although the output torque $T_{OUT}$ is reduced under the influence of the tie-up phenomenon during the time period from the point of time t2 to the point of time t4, the engine speed $N_E$ is not reduced under the influence of the tie-up phenomenon while the engine speed $N_E$ is reduced due to the shift-up action during the time period from the point of time t2 to the point of time t5. In the example of FIG. 12 in which the clutch-to-clutch shifting action is not in the heavy tie-up state, the differential portion 11 is not placed in the neutral state. If the clutch-to-clutch shifting action is in the heavy tie-up state, however, the differential portion 11 is placed in the neutral state during the time period from the point of time t3 to the point of time 55, to perfectly avoid an influence of a change of the rotating speed of the rotary element of the automatic transmission portion 20 due to the heavy tie-up phenomenon.

If a negative determination is obtained in SA1, or SA2, the control flow goes to SA6 to implement control operations of various control means of the control device 40 that are activated when the clutch-to-clutch shifting action is not in the tie-up state, or the present control routine is terminated.

In the vehicular drive system constructed as described above, the differential limiting device in the form of the switching clutch C0 or switching brake B0 is provided to limit the operation of the differential portion 11 as the electrically controlled differential device, and is operable to switch the differential portion 11 between the continuously-variable shifting state and the non-continuously-variable shifting state. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the differential portion 11 is placed in the continuously-variable shifting state in a normal output state of the engine during a low-speed or medium-speed running or a low-output or medium-output running of the vehicle, for example, the fuel economy of the vehicle is improved. When the differential portion 11 is placed in the non-continuously-variable shifting state during a high-speed running of the vehicle, the output of the engine 8 is transmitted to the drive wheels primarily through the mechanical power transmitting path, so that the fuel economy is improved owing to reduction of a loss of conversion of a mechanical energy into an electric energy, which would take place when the continuously-variable transmission portion is operated as a transmission the speed ratio of which is electrically variable. Where the differential portion 11 is placed in the non-continuously-variable shifting state during a high-output running state of the vehicle, the differential portion 11 is operated as a transmission the speed ratio of which is electrically variable, only when the vehicle speed or output is relatively low or medium, so that the required amount of electric energy generated by the first electric motor M1, that is, the maximum amount of electric energy that must be transmitted from the first electric motor M1 can be reduced, making it possible to minimize the required sizes of the first electric motor M1 and the second electric motor M2 to which the electric energy is supplied from the first electric motor M1, and the required size of the transmission mechanism 10 including the electric motors.

The present embodiment is further arranged such that the differential portion 11 is placed in the continuously-variable shifting state under the control of the switching control means 50 while the clutch-to-clutch shifting action of the automatic transmission portion 20 is in the tie-up state, so that the engine speed $N_E$ can be controlled as needed owing to the differential function of the differential portion 11 under the control of the hybrid control means 52, irrespective of a change of the rotating speed of the rotary element of the automatic transmission portion 20, for instance, irrespective of the input speed $N_{IN}$ or output speed $N_{OUT}$ of the automatic transmission portion 20, in the tie-up state of the clutch-to-clutch shifting action, whereby a drop of the engine speed $N_E$ due to the tie-up phenomenon in the automatic transmission portion 20 can be prevented, to reduce the shock of the clutch-to-clutch shifting action in the tie-up state. While the differential portion 11 is placed in the non-continuously-variable shifting state (step-variable shifting state), on the other hand, the engine speed $N_E$ may be directly influenced by the tie-up phenomenon in the automatic transmission portion 20 under the clutch-to-clutch shifting action, for example, by a temporary drop of the input speed $N_{IN}$ or output speed $N_{OUT}$ of the automatic transmission portion 20 in the tie-up state, since the engine 8 and the drive wheels 38 are mechanically connected to each other.

The present embodiment is further arranged such that the switching means 50 is operable to switch the differential portion 11 from the step-variable shifting state (non-continuously-variable shifting state) to the continuously-variable shifting state. Accordingly, the shock of the clutch-to-clutch shifting action can be reduced, without cutting off the power transmitting path between the engine 8 and the drive wheels 38.

The present embodiment is further arranged such that the hybrid control means 52 places the first electric motor M1 in the non-load state for placing the differential portion 11 in the neutral state in which power cannot be transmitted through the differential portion 11, when the clutch-to-clutch shifting action is in the heavy tie-up state. Accordingly, the power transmitting path between the engine 8 and the automatic transmission portion 20 is cut off, so that the engine speed $N_E$ is not influenced by the tie-up phenomenon in the automatic transmission portion 20 under the clutch-to-clutch shifting action, making it possible to reduce the shock of the clutchto-clutch shifting action in the heavy tie-up state, which may not be sufficiently reduced by merely placing the differential portion 11 in the continuously-variable shifting state under the control of the switching control means 50.

Other embodiments of this invention will be described. In the following description, the same reference signs will be used to identify the functionally corresponding elements, which will not be described.

Embodiment 2

In the first embodiment described above, the differential portion 11 is switched to the continuously-variable shifting state to reduce the influence of the tie-up phenomenon of the automatic transmission portion 20 on the engine 8, for reducing the shock of the clutch-to-clutch shifting action, when the clutch-to-clutch shifting action of the automatic transmission portion 20 is brought into the tie-up state in the non-continuously-variable shifting state of the differential portion 11. To reduce the influence of the tie-up phenomenon of the automatic transmission portion 20, however, the differential portion 11 need not be switched to the non-continuously variable shifting state, provided the engine speed $N_E$ can be controlled as needed, irrespective of a change of the rotating speed of the rotary element of the automatic transmission portion 20, by cutting off the power transmitting path between the automatic transmission portion 20 and the engine 8, for example.

When the clutch-to-clutch shifting action of the automatic transmission portion 20 performed under the control of the step-variable shifting control means 54 is brought into the tie-up state while the differential portion 11 is placed in the non-continuously-variable shifting state, the differential portion 11 is not switched by the switching control means 50 from the non-continuously-variable shifting state to the continuously-variable shifting state, but the above-described input clutch operable to permit or inhibit the power input from the differential portion 11 to the automatic transmission portion 20 is released or partially engaged, or the ratio of engagement of the input clutch is reduced to increase the slip ratio of the input clutch, for permitting the hybrid control means 52 to control or change the engine speed $N_E$ as needed.

Described in detail by reference to the functional block diagram of FIG. 12 corresponding to that of FIG. 5 and showing major control functions of the electronic control device 40, input-clutch control means 86 is provided to command the hydraulic control unit 42 to release or partially engage the input clutch for a predetermined length of time, for permitting the hybrid control means 52 to control or change the engine speed $N_E$ as needed, when the under-shifting determining means 80 has determined that the automatic transmission portion 20 is under the clutch-to-clutch shifting action under the control of the step-variable shifting control means 54 in the non-continuously-variable shifting state (locked state), and when the tie-up determining means 82 has determined that the clutch-to-clutch shifting action is in the tie-up state. The input clutch is released or partially engaged to completely or almost cut off the power transmitting path from the differential portion 11 to the automatic transmission portion 20. The above-indicated predetermined length of time is obtained by experimentation as a time length enough to prevent the influence of the tie-up phenomenon.

A command to release or partially engage the input clutch is generated during the clutch-to-clutch shifting action of the automatic transmission portion 20. This means that the input clutch is not one of the two coupling clutches that are released and engaged to perform the clutch-to-clutch shifting action. In the present embodiment, the input clutch is the first clutch C1 or second clutch C2. As is apparent from the table of FIG. 2, any shifting action of the automatic transmission portion 20 from one of the first through fourth gear positions to another is the clutch-to-clutch shifting action. When the clutch-to-clutch shifting actions between the third and fourth gear positions are performed by engaging or releasing the second clutch C2, the input clutch to be released or partially engaged during those clutch-to-clutch shifting actions under the control of the input-clutch control means 86 is the first clutch C1 in the present embodiment.

The hybrid control means 52 is arranged to control the first electric motor M1 so as to prevent or reduce a drop of the engine speed $N_E$ under the influence of the tie-up phenomenon, for reducing the shock of the clutch-to-clutch shifting action, when the input clutch (first clutch C1) is temporarily released or partially engaged under the control of the input-clutch control means 86 after the under-shifting determining means 80 has determined that the automatic transmission portion 20 is under the clutch-to-clutch shifting action in the non-continuously-variable shifting state (locked state) of the differential portion 11 and after the tie-up determining means 82 has determined that the clutch-to-clutch shifting action is in the tie-up state.

As described above, the tie-up state of the clutch-to-clutch shifting action covers different degrees of the tie-up from a light tie-up to a heavy tie-up. The light tie-up involves a small amount of temporary reduction of the output torque $T_{OUT}$ with a small amount of drop of the input speed $N_{IN}$ during the clutch-to-clutch shifting action, while the heavy tie-up involves a large amount of temporary reduction of the output torque $T_{OUT}$ with a large amount of drop of the input speed $N_{IN}$ due to a large amount of the above-described overlap. The tie-up determining means 82 determines whether the clutch-to-clutch shifting action is in any degree of the tie-up state from the light tie-up to the heavy tie-up.

When the input clutch (first clutch C1) is partially engaged under the control of the input-clutch control means 86 during the clutch-to-clutch shifting action in the tie-up state, the power transmitting path from the engine 8 to the drive wheels 38 is not cut off, so that the shifting shock of the clutch-to-clutch shifting can be effectively reduced. Where the clutch-to-clutch shifting action is in the heavy tie-up state, however, there is a risk of failure to avoid the influence of the tie-up phenomenon since the power transmitting path is not cut off.

Where the clutch-to-clutch shifting action is in the heavy tie-up state with a large degree of the tie-up, the power transmitting path between the engine 8 and the automatic transmission portion 20 is completely cut off to completely avoid the influence of the tie-up phenomenon, for thereby completely preventing an influence of the temporary drop of the rotating speed of the rotary element of the automatic transmission portion 20, for example, the temporary drop of the input speed $N_{IN}$ of the automatic transmission portion 20.

When the heavy-tie-up determining means 84 has determined that the clutch-to-clutch shifting action is in the heavy tie-up state, the input-clutch control means 86 may command the hydraulic control unit 42 to temporarily release the input clutch (first clutch C1) for placing the power transmitting path from the differential portion 11 to the automatic transmission portion 20 in the power cut-off state, for completely preventing the influence of the temporary drop of the rotating speed of the rotary element of the automatic transmission portion 20 caused by the tie-up phenomenon, on the engine speed NE, to more effectively reducing the shock of the clutch-to-clutch shifting action.

In the present embodiment, the input clutch is released or partially engaged to cut off the power transmitting path from the engine 8 to the automatic transmission portion 20, rather than the differential portion 11 is switched to the continuously-variable shifting state, for reducing the influence of the tie-up phenomenon of the automatic transmission portion 20, The input clutch may be released or partially engaged where the differential portion 11 cannot be switched to the continuously-variable shifting state. That is, the differential portion 11 is normally switched to the continuously-variable shifting state to reduce the influence of the tie-up phenomenon of the automatic transmission portion 20, but the input clutch is released or partially engaged if the differential portion 11 cannot be switched to the continuously-variable shifting state.

Described in detail, switching-to-continuously-variable-shifting-state feasibility determining means 88 is provided to determine whether the differential portion 11 can be switched by the switching control means 50 from the non-continuously-variable-shifting state (step-variable shifting state) to the continuously-variable shifting state (differential state). For example, this determination is made by determining whether the switching clutch C0 or brake B0 placed in the engaged state can be released by the hydraulic control unit 42 according to a command received from the switching control means 50. For instance, the switching-to-continuously-variable-shifting-state feasibility determining means 88 is configured to make the determination as to whether the switching clutch C0 or brake B0 can be released, by determining whether there exists a failure of a friction member or hydraulic actuator of the switching clutch C0 or brake B0, a failure of the solenoid-operated valve incorporated in the hydraulic control unit 42 to control the hydraulic actuator, or an operational delay of the switching clutch C0 or brake B0 due to functional deterioration of the hydraulic actuator or solenoid-operated value or a low temperature of the working oil.

The above-described input-clutch control means 86 may be arranged to command the hydraulic control unit 42 to temporarily release or partially engage the input clutch (first clutch C1) currently placed in its fully engaged state, for completely or substantially cutting off the power transmitting path between the differential portion 11 and the automatic transmission portion 20, to permit the hybrid control means 52 to control the engine speed $N_E$ as needed, when the switching-to-continuously-variable-shifting-state determining means 88 has determined that the differential portion 11 cannot be switched from the non-continuously-variable shifting state to the continuously-variable shifting state, while the under-shifting determining means 80 determines that the automatic transmission portion 20 is in a clutch-to-clutch shifting action under the control of the step-variable shifting control means 54, in the non-continuously-variable shifting state (locked state) of the differential portion 11, and while the tie-up determining means 82 determines that the clutch-to-clutch shifting action is in a tie-up state.

Figure 14:
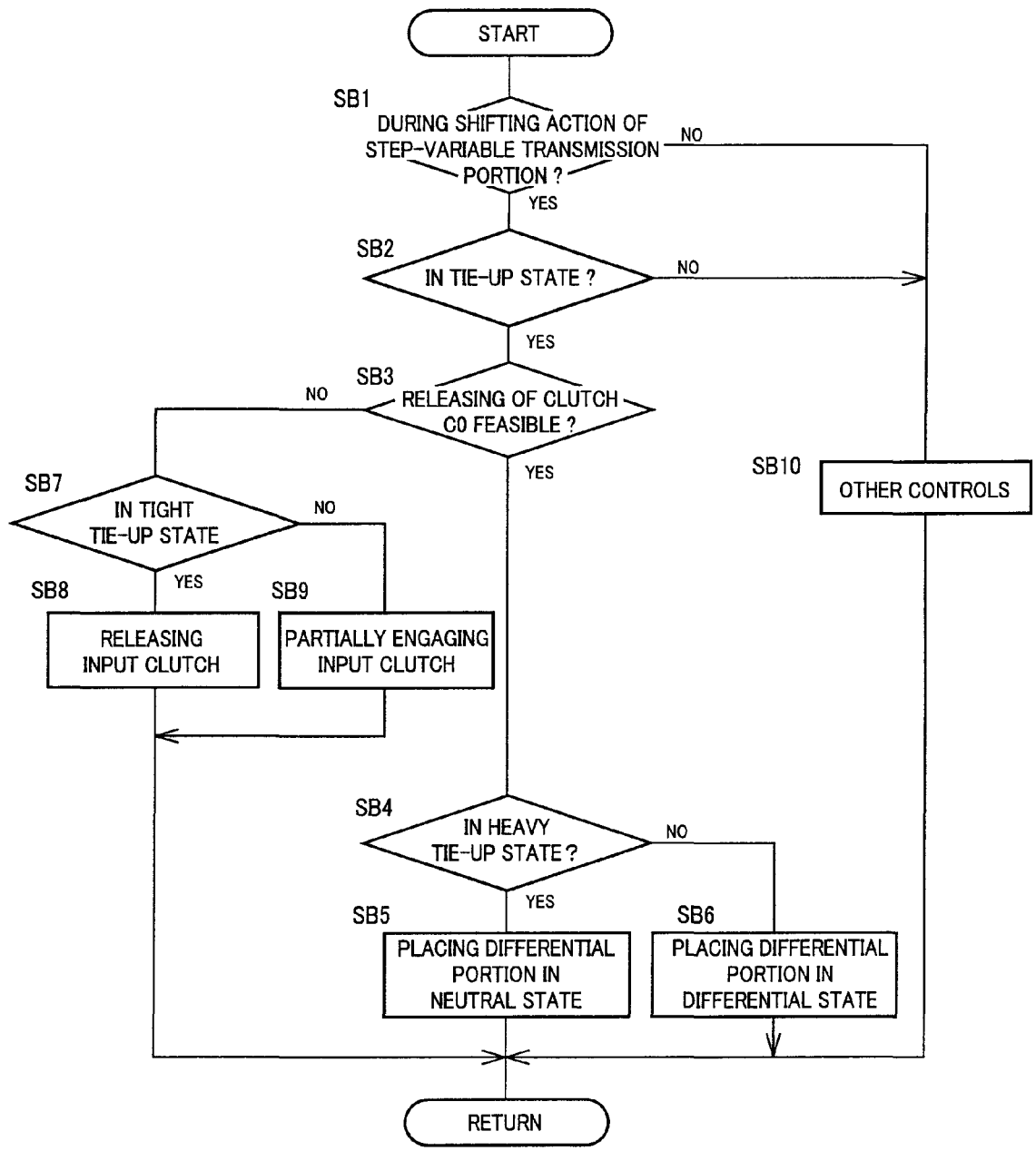
FIG. 14 is a flow chart corresponding to that of FIG. 11, illustrating a control operation of the electronic control device shown in FIG. 13, that is, a control routine executed when a clutch-to-clutch shifting action of the automatic transmission portion is performed while the differential portion is placed in the non-continuously-variable shifting state (step-variable shifting state).

FIG. 14 is a flow chart illustrating a major control operation of the electronic control device 40 according to the present embodiment, that is, a control routine executed when the clutch-to-clutch shifting action of the automatic transmission portion 20 is performed while the differential portion 11 is placed in the non-continuously-variable shifting state (step-variable shifting state). This control routine is repeatedly executed with an extremely short cycle time of several milliseconds to several tens of milliseconds. The flow chart of FIG. 14 corresponds to that of FIG. 11.

Figure 15:
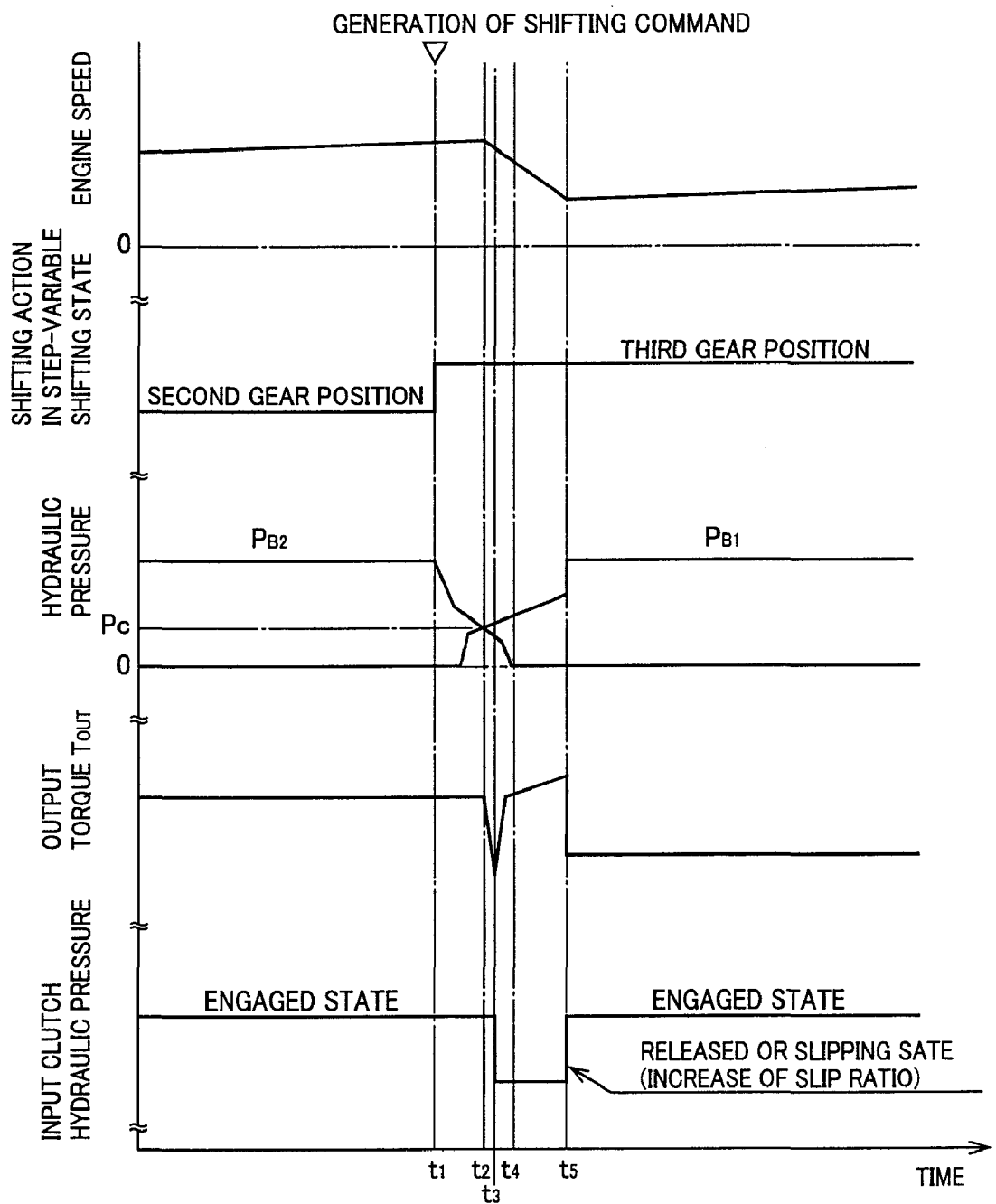
FIG. 15 is a time chart corresponding to that of FIG. 12, for explaining the control operation illustrated in the flow chart of FIG. 14, when the automatic transmission portion is commanded to effect the shift-up action from the second gear position to the third gear position, in the step-variable shifting state (locked state) of the differential portion.

FIG. 15 is a time chart corresponding to that of FIG. 12, for explaining the control routine illustrated in the flow chart of FIG. 14, which is executed when the automatic transmission portion 20 is shifted up from the second gear position to the third gear position, in a light tie-up state, while the differential portion 11 is placed in the step-variable shifting state (locked state).

The control routine is initiated with SB1 corresponding to the under-shifting determining means 80, to determine whether the automatic transmission portion 20 is under a clutch-to-clutch shifting action under the control of the step-variable shifting control means 54.

At a point of time t1 indicated in FIG. 15, it is determined that the automatic transmission portion 20 is commanded to be shifted up from the second gear position to the third gear position, in the non-continuously-variable shifting state (locked state) of the differential portion 11, and reduction of the pressure $P_{B2}$ of the second brake B2 which is the released-side coupling device is initiated. During a time period from the point of time t1 to a point of time t5, the pressure $P_{B1}$ of the first brake B1 which is the engaged-side coupling device is raised, and the engaging action of the first brake B1 is completed at the point of time t5 so that the shift-up action of the automatic transmission portion 20 is terminated. During this time period between the points of time t1 and t5, it is determined that the automatic transmission portion 20 is under the clutch-to-clutch shifting action. The transient hydraulic pressures of the released-side and engaged-side coupling devices are respectively reduced and raised at predetermined rates which are obtained by experimentation to change the input speed $N_{IN}$ so as to provide a best compromise between the shortening of the required shifting time and the reduction of the shifting shock.

If an affirmative determination is obtained in SB1, the control flow goes to SB2 corresponding to the tie-up determining means 82, to determine whether the clutch-to-clutch shifting action is in the tie-up state. For example, this determination is made by determining whether the rate of reduction $N_{IN}'$ of the actual input speed $N_{IN}$ of the automatic transmission portion 20 is equal to or higher than the predetermined value A.

During a time period from a point of time t2 to a point of time t3 indicated in FIG. 15, the rate of reduction $N_{IN}'$ of the actual input speed $N_{IN}$ of the automatic transmission portion 20 is equal to or higher than the predetermined value A, so that it is determined that the clutch-to-clutch shifting action is in the tie-up state. During a time period from the point of time t2 to a point of time t4, the output torque $T_{OUT}$ is reduced under the influence of the tie-up phenomenon.

If an affirmative determination is obtained in SB2, the control flow goes to step SB3 corresponding to the switching-to-continuously-variable-shifting-state feasibility determining means 88, to determine whether the differential portion 11 can be switched from the non-continuously-variable shifting state (step-variable shifting state) to the continuously-variable shifting state (differential state). For example, this determination is made by determining whether the switching clutch C0 or brake B0 currently placed in the fully engaged state can be released by the hydraulic control unit 42 according to a command received from the switching control means 50. In the embodiment of FIG. 14, the differential portion 11 is normally switched to the non-continuously-variable shifting state (differential state), that is, the locked state of the differential portion 11 is normally released, rather than the input clutch (first clutch C1) is released or partially engaged. That is, the differential portion 11 is switched to the non-locked state as long as this switching is feasible or possible.

If an affirmative determination is obtained in SB3, the control flow goes to SB4 corresponding to the heavy-tie-up determining means 84, to determine whether the clutch-to-clutch shifting action determined in SB2 is in a heavy tie-up state.

If an affirmative determination is obtained in SB4, the control flow goes to SB5 corresponding to the switching control means 50 and the hybrid control means 52, in which the hydraulic control unit 42 is commanded to release the switching clutch C0 or brake B0 currently placed in the fully engaged state, to release the limitation of the operation of the differential portion 11 as the electrically controlled continuously variable transmission, so that the differential portion 11 is temporarily placed in the continuously-variable shifting state (differential state). Further, the first electric motor M1 is placed in the non-load state to place the differential portion 11 in the neutral state, for completely avoiding the influence of a temporary drop of the rotating speed of the rotary element of the automatic transmission portion 20 due to the tie-up phenomenon, on the engine speed $N_E$.

If a negative determination is obtained in SB4, the control flow goes to SB6 corresponding to the switching control means 50 and the hybrid control means 52, in which the hydraulic control unit 42 is commanded to release the switching clutch C0 or brake B0 currently placed in the engaged state, for releasing the limitation of the operation of the differential portion 11 as the electrically controlled continuously variable transmission, to permit the engine speed $N_E$ to be controlled as needed owing to the differential function of the differential portion 11. Thus, the differential portion 11 is temporarily switched to the continuously-variable shifting state (differential state). Further, the first electric motor M1 is controlled while the differential function of the differential portion 11 is utilized, so as to prevent (reduce) a drop of the engine speed $N_E$ under the influence of the tie-up phenomenon, for thereby reducing the shock of the clutch-to-clutch shifting action.

If a negative determination is obtained in SB3, the control flow goes to SB7 corresponding to the heavy-tie-up determining means 84, to determine whether the clutch-to-clutch shifting action determined in SB2 is in the heavy tie-up state.

If an affirmative determination is obtained in SB7, the control flow goes to SB8 corresponding to the input-clutch control means 86, in which the hydraulic control unit 42 is commanded to temporarily release the input clutch (first clutch C1) currently placed in the fully engaged state, for cutting off the power transmitting path between the differential portion 11 and the automatic transmission portion 20.

If a negative determination is obtained in SB7, the control flow goes to SB9 corresponding to the input-clutch control means 86, in which the hydraulic control unit 42 is commanded to temporarily partially engage the input clutch (first clutch C1) currently placed in the fully engaged state.

During a time period from a point of time t2 to the point of time t5, it is determined that the clutch-to-clutch shifting action is in the tie-up state, and the input clutch (first clutch C1) is temporarily placed in the released or partially engaged state. Where the tie-up state is not the heavy tie-up state, for instance, the input clutch is temporarily placed in the partially engaged state. In the partially engaged state of the input clutch in which the power transmitting path from the engine 8 to the automatic transmission portion 20 is not completely cut off, the first electric motor M1 may be controlled to prevent (reduce) the drop of the engine speed $N_E$ under the influence of the tie-up phenomenon. Where the tie-up state is the heavy tie-up state, on the other hand, the input clutch is temporarily placed in the fully released state, to completely cut off the power transmitting path from the engine 8 to the automatic transmission portion 20, so that the influence of the change of the rotating speed of the rotary element of the automatic transmission portion 20 due to the tie-up phenomenon can be avoided. During the time period from the point of time t2 to the point of time t5, the engine speed $N_E$ is reduced due to the shift-up action, but not due to the influence of the tie-up phenomenon which causes a drop of the output torque $T_{OUT}$ during the time period between the points of time t2 and t4.

If a negative determination is obtained in SB1 or SB2, the control flow goes to SB10 in which control operations that are to be implemented in the non-tie-up state of the clutch-to-clutch shifting action are performed by various control means of the electronic control device 40. Alternatively, the present control routine is terminated with SB10.

As described above, the present embodiment is arranged such that the input clutch (first clutch C1) is released or partially engaged under the control of the input-clutch control means 86, if the differential portion 11 currently placed in the non-continuously-variable shifting state cannot be switched to the continuously-variable shifting state by the switching control means 50, while the clutch-to-clutch shifting action of the automatic transmission portion 20 is in the tie-up state. Accordingly, the present embodiment has the same advantages as the preceding embodiment. In addition, the power input from the differential portion 11 to the automatic transmission portion 20 is inhibited, when the limitation of the operation of the differential portion 11 as the electrically controlled continuously variable transmission cannot be released due to a failure or functional deterioration of the hydraulic actuator for the switching clutch C0 or brake B0 currently placed in the engaged state, or the solenoid-operated valve used to control the hydraulic actuator. Accordingly, the engine speed $N_E$ can be controlled as needed, irrespective of a change of the rotating speed of the rotary element of the automatic transmission portion 20, irrespective of a change of the rotating speed of the rotary element of the automatic transmission portion 20, that is, irrespective of a change of the input speed $N_{IN}$ or output speed $N_{OUT}$, in the tie-up state of the clutch-to-clutch shifting action, whereby a drop of the engine speed $N_E$ due to the tie-up phenomenon in the automatic transmission portion 20 can be prevented, to reduce the shock of the clutch-to-clutch shifting action in the tie-up state. While the differential portion 11 is placed in the non-continuously-variable shifting state (step-variable shifting state), on the other hand, the engine speed $N_E$ may be directly influenced by the tie-up phenomenon in the automatic transmission portion 20 under the clutch-to-clutch shifting action, for example, by a temporary drop of the input speed $N_{IN}$ or output speed $N_{OUT}$ of the automatic transmission portion 20 in the tie-up state, since the engine 8 and the drive wheels 38 are mechanically connected to each other.

The present embodiment is further arranged such that the input clutch (first clutch C1) is released or partially engaged under the control of the input-clutch control means 86, rather than the differential portion 11 is switched to the continuously-variable shifting state under the control of the switching control means 50, when the clutch-clutch shifting action of the automatic transmission portion 20 is in the tie-up state while the differential portion 11 is placed in the non-continuously-variable shifting state. Accordingly, the power input from the differential portion 11 to the automatic transmission 20 is cut off, so that the engine speed $N_E$ can be controlled as needed under the control of the hybrid control means 52, irrespective of a change of the rotating speed of the rotary element of the automatic transmission portion 20, so that the drop of the engine speed $N_E$ due to the tie-up phenomenon can be prevented to reduce the shock of the clutch-to-clutch shifting action.

Where the input clutch (first clutch C1) is partially engaged in the tie-up state of the clutch-to-clutch shifting action of the automatic transmission portion 20, the shock of the clutch-to-clutch shifting action can be reduced without having to cut off the power transmitting path between the engine 8 and the drive wheels 38.

Where the clutch-to-clutch shifting action is in the heavy tie-up state, the input clutch (first clutch C1) is released to cut off the power input from the engine 8 to the automatic transmission portion 20, for thereby preventing the influence of the tie-up phenomenon on the engine speed $N_E$ during the clutch-to-clutch shifting action of the automatic transmission portion 20, to reduce the shock of the clutch-to-clutch shifting action in the heavy tie-up state, which cannot be sufficiently reduced by partially engaging the input clutch.

Embodiment 3

In the preceding embodiments, the differential portion 11 is switched to the continuously-variable shifting state, or the input clutch which permits or inhibits the power input from the differential portion 11 to the automatic transmission portion 20 is released or partially engaged, when the clutch-to-clutch shifting action of the automatic transmission portion 20 is in the tie-up state while the differential portion 11 is placed in the non-continuously-variable shifting state. Thus, the influence of the tie-up phenomenon of the automatic transmission portion 20 on the engine 8 is reduced to reduce the shifting shock.

However, the engine speed $N_E$ may be influenced by a shifting action of the automatic transmission portion, leading to generation of the shifting shock, even when the shifting action of the automatic transmission portion 20 is not in the tie-up state.

In a well known power transmitting system provided with a torque converter, a fluid coupling or any other fluid-actuated power transmitting device which is disposed in a power transmitting path between a step-variable transmission and an engine, the fluid-actuator power transmitting device permits a speed difference between the engine and the step-variable transmission, so that the engine speed is less likely to be influenced by a shifting action of the transmission, whereby the shifting shock is reduced.

The transmission mechanism 10 according to the present embodiment is not provided with such a fluid-actuator power transmitting device in the power transmitting path between the engine 8 and the automatic transmission portion 20. However, the engine speed $N_E$ can be controlled as needed, owing to the differential function of the differential portion 11, irrespective of a change of the input speed $N_{IN}$ due to the shifting action of the automatic transmission portion 20. Accordingly, the influence of the shifting action of the automatic transmission portion 20 on the engine speed $N_E$ is reduced, and the shifting shock is reduced.

To reduce the shock of the shifting action of the automatic transmission portion 20, the hybrid control means 52 may be arranged to control the first electric motor M1 while utilizing the differential function of the differential portion 11, to change the engine speed $N_E$ toward a value after completion of the shifting action of the automatic transmission portion 20 performed under the control of the step-variable shifting control means 54, such that the engine speed changes at a predetermined rate which is obtained by experimentation so as to provide a best compromise between reduction of the shifting shock and improvement of the shifting response as felt by the vehicle operator.

In the present transmission mechanism 10 which is selectively switchable to the continuously-variable shifting state and the non-continuously-variable shifting state (step-variable shifting state), however, the engine speed $N_E$ can be controlled as needed, only while the differential portion 11 is placed in the continuously-variable shifting state (differential state). That is, while the differential portion 11 is placed in the non-continuously-variable shifting state, the engine 8 and the automatic transmission portion 20 are mechanically connected to each other, so that the engine speed $N_E$ may be directly influenced by the shifting action of the automatic transmission portion 20. In the non-continuously-variable shifting state of the differential portion 11, the shifting shock may not be reduced as in the continuously-variable shifting state (differential state).

In view of the above, the switching control means 50 is operated, upon a shifting action of the automatic transmission portion 20 under the control of the step-variable shifting control means 54, to hold the differential portion 11 in the continuously-variable shifting state if the differential portion 11 is placed in this state upon initiation of the shifting action, or to switch the differential portion 11 to the continuously-variable shifting state if the differential portion 11 is placed in the non-continuously-variable shifting state upon initiation of the shifting action, so that the engine speed $N_E$ can be controlled as needed owing to the differential function of the differential portion 11 under the control of the hybrid control means 52, to reduce the shock of the shifting action.

Figure 13:
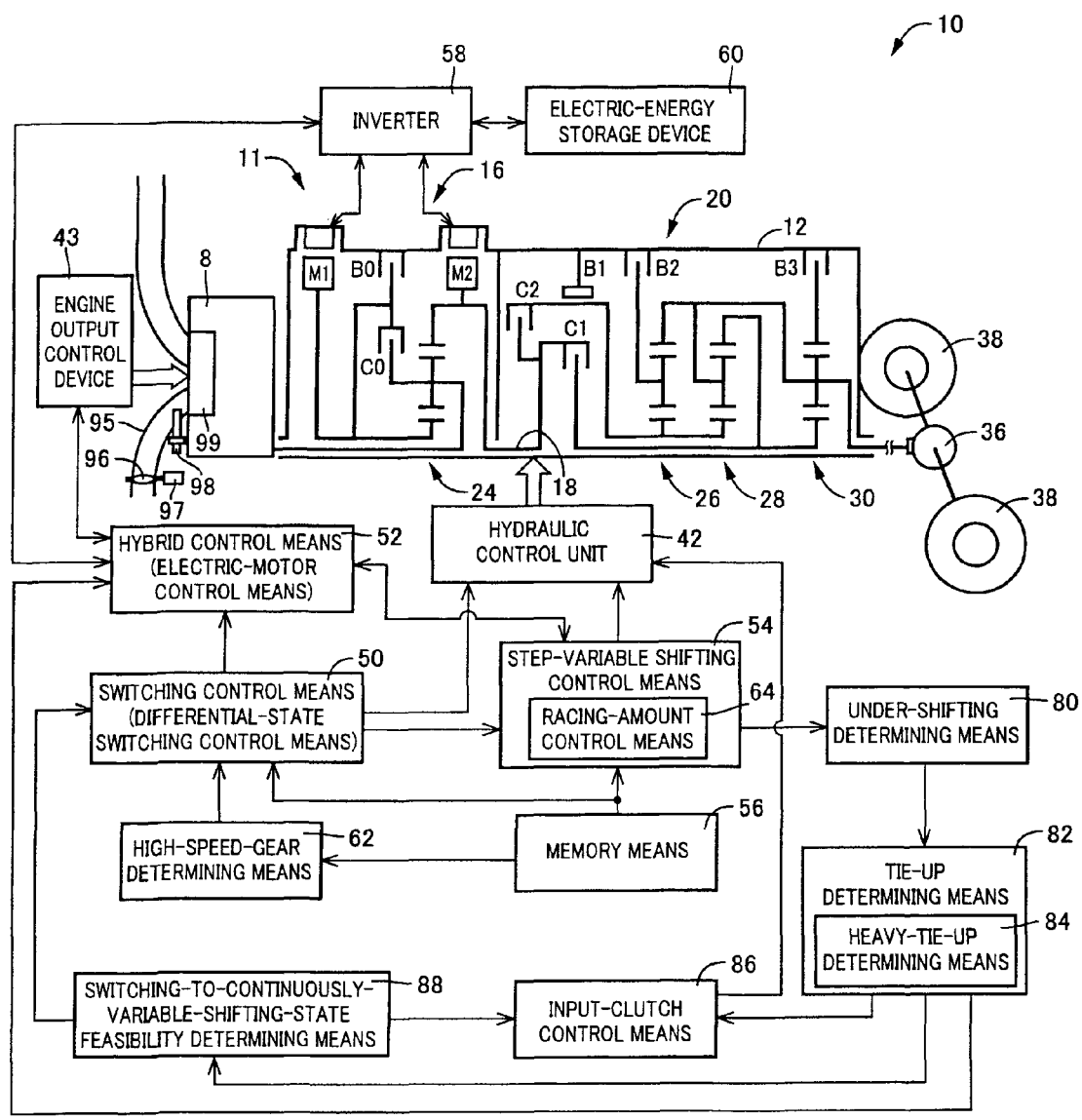
FIG. 13 is a functional block diagram illustrating major control functions of the electronic control device of FIG. 4 configured according to another embodiment of this invention.
Figure 16:
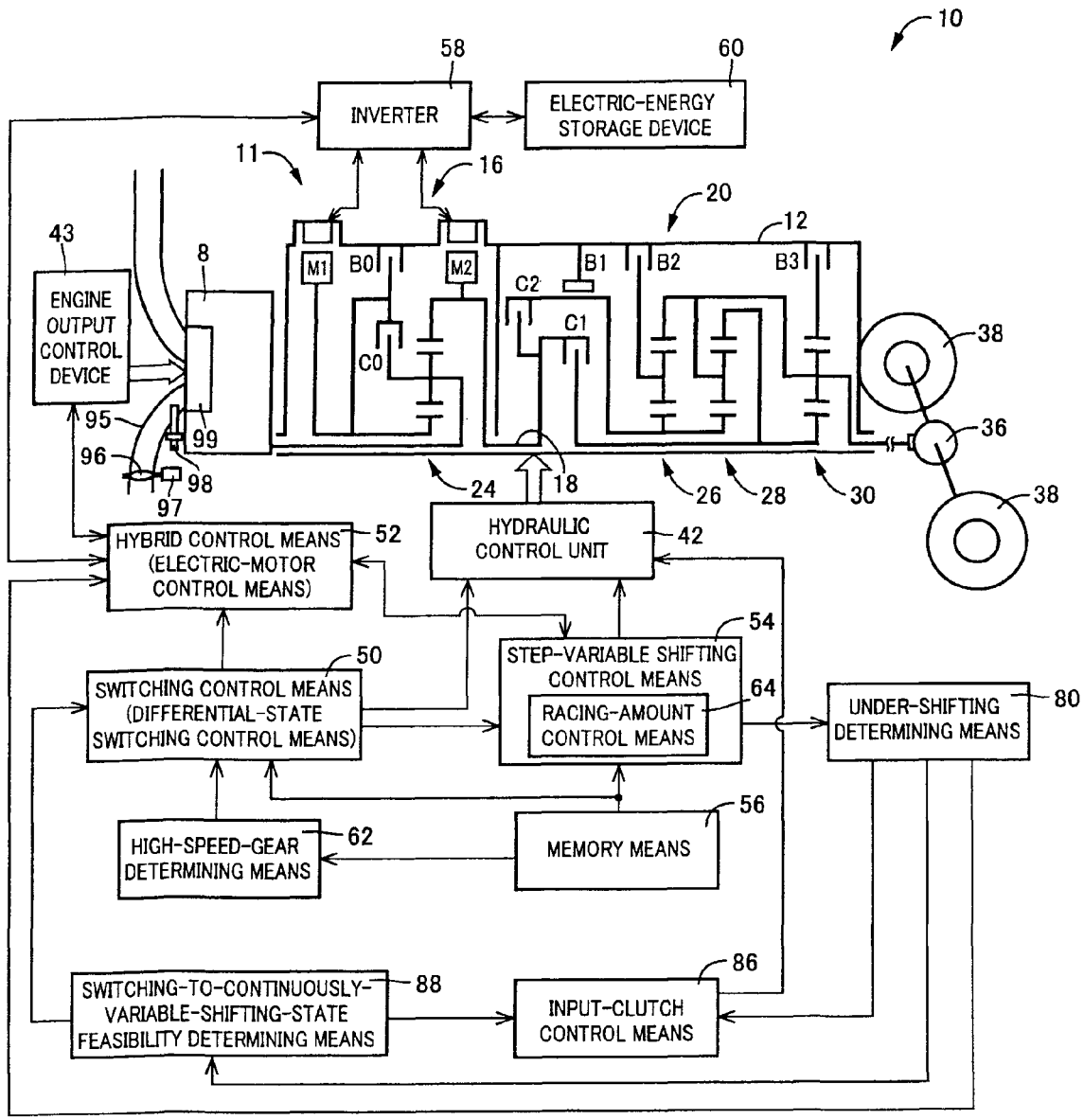
FIG. 16 is a functional block diagram corresponding to that of FIG. 5, illustrating major control functions of the electronic control device of FIG. 4 configured according to a further embodiment of this invention.

Described in detail referring to the functional block diagram of FIG. 16 corresponding to those of FIGS. 5 and 13, illustrating major control functions of the electronic control device 40, the switching control means 50 functions as differential-state switching control means for placing the differential portion 11 in the continuously-variable shifting state (differential state), by commanding the hydraulic control unit 42 to release the switching clutch C0 or brake B0 currently placed in the engaged state, for releasing the limitation of the operation of the differential portion 11 as the electrically controlled continuously variable transmission, to permit the hybrid control means 52 to control the engine speed $N_E$ as needed owing to the differential function of the differential portion 11, when the under-shifting determining means 80 has determined that the automatic transmission portion 20 is under a shifting action under the control of the step-variable shifting control means 54 while the differential portion 11 is placed in the non-continuously-variable shifting state (locked state).

When the under-shifting determining means 80 has determined that the automatic transmission portion 20 is under the shifting action under the control of the step-variable shifting control means 54 while the differential portion 11 is placed in the non-continuously-variable shifting state (locked state), for instance, the switching control means 50 temporarily switches the differential portion 11 in the continuously-variable shifting state (differential state) for a predetermined length of time which is obtained by experimentation to avoid the influence of the shifting action of the automatic transmission portion 20, for example, for a length of time required for the automatic transmission portion 20 to complete the shifting action under the control of the step-variable shifting control means 54. After the predetermined length of time has passed, the switching control means 50 switches the differential portion 11 back to the non-continuously-variable shifting state.

The switching control means 50 functioning as the differential-state switching control means is further configured to hold the switching clutch C0 or brake B0 in the released state, for holding the differential portion 11 in the continuously-variable shifting state (differential state), so as not to limit the operation of the differential portion 11 as the electrically controlled continuously variable transmission, when the under-shifting determining means 80 has determined that the automatic transmission portion 20 is under a shifting action under the control of the step-variable shifting control means 54 during running of the vehicle in the continuously-variable shifting state while the differential portion 11 is placed in the continuously-variable shifting state.

The hybrid control means 52 is configured to control the engine speed $N_E$ by controlling the first electric motor M1 owing to the differential function of the differential portion 11, to prevent (reduce) the influence of the shifting action of the automatic transmission portion 20 on the engine speed $N_E$, for reducing the shifting shock of the automatic transmission portion 20, when the under-shifting determining means 80 has determined that the automatic transmission portion 20 is under the shifting action under the control of the step-variable shifting control means 54 while the differential portion 11 is placed in the continuously-variable shifting state.

When the differential portion 11 is temporarily placed in the continuously-variable shifting state under the control of the switching control means 50 while the differential portion 11 is placed in the non-continuously-variable shifting state (locked state), for instance, the hybrid control means 52 controls the first electric motor M1 to change the engine speed $N_E$ toward a value after completion of the shifting action of the automatic transmission portion 20, such that the engine speed changes at a predetermined rate which is obtained by experimentation to provide a best compromise between reduction of the shifting shock and improvement of the shifting response as felt by the vehicle operator. When the differential portion 11 is held in the continuously-variable shifting state under the control of the switching control means 50, on the other hand, the hybrid control means 52 controls the first electric motor M1 to hold the engine speed $N_E$ substantially constant, so that the speed ratio $\gamma 0$ of the differential portion 11 changes in a direction opposite to the direction of change of the speed ratio $\gamma$ of the automatic transmission portion 20, whereby the overall speed ratio $\gamma T$ continuously changes during the shifting action of the automatic transmission portion 20.

The hybrid control means 52 also functions as electric-motor control means operated when the under-shifting determining means 80 has determined that the automatic transmission portion 20 is under the shifting action under the control of the step-variable shifting control means 54. This electric-motor control means is configured to cut off a supply of an electric current to the first electric motor M1 from the electric-energy storage device 60 through the inverter 58, for placing the first electric motor M1 in the non-load state for thereby placing the differential portion 11 in the neutral state in which the power transmitting path through the differential portion 11 is temporarily electrically cut off, rather than to control the first electric motor M1 to control the engine speed $N_E$ owing to the differential function of the differential portion 11, for a predetermined length of time which is obtained by experimentation to avoid the influence of the shifting action of the automatic transmission portion 20, for example, for a length of time required for the automatic transmission portion 20 to complete the shifting action under the control of the step-variable shifting control means 54, for completely avoiding the influence of the shifting action of the automatic transmission portion 20 on the engine speed $N_E$, to reduce the shifting shock of the automatic transmission portion 20 in the continuously-variable shifting state of the differential portion 11. The electric-motor control means merely places the first electric motor M1 in the non-load state for temporarily cutting off the power transmitting path from the engine 8 to the drive wheels 38, rather than controls the first electric motor M1 to control the engine speed $N_E$, so that the first electric motor M1 can be more easily controlled than where the first electric motor M1 is controlled to control the engine speed $N_E$.

As described above, when the automatic transmission portion 20 performs a shifting action in the non-continuously-variable shifting state of the differential portion 11, the influence of the shifting action of the automatic transmission portion 20 on the engine 8 is reduced to reduce the shifting shock, by switching the differential portion 11 to the continuously-variable shifting state. To reduce the influence of the shifting action of the automatic transmission portion 20, however, the differential portion 11 need not be switched to the continuously-variable shifting state. Namely, it is considered possible to control the engine speed $N_E$ as needed irrespective of the shifting action of the automatic transmission portion 20, by cutting off the power transmitting path between the automatic transmission portion 20 and the engine 8.

In view of the above, the hybrid control means 52 is configured to release or partially engage the input clutch such as the first clutch C1 which permits or inhibits power input from the differential portion 11 to the automatic transmission portion 20, or to lower the ratio of engagement of the input clutch, that is, to increase the slip ratio of the input clutch, rather than to switch the differential portion 11 to from the non-continuously-variable shifting state to the continuously-variable shifting state under the control of the switching control means 50, for permitting the hybrid control means 52 to control the engine speed NE as needed, to reduce the shifting shock, during the shifting action of the automatic transmission portion 20 under the control of the step-variable shifting control means 54 in the non-continuously-variable shifting state of the differential portion 11.

Described in detail, the input-clutch control means 86 is configured to command the hydraulic control unit 42 to temporarily release or partially engage the input clutch currently placed in the engaged state, for cutting off the power transmitting path from the differential portion 11 to the automatic transmission portion 20 or placing this power transmitting path substantially in the power cut-off state, to permit the hybrid control means 52 to control the engine speed $N_E$ as needed, for a predetermined length of time which is obtained by experimentation to avoid the influence of the shifting action of the automatic transmission portion 20, when the under-shifting determining means 80 has determined that the automatic transmission portion 20 is under the shifting action under the control of the step-variable shifting control means 54 during running of the vehicle in the non-continuously-variable shifting state (locked state) of the differential portion 11.

When the under-shifting determining means 80 has determined that the automatic transmission portion 20 is under the shifting action under the control of the step-variable shifting control means 54 while the differential portion 11 is placed in the non-continuously-variable shifting state (locked state) and while the input clutch (first clutch C1) which has been placed in the engaged state is temporarily placed in the released state or partially engaged state under the control of the input-clutch control means 86, the hybrid control means 52 controls the first electric motor M1 for controlling the engine speed $N_E$ owing to the differential function of the differential portion 11, so as to avoid (reduce) the influence of the shifting action of the automatic transmission portion 20 on the engine speed $N_E$, for reducing the shifting shock of the automatic transmission portion 20. For instance, the hybrid control means 42 controls the first electric motor M1 to change the engine speed $N_E$ toward the value after completion of the shifting action of the automatic transmission portion 20, such that the engine speed $N_E$ changes at a predetermined rate which is obtained by experimentation so as to provide a best compromise between the reduction of the shifting shock and the improvement of the shifting response as felt by the vehicle operator.

The input-clutch control means 86 may be configured to release or partially engage the input clutch (first clutch C1) for cutting off the power transmitting path from the engine 8 to the automatic transmission portion 20 to reduce the influence of the shifting action of the automatic transmission portion 20, only when the differential portion 11 cannot be switched to the continuously-variable shifting state. That is, the differential portion 11 is normally switched to the continuously-variable shifting state to reduce the influence of the automatic transmission portion 20, but the input clutch is released or partially engaged to reduce the influence, if the differential portion 11 cannot be switched to the continuously-variable shifting state.

For example, the input-clutch control means 86 is configured to command the hydraulic control unit 42 to temporarily release or partially engaged the input clutch (first clutch C1), for cutting off the power transmitting path from the differential portion 11 to the automatic transmission portion 20 or placing this power transmitting path substantially in the power cut-off state, to permit the hybrid control means 52 to change the engine speed NE as needed, when the under-shifting determining means 80 has determined that the automatic transmission portion 20 is under the shifting action under the control of the step-variable shifting control means 54 and when the switching-to-continuously-variable-shifting-state feasibility determining means 88 has determined that the differential portion 11 cannot be switched from the non-continuously-variable shifting state to the continuously-variable shifting state, while the differential portion 11 is placed in the non-continuously-variable shifting state (locked state).

Figure 17:
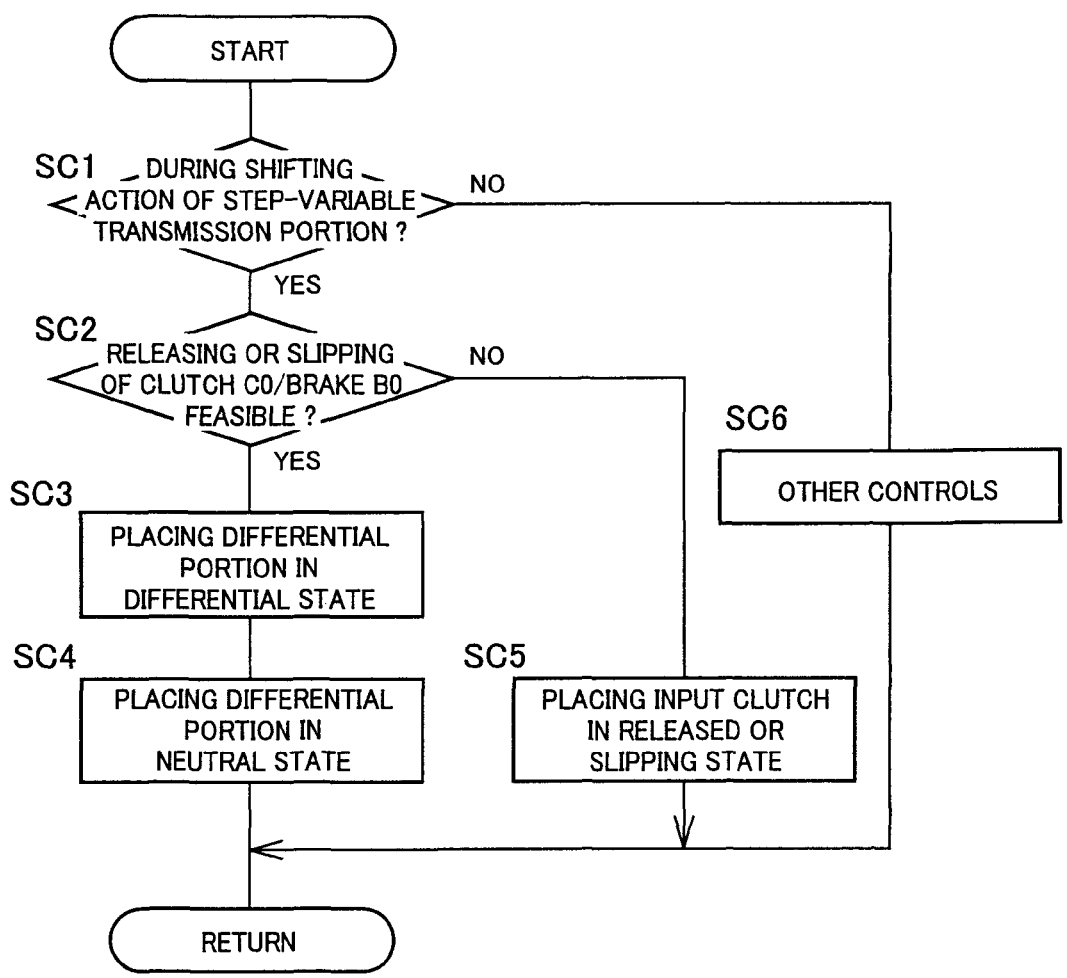
FIG. 17 is a flow chart corresponding to that of FIG. 11, illustrating a control operation of the electronic control device shown in FIG. 16, that is, a control routine executed when a clutch-to-clutch shifting action of the automatic transmission portion is performed while the differential portion is placed in the non-continuously-variable shifting state (step-variable shifting state).

FIG. 17 is a flow chart corresponding to that of FIG. 11, illustrating a major part of a control operation of the electronic control device 40 in the present embodiment, that is, a control routine executed when the automatic transmission portion 20 performs a shifting action while the differential portion 11 is placed in the non-continuously-variable shifting state (step-variable shifting state). This control routine is repeatedly executed with an extremely short cycle time of about several milliseconds to about several tens of milliseconds.

Figure 18:
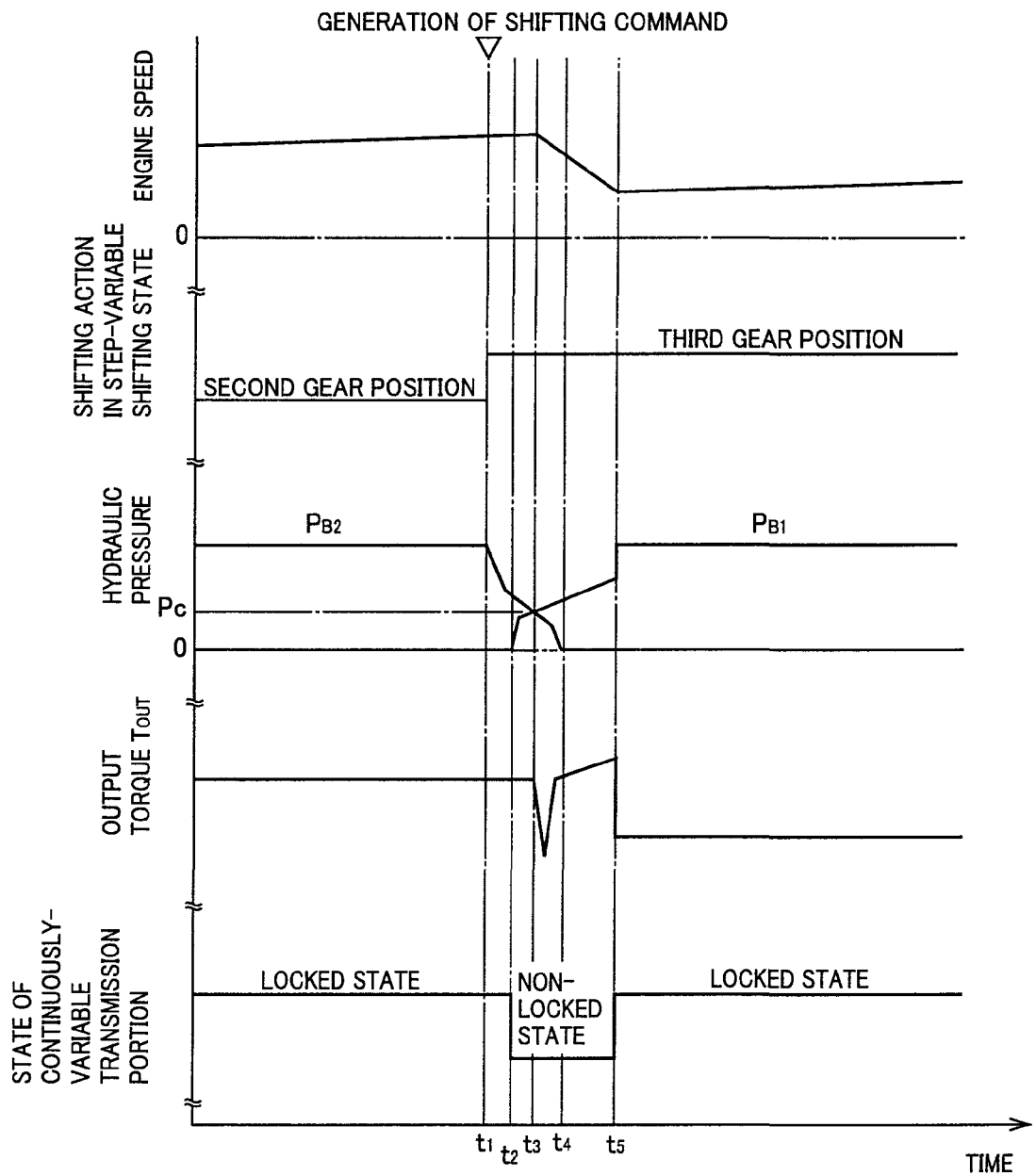
FIG. 18 is a time chart corresponding to that of FIG. 12, for explaining the control operation illustrated in the flow chart of FIG. 17, when the automatic transmission portion is commanded to effect the shift-up action from the second gear position to the third gear position, in the step-variable shifting state (locked state) of the differential portion.

FIG. 18 is a time chart corresponding to that of FIG. 12, for explaining the control operation illustrated in the flow chart of FIG. 17, when a shift-up action of the automatic transmission portion 20 from the second gear position to the third gear position is performed while the differential portion 11 is placed in the step-variable shifting state (locked state).

The control routine is initiated with SC1 corresponding to the under-shifting determining means 80, to determine whether the automatic transmission portion 20 is under a shifting action under the control of the step-variable shifting control means 54.

At a point of time t1 indicated in FIG. 18, it is determined that the automatic transmission portion 20 is commanded to be shifted up from the second gear position to the third gear position, in the non-continuously-variable shifting state (locked state) of the differential portion 11, and reduction of the pressure $P_{B2}$ of the second brake B2 which is the released-side coupling device is initiated. During a time period from the point of time t2 to a point of time t5, the pressure $P_{B1}$ of the first brake B1 which is the engaged-side coupling device is raised, and the engaging action of the first brake B1 is completed at the point of time t5 so that the shift-up action of the automatic transmission portion 20 is terminated. The transient hydraulic pressures of the released-side and engaged-side coupling devices during this time period between the points of time t1 and t5 are respectively reduced and raised at predetermined rates which are obtained by experimentation to change the input speed $N_{IN}$ so as to provide a best compromise between the shortening of the required shifting time and the reduction of the shifting shock.

If an affirmative determination is obtained in SC1, the control flow goes to SC2 corresponding to the switching-to-continuously-variable-shifting-state feasibility determining means 88, to determine whether the differential portion 11 can be switched from the non-continuously-variable shifting state (step-variable shifting state) to the continuously-variable shifting state (differential state). For example, this determination is made by determining whether the switching clutch C0 or brake B0 currently placed in the engaged state can be released by the hydraulic control unit 42 according to a command received from the switching control means 50. For instance, the differential portion 11 cannot be switched to the continuously-variable shifting state (differential state) when the engine torque $T_E$ is larger than the upper limit TE1, and the first electric motor M1 cannot generate a reaction torque corresponding to the engine torque $T_E$. On the other hand, the differential portion 11 can be switched to the continuously-variable shifting state (differential state) when the vehicle condition is in the high-speed running region or when the differential portion 11 is manually placed in the step-variable shifting state as described below. In the example of FIG. 17, the differential portion 11 is normally switched to the continuously-variable shifting state (differential state), that is, the locked state of the differential portion 11 is released, rather than the input clutch (first clutch C1) is released or partially engaged, if the locked state of the differential portion 11 can be released.

If an affirmative determination is obtained in SC2, the control flow goes to step SC3 corresponding to the switching control means 50, in which the hydraulic control unit 42 is commanded to release the switching clutch C0 or brake B0 currently placed in the engaged state, to release the limitation of the operation of the differential portion 11 as the electrically controlled continuously variable transmission, so that the differential portion 11 is temporarily placed in the continuously-variable shifting state (differential state).

At a point of time t2 indicated in FIG. 18, it is determined that the automatic transmission portion 20 is commanded to be shifted, and the hydraulic control unit 42 is commanded to release the switching clutch C0 for placing the differential portion 11 in the non-locked state. During a time period from the point of time t2 to the point of time t5, the differential portion (continuously-variable transmission portion) 11 is temporarily switched from the non-continuously-variable shifting state (locked state) to the continuously-variable shifting state (non-locked state). The point of time t2 at which the hydraulic control unit 42 is commanded to switch the differential portion 11 to the continuously-variable shifting state is a predetermined time $t_M$ after the point of time t1 at which the automatic transmission portion 20 is commanded to perform the shifting action. This time $t_m$ is determined to switch the differential portion (continuously-variable transmission portion 11) to the continuously-variable shifting state (non-locked state) at least prior to the moment of initiation of the inertia phase of the shifting action. The time $t_M$ may vary according to the vehicle speed V or the engine torque $T_E$.

The above-described step SC3 is followed by SC4 corresponding to the hybrid control means 52, to place the first electric motor M1 in the non-load state for temporarily placing the differential portion 11 in the electrically neutral state, to completely avoid the influence of the shifting action of the automatic transmission portion 20 on the engine speed $N_E$ in the continuously-variable shifting state of the differential portion 11. This step SC4 may be replaced by a step in which the first electric motor M1 is controlled to control the engine speed $N_E$ owing to the differential function of the differential portion 11, rather than the differential portion 11 is placed in the neutral state, to reduce the influence of the shifting action of the automatic transmission portion 20 on the engine speed $N_E$ in the continuously-variable shifting state of the differential portion 11.

In the example of FIG. 18, the first electric motor M1 is controlled to control the engine speed $N_E$, rather than the differential portion 11 is placed in the neutral state. The engine speed $N_E$ is controlled by controlling the first electric motor M1, during the time period from a point of time t3 to the point of time t5, so as to prevent a drop of the engine speed $N_E$ under the influence of the tie-up state of the shifting action, which would cause a drop of the output torque $T_{OUT}$.

If a negative determination is obtained in step SC4, the control flow goes to SC5 corresponding to the input-clutch control means 86, to command the hydraulic control unit 42 to temporarily release or partially engage the input clutch (first clutch C1) which has been placed in the fully engaged state, so that the power transmitting path from the differential portion 11 to the automatic transmission portion 20 is cut off, whereby the engine speed $N_E$ can be controlled as needed.

If a negative determination is obtained in SC1, the control flow goes to SC16 in which control operations that are to be implemented in when the automatic transmission portion 20 is not under a shifting action are performed by various control means of the electronic control device 40. Alternatively, the present control routine is terminated with SB10.

As described above, the present embodiment is arranged such that the differential portion 11 is switched to the continuously-variable shifting state under the control of the switching control means 50 when the automatic transmission portion 20 performs a shifting action, so that the engine speed $N_E$ can be controlled as needed owing to the differential function of the differential portion 11, irrespective of the shifting action of the automatic transmission portion 20, for example, irrespective of a change of the input speed $N_{IN}$ of the automatic transmission portion 20 due to the shifting action. In the continuously-variable shifting state of the differential portion 11, the shifting shock of the automatic transmission portion 20 can be made smaller than in the non-continuously-variable shifting state (step-variable shifting state) in which the engine 8 and the drive wheels 38 are mechanically connected to each other, and the engine speed $N_E$ may be directly influenced by the shifting action of the automatic transmission portion 20.

The present embodiment is further arranged such that the input clutch (first clutch C1) is released or partially engaged if the differential portion 11 cannot be switched to the continuously-variable shifting state under the control of the switching control means 50 under the control of the input-clutch control means 86, while the automatic transmission portion 20 is under a shifting action in the non-continuously-variable shifting state of the differential portion 11. Accordingly, the engine speed $N_E$ can be controlled as needed irrespective of the shifting action of the automatic transmission portion 20, to reduce the shifting shock of the automatic transmission portion 20, by cutting off the power transmitting path from the differential portion 11 to the automatic transmission portion 20, even when the differential function of the differential portion 11, that is, the limitation of the operation of the differential portion 11 as the electrically controlled continuously variable transmission cannot be released due to a failure or functional deterioration of the hydraulic actuator for the switching clutch C0 or brake B0, or the solenoid-operated valve for the hydraulic actuator, or in a high-output running of the vehicle with the engine torque $T_E$ exceeding the upper limit $T_{E1}$.

Embodiment 4

Figures 19, 20:
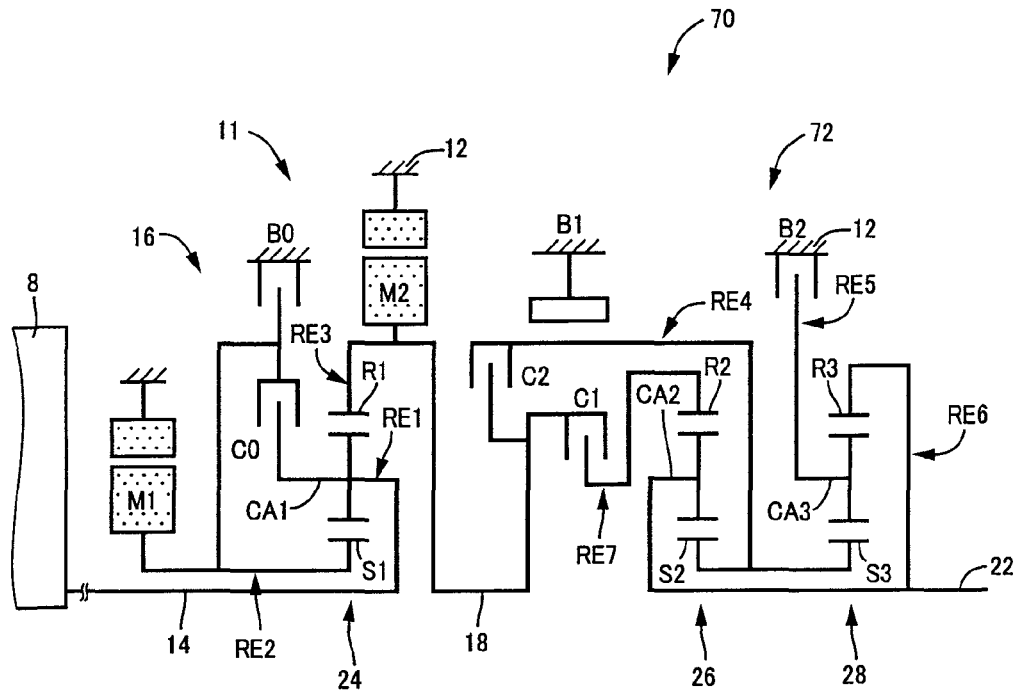
FIG. 19 is a schematic view corresponding to that of FIG. 1, for explaining an arrangement of a hybrid vehicle drive system according to another embodiment of the present invention.
FIG. 20 is a table corresponding to that of FIG. 2, indicating shifting actions of the hybrid vehicle drive system of FIG. 19, which is operable in a selected one of the continuously-variable and step-variable shifting states, in relation to different combinations of operating states of hydraulically operated frictional coupling devices to effect the respective shifting actions.
Figure 21:
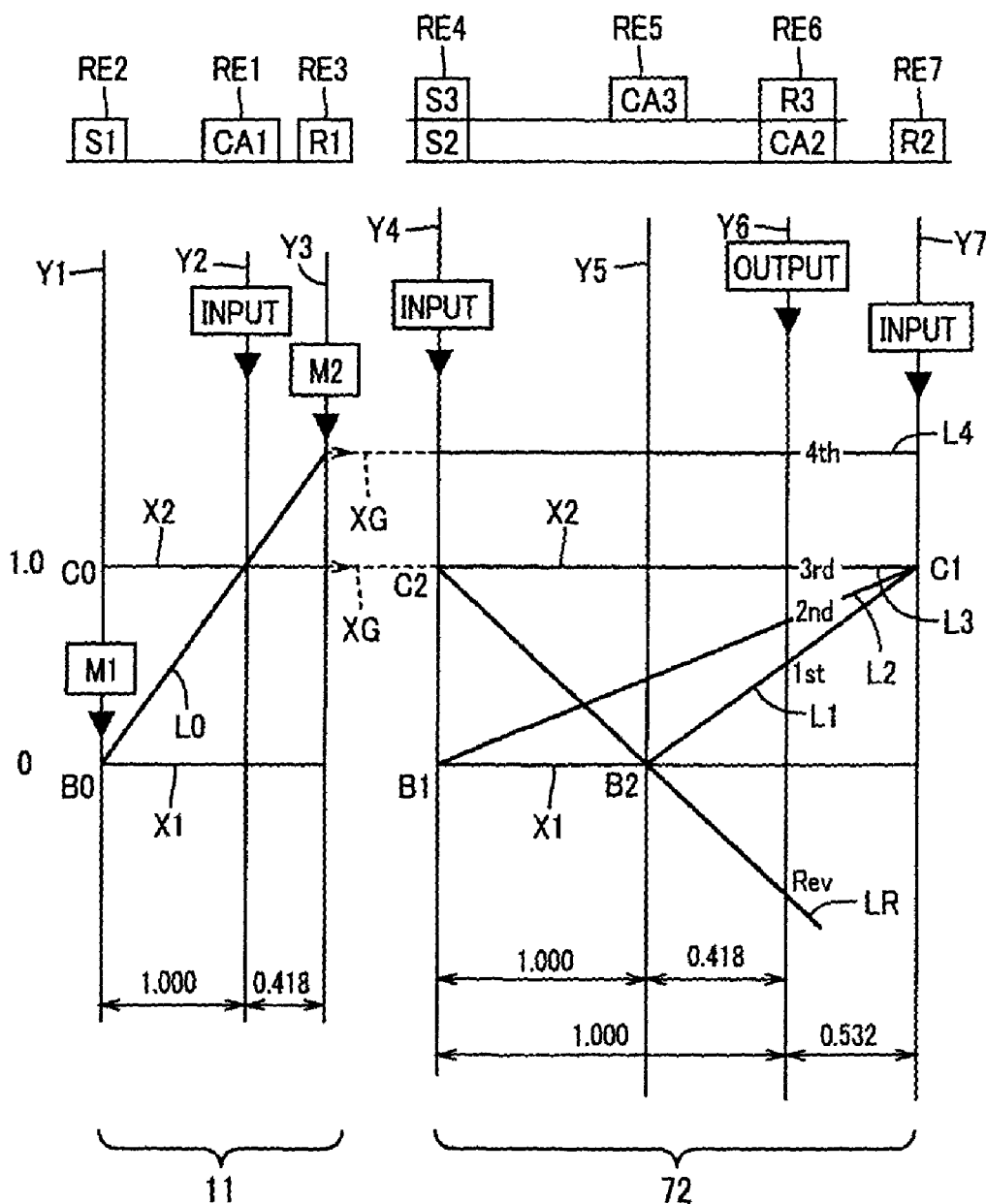
FIG. 21 is a collinear chart corresponding to that of FIG. 3, indicating relative rotating speeds of the rotary elements of the hybrid vehicle drive system of FIG. 19 in the step-variable shifting state, in the different gear positions.

FIG. 19 is a schematic view for explaining an arrangement of a transmission mechanism 70 in another embodiment of this invention, and FIG. 20 a table indicating a relationship between the gear positions of the transmission mechanism 70 and different combinations of engaged states of the hydraulically operated frictional coupling devices for respectively establishing those gear positions, while FIG. 21 is a collinear chart for explaining a shifting operation of the transmission mechanism 70.

The transmission mechanism 70 includes the differential portion 11 having the first electric motor M1, power distributing mechanism 16 and second electric motor M2, as in the preceding embodiment. The transmission mechanism 70 further includes an automatic transmission portion 72 having three forward drive positions. The automatic transmission portion 72 is interposed between the differential portion 11 and the output shaft 22 and is connected in series to the differential portion 11 through the power transmitting member 18. The power distributing mechanism 16 includes the single-pinion type first planetary gear set 24 having a gear ratio ρ1 of about 0.418, for example, and the switching clutch C0 and the switching brake B0. The automatic transmission portion 72 includes the single-pinion type second planetary gear set 26 having a gear ratio ρ2 of about 0.532, for example, and the single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 20. Those gear positions have respective speed ratios γ (input shaft speed $N_{14}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as the continuously variable transmission described above. In the present transmission mechanism 70, therefore, a step-variable transmission is constituted by the transmission portion 20, and the differential portion 11 which is placed in the fixed-speed-ratio shifting state by engagement of the switching clutch C0 or switching brake B0. Further, a continuously variable transmission is constituted by the transmission portion 20, and the differential portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio $\gamma 1$ of about 2.804, for example, is established by engaging actions of the switching clutch C0, first clutch C1 and second brake B2, and the second gear position having the speed ratio $\gamma 2$ of about 1.531, for example, which is lower than the speed ratio $\gamma 1$, is established by engaging actions of the switching clutch C0, first clutch C1 and first brake B1, as indicated in FIG. 20. Further, the third gear position having the speed ratio $\gamma 3$ of about 1.000, for example, which is lower than the speed ratio $\gamma 2$, is established by engaging actions of the switching clutch C0, first clutch C1 and second clutch C2, and the fourth gear position having the speed ratio $\gamma 4$ of about 0.705, for example, which is lower than the speed ratio $\gamma 3$, is established by engaging actions of the first clutch C1, second clutch C2, and switching brake B0. Further, the reverse gear position having the speed ratio $\gamma R$ of about 2.393, for example, which is intermediate between the speed ratios $\gamma 1$ and $\gamma 2$, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, as indicated in FIG. 20, so that the differential portion 11 functions as the continuously variable transmission, while the automatic transmission portion 72 connected in series to the differential portion 11 functions as the step-variable transmission, whereby the speed of the rotary motion transmitted to the automatic transmission portion 72 placed in one of the first through third gear positions, namely, the rotating speed of the power transmitting member 18 is continuously changed, so that the speed ratio of the transmission mechanism 10 when the automatic transmission portion 72 is placed in one of those gear positions is continuously variable over a predetermined range. Accordingly, the total speed ratio of the automatic transmission portion 72 is continuously variable across the adjacent gear positions, whereby the overall speed ratio $\gamma T$ of the transmission mechanism 70 as a whole is continuously variable.

FIG. 21 is a collinear chart which indicates, by straight lines, a relationship among the rotating speeds of the rotary elements in each of the gear positions of the transmission mechanism 70, which is constituted by the differential portion 11 functioning as the continuously-variable shifting portion or first shifting portion, and the automatic transmission portion 72 functioning as the step-variable shifting portion or second shifting portion. The collinear chart of FIG. 21 indicates the rotating speeds of the individual elements of the power distributing mechanism 16 when the switching clutch C0 and brake B0 are both released, and the rotating speeds of those elements when the switching clutch C0 or brake B0 is engaged, as in the preceding embodiment.

In FIG. 21, four vertical lines Y4, Y5, Y6 and Y7 corresponding to the automatic transmission portion 72 and arranged in the rightward direction respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission portion 72, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the automatic transmission portion 72, and the seventh rotary element RE7 is selectively connected to the power transmitting member 18 through the first clutch C1.

When the first clutch C1 and the second brake B2 are engaged, the automatic transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 21. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the differential portion 11. When the switching clutch B0 is engaged in place of the switching clutch C0, the sixth rotary element RE6 is rotated at a speed higher than the engine speed $N_E$, with the drive force received from the differential portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 according to the present embodiment is also constituted by the differential portion 11 functioning as the continuously-variable shifting portion or first shifting portion, and the automatic transmission portion 72 functioning as the (step-variable) shifting portion or second shifting portion, so that the present transmission mechanism 70 has advantages similar to those of the first embodiment.

Embodiment 5

Figure 22:
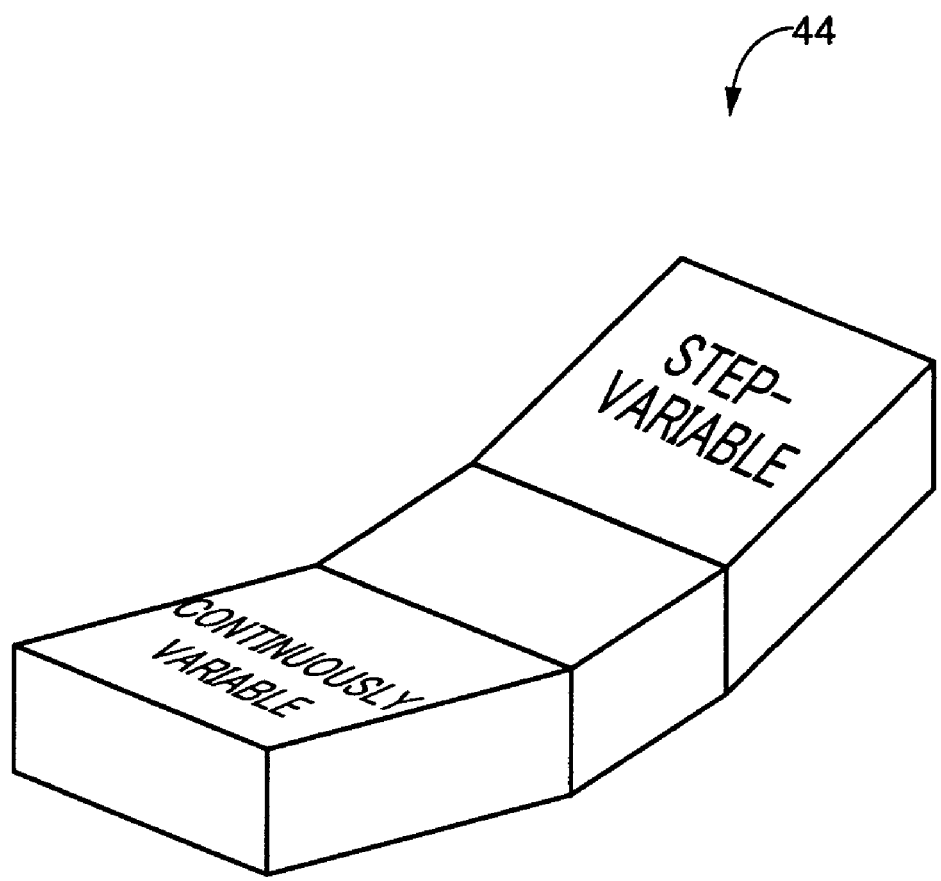
FIG. 22 is a perspective view showing an example of a manually operable shifting-state selecting device in the form of a seesaw switch operated by a user to select the shifting state.

FIG. 22 shows an example of a seesaw switch 44 (hereinafter referred to as "switch 44") functioning as a shifting-state selecting device manually operable to select the differential state (non-locked state) or non-differential state (locked state) of the power distributing mechanism 16, that is, to select the continuously-variable shifting state or step-variable shifting state of the transmission mechanism 10. This switch 44 permits the user to select the desired shifting state during running of the vehicle. The switch 44 has a continuously-variable-shifting running button labeled "STEP-VARIABLE" for running of the vehicle in the continuously-variable shifting state, and a step-variable-shifting running button labeled "CONTINUOUSLY-VARIABLE" for running of the vehicle in the step-variable shifting state, as shown in FIG. 22. When the continuously-variable-shifting running button is depressed by the user, the switch 44 is placed in a continuously-variable shifting position for selecting the continuously-variable shifting state in which the transmission mechanism 10 is operable as the electrically controlled continuously variable transmission. When the step-variable-shifting running button is depressed by the user, the switch 44 is placed in a step-variable shifting position for selecting in the step-variable shifting state in which the transmission mechanism is operable as the step-variable transmission.

In the preceding embodiments, the shifting state of the transmission mechanism 10 is automatically switched on the basis of the vehicle condition and according to the switching boundary line map shown in FIG. 6 by way of example. However, the shifting state of the transmission mechanism 10, 70 may be switched by a manual operation of the switch 44, in place of or in addition to the automatic switching operation. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user manually operates the switch 44 to place the transmission mechanism 10 in the continuously-variable shifting state when the user likes the transmission mechanism 10 to operate as a continuously variable transmission or wants to improve the fuel economy of the engine, or alternatively in the step-variable shifting state when the user likes a rhythmical change of the engine speed as a result of a shifting action of the step-variable transmission.

The switch 44 may have a neutral position in which none of the continuously-variable and step-variable shifting states are selected. In this case, the switch 44 may be placed in its neutral position when the user has not selected the desired shifting state or likes the transmission mechanism 10 to be automatically placed in one of the continuously-variable and step-variable shifting states.

While the preferred embodiments of this invention have been described in detail by reference to the accompanying drawings, it is to be understood that the present invention may be otherwise embodied.

In the preceding embodiment, the switching control means 50 (SA4, SA5) is configured to command the hydraulic control unit 42 to release the switching clutch C0 or brake B0 currently placed in the engaged state, upon detection of a tie-up state of the shifting action by the tie-up determining means 82 (SA2), for temporarily switching the differential portion 11 from the non-differential state (locked state) to the continuously-variable shifting state (non-locked state), during the time period from the point of time t3 to the point of time t5 indicated in FIG. 12. However, the switching control means 50 may be configured to command the hydraulic control unit 42 to release the switching clutch C0 or brake B0, upon forecasting that the shifting action will be in a tie-up state, prior to the detection of the tie-up state, for temporarily switching the differential portion 11 from the non-differential state (locked state) to the continuously-variable shifting state (non-locked state). For instance, the switching control means 50 forecasts the future tie-up state of the clutch-to-clutch shifting action, on the basis of the pressures of the coupling devices associated with the clutch-to-clutch shifting action.

In the preceding embodiments, the switching control means 50 is configured to release the switching clutch C0 or brake B0 for temporarily switching the differential portion 11 to the continuously-variable shifting state in which the differential portion 11 is operable as the electrically controlled continuously variable transmission. To more rapidly switch the differential portion 11 back to the non-continuously-variable shifting state, the switching control means 50 may be arranged to place the switching clutch C0 or brake B0 to a partially engaged state rather to its fully released state, for switching the differential portion 11 to the continuously-variable shifting state. For instance, the switching control means 50 partially engages the switching clutch C0 or brake B0 to permit the differential portion 11 to operate as the electrically controlled continuously variable transmission (differential device), such that the torque generated by the first electric motor M1 and the torque of the switching clutch C0 or brake B0 placed in the partially engaged state cooperate to generate a reaction torque corresponding to the engine torque $T_E$ received by the differential portion 11.

The switching control means 50 may be configured to either release or partially engage the switching clutch C0 or brake B0 (currently placed in the engaged state), depending upon whether the clutch-to-clutch shifting action is in a heavy tie-up state or not.

In the preceding embodiments, the operation of the switching control means 50 to release the switching clutch C0 or brake B0, the operation of the hybrid control means 52 to place the differential portion 11 in the neutral state, and the operation of the input-clutch control means 86 to release or partially engage the input clutch are performed in the real-time fashion, depending upon a result of the determinations by the tie-up determining means 82 as to whether the clutch-to-clutch shifting action is in the tie-up state, and a result of the determination by the heavy-tie-up determining means 84 as to whether the clutch-to-clutch shifting action is in the heavy tie-up state. However, those operations may be performed upon the next occurrence of the same clutch-to-clutch shifting action, depending upon the results of those determinations of the tie-up state and the heavy tie-up state. Where those determinations of the tie-up state and the heavy tie-up state are performed in a learning control fashion, the determinations may be made on the basis of an amount of reduction $\Delta N_{IN}$ of the actual input shaft speed $N_{IN}$ rather than the rate of reduction $N_{IN}'$ of the input shaft speed $N_{IN}$. For example, the heavy-tie-up determining means 84 is configured to make the determination as to whether the clutch-toclutch shifting action is in the heavy tie-up state, on the basis of the actual input shaft speed $N_{IN}$ and the reduction amount $\Delta N_{IN}$ of the input shaft speed $N_{IN}$, and according to a predetermined relationship or map which is obtained by experimentation to make the determination on the basis of the actual input shaft speed $N_{IN}$ and the reduction amount $\Delta N_{IN}$.

In the preceding embodiments, the tie-up determining means 82 and the heavy-tie-up determining means 84 are configured to detect the tie-up state and the heavy tie-up state on the basis of a change of the input shaft speed $N_{IN}$ of the automatic transmission portion 20. However, the tie-up determining means 82 and the heavy-tie-up determining means 84 may be configured to detect the tie-up and heavy-tie-up states, on the basis of a change of the rotating speed of any rotary member of the automatic transmission portion 20, which rotating speed is influenced by the tie-up phenomenon. For instance, the input shaft speed $N_{IN}$ may be replaced by the output shaft speed $N_{OUT}$.

In the embodiment of FIG. 14, the differential portion 11 is normally switched to the continuously-variable shifting state (differential state), rather than the input clutch is released or partially engaged, when the clutch-to-clutch shifting action is in the tie-up state. However, the input clutch may be always released or partially engaged in the tie-up state of the clutch-to-clutch shifting action. In this case, steps SB3-SB6 are eliminated, and the control flow goes to SB7-SB9 when the affirmative determination is obtained in SB2.

In the embodiment of FIG. 14, the input-clutch control means 86 is configured to determine whether the input clutch is released or partially engaged, depending upon whether the clutch-to-clutch shifting action is in the heavy tie-up state or not. However, the input-clutch control means 86 may be configured to either release or partially engage the input clutch when the clutch-to-clutch shifting action is in the tie-up state, irrespective of whether the tie-up state is the heavy tie-up state or not. In this case, SB7 is eliminated, and the control flow goes to either SB8 or SB9 when the negative determination is obtained in SB3.

In the illustrated embodiments, the transmission mechanism 10, 70 is switchable between its continuously-variable shifting state and the step-variable shifting states by placing the differential portion 11 (power distributing mechanism 16) selectively in one of its differential state in which the differential portion is operable as the electrically controlled continuously variable transmission, and the non-differential state (locked state) in which the differential portion 11 is not operable as the step-variable transmission. However, the differential portion 11 placed in its differential state can be operable as the step-variable transmission the speed ratio of which is variable in steps rather than continuously. In other words, the differential and non-differential states of the differential portion 11 do not respectively correspond to the continuously-variable and step-variable shifting states of the transmission mechanism 10, 70, and therefore the differential portion 11 need not be switchable between the continuously-variable and step-variable shifting states. The principle of this invention is applicable to any transmission mechanism 10, 70 (differential portion 11 or power distributing mechanism 16) which is switchable between the differential and non-differential states.

In the illustrated embodiments, the first clutch C1 and the second clutch C2 are provided in the automatic transmission portion 20, 70, as the input clutches operable to place the power transmitting path between the differential portion 11 and the automatic transmission portion 20, 70, in a selected one of the power transmitting state and the power cut-off state. However, the first and second clutches C1, C2 may be replaced by at least one coupling device operable to switch the power transmitting path between the power transmitting and cut-off states. The at least one coupling device need not be a part of the automatic transmission portion 20, 72, and may be provided in a power transmitting path between the differential portion 11 and the first and second clutches C1, C2, which power transmitting path does not include the automatic transmission portion 20, 72.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18, respectively, through gears or a belt. Although the second electric motor M2 is connected to the power transmitting member 18, the second electric motor M2 may be connected to the output shaft 22, or any rotary member of the automatic transmission portion 20, 72. An arrangement in which the second electric motor M2 is connected to the power transmitting member 18 or output shaft 22 through gears, belt or speed reducing device is an example of an arrangement in which the second electric motor M2 is disposed in a power transmitting path between the power transmitting member 11 and the drive wheels 38.

Although the power distributing mechanism 16 described above is provided with the switching clutch C0 and the switching brake B0, both of the switching clutch C0 and switching brake B0 need not be provided. While the switching clutch C0 is provided to selectively connect the sun gear S1 and the carrier CA1 to each other, the switching clutch C0 may selectively connect the sun gear S1 and the ring gear R1 to each other or the carrier CA1 and the ring ear R1 to each other. Namely, the switching clutch C0 is required to connect any two of the three elements of the first planetary gear set 24 to each other.

The hydraulically operated frictional coupling devices used as the switching clutch C0, switching brake B0, etc. in the illustrated embodiments may be replaced by coupling devices of a magnetic-power type, an electromagnetic type or a mechanical type, such as a powder clutch (magnetic powder clutch), an electromagnetic clutch and a meshing type dog clutch.

In the illustrated embodiments, the automatic transmission portion 20, 72 is disposed in the power transmitting path between the drive wheels 38, and the power transmitting member 18 which is the output member of the differential portion 11 or power distributing mechanism 16. However, the automatic transmission portion 20, 72 may be replaced by any other type of power transmitting device (transmission), for example, automatic transmissions such as a continuously variable transmission (CVT), and a permanent-mesh paralleltwo-axes type transmission well known as a manual transmission and which is automatically shifted by select cylinders and shift cylinders, and manual transmissions such as a manually shifted synchronous-mesh type transmission. Where the automatic transmission portion 20, 72 is replaced by the continuously variable transmission (CVT), the transmission mechanism as a whole is placed in the step-variable shifting state when the power distributing mechanism 16 is placed in the fixed-speed-ratio shifting state. In the step-variable shifting state, the vehicle drive force is transmitted through a mechanical power transmitting path, and not transmitted through an electric path. The above-indicated continuously variable transmission may be controlled to establish a plurality of fixed speed ratios stored in a memory, which speed ratios correspond to those of a step-variable transmission.

While the automatic transmission portion 20, 72 in the preceding embodiments is connected in series to the differential portion 11 through the power transmitting member 18, the automatic transmission portion 20, 72 may be mounted on and disposed coaxially with a counter shaft which is parallel to the input shaft 14. In this case, the differential portion 11 and the automatic transmission portion 20, 72 are operatively connected to each other through a suitable power transmitting device or a set of two power transmitting members such as a pair of counter gears, and a combination of a sprocket wheel and a chain.

The power distributing mechanism 16 provided as a differential mechanism in the preceding embodiments may be replaced by a differential gear device including a pinion rotated by the engine 8, and a pair of bevel gears which mesh with the pinion and which are respectively operatively connected to the first electric motor M1 and the power transmitting member 18.

While the power distributing mechanism 16 in the illustrated embodiments is constituted by one planetary gear set 24, it may be constituted by two or more planetary gear sets so that the power distributing mechanism 16 is operable as a transmission having three or more gear positions in the non-differential state (fixed-speed-ratio shifting state). The planetary ear sets are not limited to a single-pinion type, but may be a double-pinion type.

In the illustrated embodiments, the manually operable shifting device 46 is provided with the shift lever 48 manually operable to select one of a plurality of operating positions. However, the shift lever 48 may be replaced by pushbutton switches, a slide-type or any other type of switch manually operable to select a desired one of a plurality of operating positions, or by devices not operated by hand, such as a device operated in response to a voice of the vehicle operator or operated by foot, to select one of a plurality of operating positions. Although the shift lever 48 has the manual forward-drive position M for selecting the number of the forward-drive gear positions available for automatic shifting of the automatic transmission portion 20, 72, the shift lever 48 placed in the manual forward-drive position M may be used to manually shift up or down the automatic transmission portion 20, 72, within the range from the first gear position through the fourth gear position, by operating the shift lever 48 from the position M to the shift-up position "+" or shift-down position "−".

While the switch 44 is of a seesaw type switch in the preceding embodiments, the seesaw switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The seesaw switch 44 may or may not have a neutral position. Where the seesaw switch 44 does not have the neutral position, an additional switch may be provided to enable and disable the seesaw switch 44. The function of this additional switch corresponds to the neutral position of the seesaw switch 44. The seesaw switch 44 may be replaced by a switching device operable by a voice generated by the vehicle operator or a foot of the vehicle operator, rather than by hand, to select one of the continuously-variable shifting state (differential state) and the step-variable shifting state (non-differential state).

It is to be understood that the embodiments of the invention have been descried for illustrative purpose only, and that the present invention may be embodied with various changes and modifications which may occur to those skilled in the art.

The invention claimed is:

1. A control apparatus for a vehicular drive system including a continuously-variable transmission portion operable as an electrically controlled continuously variable transmission, and a step-variable transmission portion, said continuously variable transmission portion having a differential mechanism operable to distribute an output of an engine to a first electric motor and a power transmitting member, a second electric motor connected to a power transmitting path between the power transmitting member and a drive wheel of a vehicle, and a differential limiting device provided in said differential mechanism and operable to limit a differential function of said differential mechanism, for limiting an operation of said continuously-variable transmission portion as said electrically controlled continuously variable transmission, said step-variable transmission portion constituting a part of said power transmitting path and functioning as a step-variable transmission operable to perform a clutch-to-clutch shifting action by a releasing action of a coupling device and an engaging action of another coupling device, said control apparatus comprising:

differential-state switching means for releasing the limitation of the operation of said continuously-variable transmission portion as said electrically controlled continuously variable transmission, while said clutch-to-clutch shifting action of said step-variable transmission portion is in a tie-up state.

2. The control apparatus according to claim 1, wherein said differential-state switching means is operable to switch said continuously-variable transmission portion from a step-variable shifting state in which the continuously-variable transmission portion is not operable as the electrically controlled continuously variable transmission, to a continuously-variable shifting state in which the continuously-variable transmission portion is operable as the electrically controlled continuously variable transmission, when said clutch-to-clutch shifting action of said step-variable transmission portion is brought into said tie-up state.

3. The control apparatus according to claim 1, further comprising electric-motor control means for placing said first electric motor in a non-load state for placing said continuously-variable transmission portion in a neutral state in which power cannot be transmitted through the continuously-variable transmission portion, when said clutch-to-clutch shifting action is in a heavy tie-up state in which a degree of the tie-up state is higher than a predetermined value.

4. The control apparatus according to claim 1, wherein the vehicular drive system further includes an input clutch which permits and inhibits power input from said power transmitting member to said step-variable transmission portion, said control apparatus further including input-clutch control means for releasing or partially engaging said input clutch, when the limitation of the operation of said continuously-variable transmission portion as said electrically controlled continuously variable transmission cannot be released by said differential-state switching means while said clutch-to-clutch shifting action of said step-variable transmission portion is in said tie-up state.

5. A control apparatus for a vehicular drive system including a continuously-variable transmission portion operable as an electrically controlled continuously variable transmission and a step-variable transmission portion, said continuously-variable transmission portion having a differential mechanism operable to distribute an output of an engine to a first electric motor and a power transmitting member, a second electric motor connected to a power transmitting path between the power transmitting member and a drive wheel of a vehicle, a differential limiting device provided in said differential mechanism and operable to limit a differential function of said differential mechanism, for limiting an operation of said continuously-variable transmission portion as said electrically controlled continuously variable transmission, and said step-variable transmission portion constituting a part of said power transmitting path and functioning as a step-variable transmission operable to perform a clutch-to-clutch shifting action by a releasing action of a released-side coupling device and an engaging action of an engaged-side coupling device, said step-variable transmission portion including an input clutch which permits and inhibits power input from said power transmitting member to said step-variable transmission portion, said control apparatus comprising:
input-clutch control means for releasing or partially engaging said input clutch, when said clutch-to-clutch shifting action of said step-variable transmission portion is in a tie-up state while the operation of said continuously-variable transmission portion as said electrically controlled continuously variable transmission is limited.

6. The control apparatus according to claim 5, further comprising differential-state switching means for releasing the limitation of the operation of said continuously-variable transmission portion as the electrically controlled continuously variable transmission while said clutch-to-clutch shifting action of said step-variable transmission portion is in the tie-up state, and wherein said input-clutch control means releases or partially engages said input clutch when the limitation of the operation of the continuously-variable transmission portion as the electrically controlled continuously variable transmission cannot be released by the differential-state switching means.

7. The control apparatus according to claim 5, wherein said input-clutch control means partially releases said input clutch.

8. The control apparatus according to claim 5, wherein said input-clutch control means releases said input clutch when said clutch-to-clutch shifting action is in a heavy tie-up state in which a degree of the tie-up state is higher than a predetermined value.

9. A control apparatus for a vehicular drive system including a differential portion, a step-variable transmission portion and a continuously-variable transmission portion operable as an electrically controlled continuously variable transmission, said continuously variable transmission portion having a differential mechanism operable to distribute an output of an engine to a first electric motor and a power transmitting member, a second electric motor connected to a power transmitting path between the power transmitting member and a drive wheel of a vehicle, and a differential limiting device provided in said differential mechanism and operable to limit a differential function of said differential mechanism, for limiting a differential function of said differential portion, said step-variable transmission portion constituting a part of said power transmitting path and functioning as a step-variable transmission operable to perform a clutch-to-clutch shifting action by a releasing action of a coupling device and an engaging action of another coupling device, said control apparatus comprising:
differential-state switching means for releasing the limitation of the differential function of said differential portion, while said clutch-to-clutch shifting action of said step-variable transmission portion is in a tie-up state.

10. The control apparatus according to claim 9, wherein said differential-state switching means is operable to switch said continuously-variable transmission portion from a step-variable shifting state in which the continuously-variable transmission portion is not operable as the electrically controlled continuously variable transmission, to a continuously-variable shifting state in which the continuously-variable transmission portion is operable as the electrically controlled continuously variable transmission, when said clutch-to-clutch shifting action of said step-variable transmission portion is brought into said tie-up state.

11. The control apparatus according to claim 9, further comprising electric-motor control means for placing said first electric motor in a non-load state for placing said continuously-variable transmission portion in a neutral state in which power cannot be transmitted through the continuously-variable transmission portion, when said clutch-to-clutch shifting action is in a heavy tie-up state in which a degree of the tie-up state is higher than a predetermined value.

12. The control apparatus according to claim 9, wherein the vehicular drive system further includes an input clutch which permits and inhibits power input from said power transmitting member to said step-variable transmission portion, said control apparatus further including input-clutch control means for releasing or partially engaging said input clutch, when the limitation of the operation of said continuously-variable transmission portion as said electrically controlled continuously variable transmission cannot be released by said differential-state switching means while said clutch-to-clutch shifting action of said step-variable transmission portion is in said tie-up state.

13. A control apparatus for a vehicular drive system including a differential portion and a step-variable transmission portion, said differential portion having a differential mechanism operable to distribute an output of an engine to a first electric motor and a power transmitting member, a second electric motor connected to a power transmitting path between the power transmitting member and a drive wheel of a vehicle, and a differential limiting device provided in said differential mechanism and operable to limit a differential function of said differential mechanism, for limiting a differential function of said differential portion, said step-variable transmission portion constituting a part of said power transmitting path and functioning as a step-variable transmission operable to perform a clutch-to-clutch shifting action by a releasing action of a released-side coupling device and an engaging action of an engaged-side coupling device, said step-variable transmission portion including an input clutch which permits and inhibits power input from said power transmitting member to said step-variable transmission portion, said control apparatus comprising:
input-clutch control means for releasing or partially engaging said input clutch, when said clutch-to-clutch shifting action of said step-variable transmission portion is in a tie-up state while the differential function of said differential portion is limited.

14. The control apparatus according to claim 13, further comprising differential-state switching means for releasing the limitation of the differential function of said differential portion while said clutch-to-clutch shifting action of said step-variable transmission portion is in the tie-up state, and wherein said input-clutch control means releases or partially engages said input clutch when the limitation of the differential function of the differential portion cannot be released by the differential-state switching means.

15. The control apparatus according to claim 13, wherein said input-clutch control means partially releases said input clutch.

16. The control apparatus according to claim 13, wherein said input-clutch control means releases said input clutch when said clutch-to-clutch shifting action is in a heavy tie-up state in which a degree of the tie-up state is higher than a predetermined value.

* * * * *